(12) United States Patent
Frankenbach et al.

(10) Patent No.: US 6,908,962 B1
(45) Date of Patent: Jun. 21, 2005

(54) STABLE SILICONE OIL EMULSION COMPOSITION, ARTICLE OF MANUFACTURE, AND METHOD OF FABRIC WRINKLE CONTROL

(75) Inventors: Gayle Marie Frankenbach, Cincinnati, OH (US); John William Smith, Milford, OH (US); Toan Trinh, Maineville, OH (US); Earl Bray, Jr., Cincinnati, OH (US); Lisa Catherine Winder, Cincinnati, OH (US); Su Yon Chang, Cincinnati, OH (US); Mary Ellen Raleigh, Mason, OH (US); Alessandro Corona, III, Maineville, OH (US); Anthony James Burns, West Chester, OH (US); Alan Robert Dinniwell, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 187 days.

(21) Appl. No.: 10/031,481
(22) PCT Filed: Jul. 6, 2000
(86) PCT No.: PCT/US00/20274

§ 371 (c)(1),
(2), (4) Date: Apr. 25, 2002

(87) PCT Pub. No.: WO01/07710

PCT Pub. Date: Feb. 1, 2001

Related U.S. Application Data

(60) Provisional application No. 60/145,632, filed on Jul. 26, 1999.

(51) Int. Cl.$^7$ .............................................. C08L 83/04
(52) U.S. Cl. ....................................... 524/588; 516/53
(58) Field of Search ............................ 524/588; 516/53

(56) References Cited

U.S. PATENT DOCUMENTS

| 3,968,042 A | 7/1976 | Erickson |
| 4,020,212 A | 4/1977 | Erickson |
| 6,221,833 B1 * | 4/2001 | Colurciello, Jr. ............ 510/466 |

FOREIGN PATENT DOCUMENTS

| WO | WO 92/19671 A1 | 11/1992 |
| WO | WO 98/56890 A1 | 12/1998 |

* cited by examiner

*Primary Examiner*—Kuo-Liang Peng
(74) *Attorney, Agent, or Firm*—Jason J. Camp; David V. Upita

(57) ABSTRACT

Silicone emulsion comprising: at least about 0.025% and less than about 10% of silicone oil; an active amount to emulsify said silicone oil and reduce surface tension of said composition of a surfactant system; and a an effective amount of a buffering system to maintain a pH of said composition to be at least about 6 for a period of at least about 3 months, are useful for controlling wrinkles in fabrics.

12 Claims, No Drawings

STABLE SILICONE OIL EMULSION COMPOSITION, ARTICLE OF MANUFACTURE, AND METHOD OF FABRIC WRINKLE CONTROL

This application claims benefit of Provisional Appl. 60/145,632, filed Jul. 26, 1990.

TECHNICAL FIELD

The present invention relates to formulating stable silicone oil emulsions for fabric care compositions for treating fabrics and methods for treating fabrics in order to improve various properties of fabrics, in particular, reduction or removal of unwanted wrinkles.

BACKGROUND OF THE INVENTION

Wrinkles in textile fabrics are caused by the bending and creasing of the textile material which places an external portion of a filament in a yarn under tension while the internal portion of that filament in the yarn is placed under compression. Particularly with cotton fabrics, the hydrogen bonding that occurs between the cellulose molecules contributes to keeping wrinkles in place. The wrinkling of fabric, in particular clothing and certain household fabrics, is therefore subject to the inherent tensional elastic deformation and recovery properties of the fibers which constitute the yarn and fabrics.

In the modern world, with the increase of hustle and bustle and travel, there is a demand for a quick fix which will help to diminish the labor involved in home laundering and/or the cost and time involved in dry cleaning or commercial laundering. This has brought additional pressure to bear on textile technologists to produce a product that will sufficiently reduce wrinkles in fabrics, especially clothing and household fabrics, and to produce a good appearance through a simple, convenient application of a product.

U.S. Pat. No. 5,532,023, issued Jul. 2, 1996 to Vogel, Wahl, Cappel and Ward discloses aqueous wrinkle control compositions containing non-volatile silicone and film forming polymer. Preferred silicones include reactive silicones and amino-functional silicone, known as "amodimethicone". The composition containing such silicones is applied to fabric from a spray dispenser. It is found that in the spray treatment, an appreciable amount of the aqueous composition misses the fabric, and instead falls on flooring surfaces, such as rugs, carpets, concrete floors, tiled floors, linoleum floors, bathtub floors, which leaves a silicone layer that is accumulated on and/or cured on and/or bonded to the flooring surfaces. Such silicones that are accumulated on such surfaces, and especially those that are bonded to such surfaces are difficult to remove. Flooring surfaces thus become slippery and can present a safety hazard to the household members. U.S. Pat. No. 5,573,695, issued Nov. 12, 1996 to E. F. Targosz discloses an aqueous wrinkle removal composition containing a vegetable oil based cationic quaternary ammonium surfactant, and an anionic fluorosurfactant. Similarly, U.S. Pat. No. 4,661,268, issued Apr. 28, 1987 to Jacobson et al. discloses a wrinkle removal spray comprising an aqueous alcoholic composition containing a dialkyl quaternary ammonium salt and a silicone surfactant and/or a fluoro surfactant. U.S. Pat. No. 5,100,566, issued Mar. 31, 1992 to Agbomeirele et al., discloses a method of reducing wrinkles in fabric by spraying the fabric with an aqueous alcoholic solution of an anionic siliconate alkali metal salt. U.S. Pat. No. 4,806,254, issued Feb. 21, 1989 to J. A. Church discloses fabric wrinkle removal aqueous alcoholic solution containing glycerine and a nonionic surfactant. These patents are incorporated herein by reference.

The present invention reduces wrinkles in fabrics, including clothing, dry cleanables, linens, bed clothes, draperies, window curtains, shower curtains, table linens, and the like, without the need for ironing. The present invention can be used on wet, damp, or dry clothing to relax wrinkles and give clothes a ready to wear or use look that is demanded by today's fast paced world. The present invention also essentially eliminates the need for touch up ironing usually associated with closet, drawer, and suitcase storage of garments.

In a preferred aspect, an additional benefit of the composition of the present invention is an improved garment shape, body, rewrinkle prevention, and crispness.

When ironing is desired however, the composition of the present invention can also act as an excellent ironing aid. The present invention makes the task of ironing easier and faster by plasticizing fabric fibers and thus making it easier to work wrinkles out of the fabric. When used as an ironing aid, the compositions of the present invention help produce a crisp, smooth appearance, but also retaining a quality of softness.

Silicone oil emulsion compositions tend to be highly unstable, especially in regard to the long-term shelf stability of silicone oil emulsion compositions. As a result, such compositions have not achieved wide-spread use in the area of controlling wrinkles on fabric, as well as in other areas. It has thus been a desire of those skilled in the art to develop a silicone oil emulsion composition that remains stable over relatively long periods of time.

SUMMARY OF THE INVENTION

The present invention relates to stable silicone oil emulsion compositions that are preferably well dispersed, preferably translucent, and even more preferably clear, aqueous fabric wrinkle controlling compositions. The present invention further relates to methods of formulating such compositions, as well as fabric wrinkle control methods and articles of manufacture that comprise such fabric wrinkle controlling compositions. The fabric wrinkle control compositions typically comprise:

(A) an effective amount to control wrinkles in fabric of a silicone oil, preferably selected from the group consisting of essentially hydrophobic silicones, silicones fluid at room temperature such as volatile silicones, and mixtures thereof; wherein the silicone oil is preferably present at a level of at least about 0.025%, more preferably at least about 0.05%, even more preferably at least about 0.1%, and still more preferably at least about 0.5%, and at a level of no greater than about 10%, more preferably no greater than about 5%, even more preferably no greater than about 3%, and still more preferably no greater than about 1.5% by weight of the usage composition;

(B) an effective amount to emulsify the silicone oil and reduce surface tension of the composition of a surfactant system, preferably comprising (1) a nonionic silicone surfactant, preferably an ethoxylated polydimethylsiloxane, (2) a conventional nonionic surfactant, preferably an alkyl ethoxylate, and (3) an ionic surfactant, preferably an alkyl sulfate; wherein each surfactant is preferably present at a specific ratio with respect to the silicone oil to achieve maximum stability with the minimal amount of surfactant in order to minimize fabric staining;

(C) an effective amount of a buffering system having effective buffering capacity to prevent the pH of said composition from dropping and thereby to stop and/or diminish the surfactant degradation to therefore prevent instability of said composition and silicone oil creaming out of said composition; wherein the buffering system preferably comprises a compound or compounds that generate an acid-base conjugate pair, or a salt together with an acid or a base, that maintains the pH of the composition to be at least about 6, preferably maintains the pH of the composition to be at least about 7, more preferably maintains the pH of the composition to be at least about 7.5 and even more preferably maintains the pH of the composition to be at least about 8; wherein the buffering system maintains the pH of the composition to be no greater than about 12, preferably no greater than about 10, more preferably no greater than about 9, and even more preferably no greater than about 8.5; wherein the buffering system can further comprise additional salt to achieve and maintain the appropriate pH by increasing ionic strength and thus the buffering capacity of the buffering system; wherein the buffering capacity of the buffering system is preferably at least about 0.01, and more preferably at least about 0.02; wherein the pH is maintained for a period of at least about 3 months, preferably at least about 6 months, more preferably at least about 12 months, even more preferably at least about 18 months, and still more preferably at least about 24 months; and (D) carrier, preferably water.

The preferred clear, or translucent silicone oil emulsion compositions of the present invention can optionally further comprise:

(A) optionally, an effective amount of a supplemental wrinkle control agent selected from the group consisting of (1) fabric (fiber) lubricant, (2) shape retention polymer, (3) lithium salts, (4) hydrophilic plasticizers and (5) mixtures thereof;

(B) optionally, an effective amount to soften fibers and/or soften any shape retention polymer, when present, of hydrophilic plasticizer wrinkle control agent;

(C) optionally, but preferably, at least an effective amount to absorb or reduce malodor, of odor control agent;

(D) optionally, but preferably, an effective amount to provide olfactory effects of perfume;

(E) optionally, an effective amount, to kill, or reduce the growth of microbes, of antimicrobial active;

(F) optionally, an effective amount to provide improved antimicrobial action for, e.g., the antimicrobial active, of aminocarboxylate chelator;

(G) optionally, other ingredients such as adjunct odor-controlling materials, chelating agents, additional antistatic agents if more static control is desired, insect and moth repelling agents, colorants, especially bluing agents, antioxidants; and (H) mixtures of optional components (A) through (G).

The present preferred silicone emulsion compositions are preferably essentially free of any material that would soil or stain fabric under usage conditions, or preferably essentially free of materials at a level that would soil or stain fabrics unacceptably under usage conditions. The buffering system of the present compositions preferably comprises tris (hydroxymethyl)aminomethane and hydrogen chloride. The present compositions are preferably applied as small droplets to fabric when used as a wrinkle spray.

The present invention also relates to concentrated compositions, which are diluted to form compositions with the usage concentrations for use under usage conditions.

The present invention further relates to a method of making the present compositions and to an accelerated stability test method to identify products with preferred stability.

The present invention also relates to articles of manufacture comprising the present compositions incorporated into a container, such as a spray dispenser, that can facilitate treatment of articles and/or surfaces with said compositions containing wrinkle control agent and other optional ingredients at a level that is effective, yet is not discernible when dried on the surfaces. The spray dispenser comprises manually activated and non-manual powered (operated) spray means and a container containing the wrinkle controlling composition. The present articles of manufacture can further comprise a set of instructions to communicate methods of using the present compositions to the consumer.

The present invention also comprises the use of small particle diameter droplets of the present compositions to treat fabrics, in order to provide superior performance, e.g., the method of applying the compositions to fabrics, etc. as very small particles (droplets) preferably having weight average diameter particle sizes (diameters) of from about 5 $\mu$m to about 250 $\mu$m, more preferably from about 10 $\mu$m to about 120 $\mu$m, and even more preferably from about 20 $\mu$m to about 100 $\mu$m.

The present invention also relates to the combining of the composition with a substrate and/or device capable of containing said composition for release at a desirable time in a fabric treatment process to create an article of manufacture. Such articles of manufacture can facilitate treatment of fabric articles and/or surfaces with said compositions containing wrinkle control agent and other optional ingredients at a level that is effective, yet not discernible when dried on the surfaces of said fabric. The article of manufacture can operate by delivering said compositions to surfaces from a mechanical device designed to alter the physical properties of articles and/or surfaces such as, but not limited to, a clothes dryer.

DETAILED DESCRIPTION OF THE INVENTION

The present invention relates primarily to stable silicone oil emulsion compositions, preferably for use in controlling wrinkles in fabrics, and to methods for treating fabrics in order to improve various properties of fabrics, in particular, reduction or removal of unwanted wrinkles. The present compositions are preferably well dispersed, more preferably translucent, and even more preferably clear, and are preferably essentially free of any material that would soil or stain fabric under usage conditions, or preferably essentially free of material at a level that would soil or stain fabric under usage conditions.

The present invention farther relates to fabric wrinkle control methods and articles of manufacture that comprise the present silicone oil emulsion compositions. The present articles of manufacture preferably comprise the present compositions incorporated into a container, preferably a spray dispenser, to facilitate the treatment of fabric surfaces with said silicone oil emulsion compositions comprising silicone oil, surfactant system, buffering system, and other optional ingredients at a level that is effective, yet is not discernible when dried on the surfaces. The spray dispenser can comprise a manually-activated or non-manually powered spray means and container containing the present compositions.

The present invention further relates to methods of making the present compositions and to an accelerated method of measuring stability to identify compositions that will have the most preferred stability profiles.

The present invention also relates to the combining of the composition with a substrate and/or device capable of containing said composition when loaded into it to create an article of manufacture that can facilitate treatment of articles and/or surfaces with said compositions containing wrinkle control agent and other optional ingredients at a level that is effective, yet not discernible when dried on the surfaces by delivering said compositions to said surfaces from a mechanical device designed to alter the physical properties of articles and/or surfaces such as, but not limited to, a clothes dryer.

The present invention also relates to concentrated compositions, wherein the level of wrinkle control agent is from about 1% to about 99%, preferably from about 2% to about 80%, more preferably from about 3% to about 60%, and even more preferably from about 5 to about 20%, by weight of the concentrated composition. The concentrated composition is typically diluted to form usage compositions, with usage concentrations of, e.g., from about 0.025% to about 10%, by weight of the usage composition, of wrinkle control active as given hereinabove. Specific levels of other optional ingredients in the concentrated composition can readily be determined from the desired usage composition and the desired degree of concentration.

I. Composition

Silicone oil emulsions in water are the preferred basis for these wrinkle release/prevention formulations. Silicone oils are effective at lubricating and smoothing fibers which allows fibers to slip or glide past each other, thus releasing wrinkles. Water is inexpensive and effective at breaking hydrogen bonds and silicones are effective at lubricating fibers. Surfactants used in the compositions disclosed within are effective at emulsifying the silicone oils and also have the ability to help fibrils remain flat against the cotton fibers, thus mitigating damage done in the wash process, but also contributing to maintaining smooth fibers that release wrinkles more easily. Although surfactant is critical to stabilizing the silicone emulsion, it is preferred to use the lowest level of surfactant possible to prevent fabric staining. Conversely, it is desirable to maximize the silicone oil level, since silicone oils are a critical component for enhancing wrinkle control. To prevent fabric staining, compositions are formulated such that the surfactant to silicone oil ratio is as low as possible.

Silicone oils are notoriously difficult to emulsify compared to hydrocarbon oils, because the silicone oils are more polar and therefore more water soluble. The silicone oils will tend to dissolve somewhat into water and transport between micelles which can lead to Oswald ripening, a mechanism that can lead to product instability and result in the silicone oil "creaming" out of the emulsion composition. The need to formulate with a particular surfactant to silicone oil ratio that is as low as possible together with the water solubility of the silicone oil means that the formulation is susceptible to loss of stability and creaming if any of the surfactant system is lost via degradative processes.

The preferred surfactant system for emulsifying silicone oil comprises a silicone containing nonionic surfactant, a conventional nonionic surfactant, and an ionic surfactant. A preferred ionic surfactant for use in this system is alkyl sulfate. Ethoxylated surfactants as well as alkyl sulfates have a tendency to degrade in aqueous solutions even under moderate conditions and particularly when the pH of the system is below about 6. It is observed during formulation work that emulsions at pHs below about 6 rapidly degraded resulting in very unstable, extremely cloudy systems, which in many cases actually separated into at least two layers under even ambient conditions. However, it is suprisingly not sufficient to simply adjust the pH above about 6 using a small amount of strong base such as NaOH, as the formulations would simply begin to drift down in pH, a process that became increasing rapid as the system approached a pH below about 5. These systems, although they were initially adjusted to pH's above about 6 also became very unstable and extremely cloudy as the pH drifted downward.

Aqueous compositions can absorb $CO_2$ from the atmosphere and this will cause the pH of an aqueous based formulation to drop below about 6 as the $CO_2$ forms carbonic acid in water and then disassociates (*Chemistry the Central Science*, T. L. Brown and H. E. LeMay, Jr.). Concurrent with this drop in pH and exacerbated by it, nonionic surfactants, such as ethoxylated surfactants, begin to degrade via auto-oxidation ("The Stability of the Polyoxyethylene Chain" by Max Donbrow in Nonionic Surfactants Physical Chemistry, ed. Martin J. Schick, Marcel Dekker, Inc. 1987) and anionic surfactants, such as alkyl sulfate surfactants hydrolyze. When surfactants such as alkyl sulfates hydrolyze, fatty alcohol and sulfuric acid are formed. Although this process is not rapid, sulfuric acid is a very strong acid and so small amounts have a strong impact on unbuffered systems, thus contributing to lowering the pH. While surfactants such as ethoxylated surfactants will auto-oxidize at ambient conditions, the rate of degradation of the ethoxylated surfactants is accelerated at lower pH's, a process that eventually produces carboxylic acids, thus lowering pH and further driving surfactant degradation. Suprisingly, it is found that polyalkylene oxide polysiloxanes which have a very low aqueous surface tension and therefore are particularly preferred for compositions of the present invention are also especially susceptible to degration at lower or higher pH's. Even minimal degradation of surfactants leads to loss of product stability and eventually separation of the oil and aqueous phases, especially in compositions with particular surfactant to silicone oil ratios.

Since it is a goal of this invention and article of manufacture to minimize fabric staining by limiting application to fabric of components likely to cause staining, e.g. surfactants, it is not acceptable to address the formula stability problem by simply increasing surfactant levels. However, it is suprisingly possible to slow or stop degradation of the surfactant system by adding a buffering system with sufficient buffer capacity to prevent the pH drop due to the various chemical processes and thus slow degradation and stabilize compositions. Buffers provide additional benefits by improving stability at both high (about 120° F.) and low (about 0° F.) temperatures which is optimal for shipping of manufactured products. Buffers can also increase the hydrogen-bond breaking effectiveness of the formulations thus contributing to improved wrinkle removal.

It is further interesting to note that nonionic surfactants preferred for compositions disclosed herein tend to be very immiscible in water at levels disclosed herein. It appears to be a property of the silicone oil to improve the miscibility of these surfactants by providing an oil/water interface the surfactants can organize around, thus guaranteeing the polar head groups of the surfactants will be most exposed to the water domain and therefore enhancing the solubility of these surfactants. Just as the surfactant system acts to emulsify the silicone oil, to make the silicone oil miscible in water, the silicone oil also acts to enhance the miscibility of the surfactant system in water. Therefore, it is most advantageous to exercise measures that prevent Oswald ripening because Oswald ripening normally leads to a situation in which the larger emulsion droplets will continue to increase their size and oil content to become larger emulsion droplets at the expense of smaller emulsion droplets which continue to diminish in size and loose oil content. As Oswald ripening continues, the emulsion droplets loosing oil tend to separate from the aqueous phase since the water miscibility of the surfactant is lower than the water miscibility of the surfactant plus oil. Concurrently, the larger droplets tend to coalesce and form even larger emulsion droplets until the surfactant at the interface can no longer contain the oil, which then also separates.

The preferred silicone oil emulsion compositions of the present invention typically comprise:

(A) an effective amount to control wrinkles in fabric of a silicone oil, preferably selected from the group consisting of essentially hydrophobic silicones, silicones fluid at room temperature such as volatile silicones, and mixtures thereof; wherein the silicone oil is preferably present at a level of at least about 0.025%, preferably at least about 0.05%, more preferably at least about 0.1%, even more preferably at least about 0.2%, still more preferably at least about 0.4%, and most preferably at least about 0.5% by weight of the usage composition and at a level of no greater than about 10%, preferably no greater than about 5%, more preferably no greater than about 3%, even more preferably no greater than about 2.7%, still more preferably no greater than about 2%, and most preferably no greater than about 1.5% by weight of the usage composition;

(B) an effective amount to emulsify the silicone oil and reduce surface tension of the composition of a surfactant system, preferably comprising (1) nonionic silicone surfactant, preferably an ethoxylated polydimethylsiloxane, (2) conventional nonionic surfactant, preferably an alkyl ethoxylate, and (3) ionic surfactant, preferably an alkyl sulfate; wherein each surfactant is preferably present at a specific ratio with respect to the silicone oil to achieve maximum stability with the minimal amount of surfactant in order to minimize fabric staining;

(C) an effective amount of a buffering system having effective buffering capacity to prevent the pH of said composition from dropping and thereby to stop and/or diminish the surfactant degradation to therefore prevent instability of said composition and silicone oil creaming out of said composition; wherein the buffering system preferably comprises a compound or compounds that generate an acid-base conjugate pair, or a salt together with an acid or a base, that maintains the pH of the composition to be at least about 6, preferably maintains the pH of the composition to be at least about 7, more preferably maintains the pH of the composition to be at least about 7.5 and even more preferably maintains the pH of the composition to be at least about 8; wherein the buffering system maintains the pH of the composition to be no greater than about 12, preferably no greater than about 10, more preferably no greater than about 9, and even more preferably no greater than about 8.5; wherein the buffering system can further comprise additional salt to achieve and maintain the appropriate pH by increasing ionic strength and thus the buffering capacity of the buffering system; wherein the buffering capacity of the buffering system is preferably at least about 0.01, and more preferably at least about 0.02; wherein the pH is maintained for a period of at least about 3 months, preferably at least about 6 months, more preferably at least about 12 months, even more preferably at least about 18 months, and still more preferably at least about 24 months;

(D) optionally, supplemental wrinkle control agent; preferably selected from the group consisting of fabric lubricants, shape retention polymers, lithium salts, hydrophilic plasticizers, and mixtures thereof;

(E) optionally, odor control agent; preferably selected from the group consisting of cyclodextrin, low molecular weight polyols, metal salts, carbonate salts, bicarbonate salts, enzymes, zeolites, activated carbon, and mixtures thereof;

(F) optionally, perfume; preferably selected from the group consisting of hydrophilic perfume ingredients, low odor detection threshold perfume ingredients, and mixtures thereof;

(G) optionally, antimicrobial active; preferably selected from the group consisting of quaternary compounds, biguanides, and mixtures thereof;

(H) optionally, aminocarboxylate chelator;

(I) optionally, water-soluble polyionic polymers; preferably selected from the group consisting of cationic polymers, anionic polymers, and mixtures thereof;

(J) optionally, antistatic agent;

(K) optionally, insect repellent;

(L) optionally, colorant;

(M) optionally, anti-clogging agent;

(N) an effective amount of carrier; preferably water and preferably greater than about 80%, more preferably greater than about 90%, and even more preferably greater than about 95% by weight of the composition.

The present silicone emulsion compositions are preferably essentially free of any material that would soil or stain fabric under usage conditions, or at least do not contain such materials at a level that would soil or stain fabrics unacceptably under usage conditions. The buffering system of the present compositions preferably comprise tris (hydroxymethyl)aminomethane and hydrogen chloride. The present compositions are preferably applied as small droplets to fabric when used as a wrinkle spray.

The following describes the ingredients, including optional ingredients, of the present silicone oil emulsion compositions in further detail.

(A) Silicone Oil

As discussed before, the present invention relates to methods for preparing and using compositions which are stable emulsions of silicone oil for fabric wrinkle control that utilize, at least in an effective amount to minimize wrinkles, silicone oil preferably, but not limited to, silicone oils that are fluid at room temperature and especially volatile silicone. Silicone oil is typically included in the present compositions at levels of at least about 0.025%, preferably at least about 0.05%, more preferably at least about 0.1%, even more preferably at least about 0.2%, still more preferably at least about 0.4%, and most preferably at least about 0.5% by weight of the usage composition and typically at levels of no greater than about 10%, preferably no greater than about 5%, more preferably no greater than about 3%, even more preferably no greater than about 2.7%, still more preferably no greater than about 2%, and most preferably no greater than about 1.5% by weight of the usage composition. Silicone oil typically imparts a lubricity and smoothness to fibers that allows them to slip or glide easily past one another and therefore enhances the process of wrinkle release or wrinkle control. Specifically, the preferred silicone oil is dimethylsiloxane silicone, more preferably volatile dimethylsiloxane. The volatile silicones provide surprisingly good fiber lubrication without the risk of unacceptable build-up on the fabric and/or surrounding surfaces due to their volatile nature. The volatile silicones also provide a desirable control over the formation of wrinkles in fabrics while the fabrics are being dried.

Nonlimiting examples of useful silicones in the compositions of the present invention include noncurable silicones such as volatile silicones and polydimethylsilicone, and curable silicones such as aminosilicones, phenylsilicones and hydroxysilicones. Also useful in the present compositions are silicone emulsions that comprise silicone oils such as 346 Emulsion, 347 Emulsion, and HV-490 available from Dow Corning. Preferably, the silicones are hydrophobic, and are neither irritating, toxic, nor otherwise harmful when applied to fabric or when they come in contact with human skin, and are chemically stable under normal use and storage conditions, and are capable of being deposited on fabric.

When the composition of this invention is to be dispensed from a spray dispenser in a consumer household setting, the noncurable silicones such as polydimethylsilicone, and especially the volatile silicones, are preferred. Curable and/ or reactive silicones such as amino-functional silicones and silicones with reactive groups such as Si—OH, Si—H, silanes, and the like, are not preferred in this situation, because the portion of the composition that is sprayed but misses the garment, and falls instead on flooring surfaces, such as rug, carpet, concrete floor, tiled floor, linoleum floor, bathtub floor, can leave a silicone layer that is cured and/or bonded to the flooring surfaces. Such silicones that are bonded to surfaces are difficult to remove from the flooring surfaces. The flooring surfaces thus become slippery and can present a safety hazard to the household members. The curable and reactive silicones can be used in compositions specifically designed for use in enclosed areas such as in a dewrinkling enclosure, e.g., cabinet. Many types of amino-functional silicones also cause fabric yellowing. Thus, the silicones that cause fabric discoloration are also not preferred. Indeed, the present compositions are preferably essentially free of any material that would soil or stain fabrics or are essentially free of material at a level that would soil or stain fabrics.

The preferred silicone is volatile silicone fluid which can be cyclic silicone fluid of the formula $[(CH_3)_2SiO]_n$ where n ranges between about 3 to about 7, preferably about 5, or a linear silicone polymer fluid having the formula $(CH_3)_3SiO[(CH_3)_2SiO]_mSi(CH_3)_3$ where m can be 0 or greater and has an average value such that the viscosity at 25° C. of the silicone fluid is preferably about 5 centistokes or less.

The non-volatile silicones that are useful in the composition of the present invention are polyalkyl and/or phenyl-silicones silicone fluids and gums with the following structure:

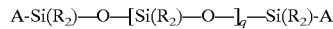

The alkyl groups substituted on the siloxane chain (R) or at the ends of the siloxane chains (A) can have any structure as long as the resulting silicones remain fluid at room temperature.

Each R group preferably can be alkyl, aryl, hydroxy, or hydroxyalkyl group, and mixtures thereof, more preferably, each R is methyl, ethyl, propyl or phenyl group, most preferably R is methyl. Each A group which blocks the ends of the silicone chain can be hydrogen, methyl, methoxy, ethoxy, hydroxy, propoxy, and aryloxy group, preferably methyl. Suitable A groups include hydrogen, methyl, methoxy, ethoxy, hydroxy, and propoxy. q is preferably an integer from about 7 to about 8,000. The preferred silicones are polydimethyl siloxanes; more preferred silicones are polydimethyl siloxanes having a viscosity of from about 50 to about 1,000,000 centistokes at 25° C. Mixtures of volatile silicones and non-volatile polydimethyl siloxanes are also preferred. Suitable examples include silicones offered by Dow Corning Corporation under the trade names 200 Fluid and 245 Fluid, and the General Electric. Company under the trade names SF1173, SF1202, SF1204, SF96, and Viscasil®.

Other useful silicone materials, but less preferred than polydimethylsiloxanes, include materials of the formula:

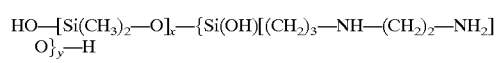

wherein x and y are integers which depend on the molecular weight of the silicone, preferably having a viscosity of from about 10,000 cst to about 500,000 cst at 25° C. This material is also known as "amodimethicone". Although silicones with a high number, e.g., greater than about 0.5 millimolar equivalent of amine groups can be used, they are not preferred because they can cause fabric yellowing.

Similarly, silicone materials which can be used correspond to the formulas:

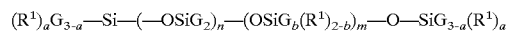

wherein G is selected from the group consisting of hydrogen, phenyl, OH, and/or $C_1$-$C_8$ alkyl; a denotes 0 or an integer from 1 to 3; b denotes 0 or 1; the sum of n+m is a number from 1 to about 2,000; $R^1$ is a monovalent radical of formula $C_pH_{2p}L$ in which p is an integer from 2 to 8 and L is selected from the group consisting of:
—N($R^2$)CH$_2$—CH$_2$—N($R^2$)$_2$;
—N($R^2$)$_2$;
—N$^+$($R^2$)$_3$A$^-$; and
—N$^+$($R^2$)CH$_2$—CH$_2$N$^+$H$_2$A$^-$ wherein each $R^2$ is chosen from the group consisting of hydrogen, phenyl, benzyl, saturated hydrocarbon radical, and each A$^-$ denotes compatible anion, e.g., a halide ion; and

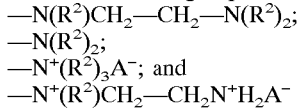

wherein
Z=—CH$_2$—CH(OH)—CH$_2$O—CH$_2$)$_3$—
$R^3$ denotes a long chain alkyl group; and
f denotes an integer of at least about 2.

In the formulas herein, each definition is applied individually and averages are included.

Another silicone material which can be used, but is less preferred than polydimethyl siloxanes, has the formula:

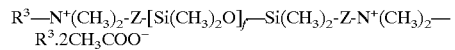

wherein n and m are the same as before. The preferred silicones of this type are those which do not cause fabric discoloration.

Alternatively, the silicone material can be provided as a moiety, or a part, of a non-silicone molecule. Examples of such materials are copolymers having siloxane macromers grafted thereto, which meet the functional limitations as defined above. That is, the non-silicone backbone of such polymers should have a molecular weight of from about 5,000 to about 1,000,000, and the polymer should preferably have a glass transition temperature (Tg), i.e., the temperature at which the polymer changes from a brittle vitreous state to a plastic state, of greater than about −20° C.

(B) Surfactant System

Surfactant is a necessary ingredient for emulsifying silicone oil. Surfactant is also useful in the present compositions to facilitate the dispersion, emulsification and/or solubilization of supplemental wrinkle control agents, which are optional in the present compositions, such as certain relatively water insoluble shape retention polymers. The surfactant can provide some plasticizing effect to the shape retention polymers resulting in a more flexible polymer network. Surfactant can also provide a low surface tension that permits the composition to spread readily and more uniformly on hydrophobic surfaces like polyester and nylon. Surfactants also help the composition penetrate fibers more thoroughly to provide hydrogen bond breaking, lubricity and plasticity at every level of the fiber structure. Surfactants are also useful when the composition is used in a spray dispenser and/or a dispenser for use in a clothes dryer other fabric modifying machine in order to enhance the spray and/or dispensing characteristics of the composition and allow the composition to distribute more evenly, and to prevent clogging of the spray apparatus and/or dispenser apparatus. The spreading of the composition can also allow it to dry faster, so that the treated material is ready to use sooner. For concentrated compositions, the surfactant facilitates the dispersion of many actives such as antimicrobial actives and perfumes in the concentrated aqueous compositions.

Effective surfactant systems normally employ a combination of surfactants, so as to achieve effective emulsification of the silicone oil with the minimal amount of surfactant. An effective surfactant system preferably comprises (1) a nonionic silicone surfactant, (2) a conventional nonionic surfactant, and (3) an ionic surfactant. Typically each type of surfactant is included at a particular ratio with respect to the silicone oil so as to achieve maximum emulsion stability with the minimal amount of surfactant, thus eliminating any staining incidents. The surfactant components are described in detail below.

(1) Nonionic Silicone Surfactant

A preferred, but nonlimiting class of nonionic silicone surfactants are the polyalkylene oxide polysiloxanes particularly those that have an aqueous surface tension of below about 32 mN/m, more preferably below about 30 mN/m, and even more preferably below about 25 mN/m. Typically the polyalkylene oxide polysiloxanes have a dimethyl polysiloxane hydrophobic moiety and one or more hydrophilic polyalkylene side chains, and are described by the general formula:

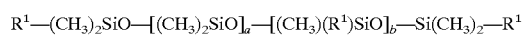

wherein a+b are from about 1 to about 50, preferably from about 1 to about 30, more preferably from about 1 to about 25, and each $R^1$ is the same or different and is selected from the group consisting of methyl and a poly(ethyleneoxide/propyleneoxide) copolymer group having the general formula:

with at least one $R^1$ being a poly(ethyleneoxy/propyleneoxy) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 7 to about 100 and each $R^2$ is the same or different and is selected from the group consisting of hydrogen, an alkyl having 1 to 4 carbon atoms, and an acetyl group, preferably hydrogen and/or methyl group. Each polyalkylene oxide polysiloxane has at least one $R^1$ group being a poly(ethyleneoxide/propyleneoxide) copolymer group.

Nonlimiting examples of these type of surfactants are the Silwet® surfactants which are available OSI Specialties Inc., a Division of Witco, Danbury, Conn. Representative Silwet® surfactants which contain only ethyleneoxy ($C_2H_4O$) groups are as follows.

| Name | Average MW | Average a + b | Average total c |
|---|---|---|---|
| L-7608 | 600 | 1 | 8 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |
| L-7622 | 10,000 | 88 | 75 |

Nonlimiting examples of Silwet® surfactants which contain both ethyleneoxy ($C_2H_4O$) and propyleneoxy ($C_3H_6O$) groups are as follows:

| Name | Average MW | EO/PO ratio |
|---|---|---|
| L-720 | 12,000 | 50/50 |
| L-7001 | 20,000 | 40/60 |
| L-7002 | 8,000 | 50/50 |
| L-7210 | 13,000 | 20/80 |
| L-7200 | 19,000 | 75/25 |
| L-7220 | 17,000 | 20/80 |

Some nonlimiting preferred Dow Comings® polyalkylene oxide polysiloxanes include Dow Coming® 190 Dow Coming® Q2-5211. Other nonlimiting examples of polyalkylene oxide polysiloxanes useful in the present invention include include the following compounds available from Dow Coming® 193, FF-400 Fluid, Q2-5220, Q4-3667, as well as compounds available from Toray Dow Coming Silicone Co., Ltd. know as SH3771C, SH3772C, SH3773C, SH3746, SH3748, SH3749, SH8400, SF8410, and SH8700, KF351 (A), KF352 (A), KF354 (A), and KF615 (A) of Shin-Etsu Chemical Co., Ltd., TSF4440, TSF4445, TSF4446, TSF4452 of Toshiba Silicone Co and the following compound GE Silicones SF1288,.

The molecular weight of the polyalkyleneoxy group ($R_1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units (—$C_2H_4O$) in the polyether chain ($R^1$) must be sufficient to render the polyalkylene oxide polysiloxane water dispersible or water soluble. If propyleneoxy groups are present in the polyalkylenoxy chain, they can be distributed randomly in the chain or exist as blocks. Surfactants which contain only propyleneoxy groups without ethyleneoxy groups are not preferred. Preferred polyalkylene oxide polysiloxanes surfactants have an aqueous surface tension below about 32 mN/m, such as Silwets® L-7657 and L-7605 even more preferred are polyalkylene oxide polysiloxanes surfactants with a surface tension below about 30 mN/m, such as L-7602 and L-7604, and most preferred are polyalkylene oxide polysiloxanes with an aqueous surface tension below about 25 mN/m such as Silwet® L-77 and L-7280 and Dow Coming Q2-5211. Mixtures of Silwet® surfactants with preferred properties are also preferred. Besides surface activity, polyalkylene oxide polysiloxane surfactants can also provide other benefits, such as antistatic benefits, lubricity, softness to fabrics, and improvements in fabric appearance.

The preparation of polyalkylene oxide polysiloxanes is well known in the art. Polyalkylene oxide polysiloxanes of the present invention can be prepared according to the procedure set forth in U.S. Pat. No. 3,299,112, incorporated herein by reference. Typically, polyalkylene oxide -polysiloxanes of the surfactant blend of the present invention are readily prepared by an addition reaction between a hydrosiloxane (i.e., a siloxane containing silicon-bonded hydrogen) and an alkenyl ether (e.g., a vinyl, allyl, or methallyl ether) of an alkoxy or hydroxy end-blocked polyalkylene oxide). The reaction conditions employed in addition reactions of this type are well known in the art and in general involve heating the reactants (e.g., at a temperature of from about 85° C. to 110° C.) in the presence of a platinum catalyst (e.g., chloroplatinic acid) and a solvent (e.g., toluene).

The nonionic silicone surfactant is typically incorporated in the present compositions based on the amount of silicone oil in the composition, wherein the ratio of nonionic silicone surfactant:silicone oil, by weight, is typically no greater than about 3:1, preferably no greater than about 2.5:1, more preferably no greater than about 2.0:1, even more preferably no greater than about 1.5:1, still more preferably no greater than about 1.2:1, and most preferably no greater than about 1:1. The ratio of nonionic silicone surfactant:silicone oil, by weight, is typically at least about 0.01:1, preferably at least about 0.1:1, more preferably at least about 0.25:1, still more preferably at least about 0.5:1, and most preferably at least about 0.8:1.

(2) Conventional Nonionic Surfactant

A preferred, but nonlimiting, type of conventional nonionic surfactant is alkyl ethoxylated surfactant, such as addition products of ethylene oxide with fatty alcohols, fatty acids, fatty amines, etc. Optionally, addition products of mixtures of ethylene oxide and propylene oxide with fatty alcohols, fatty acids, fatty amines can be used. The ethoxylated surfactant includes compounds having the general formula:

$$R^8\text{-Z-CH}_2\text{CH}_2\text{O})_s\text{B}$$

wherein $R^8$ is an alkyl group or an alkyl aryl group, selected from the group consisting of primary, secondary and branched chain alkyl hydrocarbyl groups, primary, secondary and branched chain alkenyl hydrocarbyl groups, and/or primary, secondary and branched chain alkyl- and alkenyl-substituted phenolic hydrocarbyl groups having from about 6 to about 20 carbon atoms, preferably from about 8 to about 18, more preferably from about 10 to about 15 carbon atoms; s is an integer from about 2 to about 45, preferably from about 2 to about 20, more preferably from about 2 to about 15; B is hydrogen, a carboxylate group, or a sulfate group; and linking group Z is selected from the group consisting of: —O—, —N(R)$_x$—, —C(O)O—, —C(O)N(R)—, —C(O)N(R)—, and mixtures thereof, in which R, when present, is $R^8$, a lower alkyl with about 1 to about 4 carbons, a polyalkylene oxide, or hydrogen, and x is 1 or 2.

The nonionic alkyl ethoxylated surfactants herein are characterized by an HLB (hydrophilic-lipophilic balance) of from about 5 to about 20, preferably from about 6 to about 15.

Nonlimiting examples of preferred alkyl ethoxylated surfactants are:

straight-chain, primary alcohol ethoxylates, with $R^8$ being $C_8$–$C_{18}$ alkyl and/or alkenyl group, more preferably $C_{10}$–$C_{14}$, and s being from about 2 to about 8, preferably from about 2 to about 6;

straight-chain, secondary alcohol ethoxylates, with $R^8$ being $C_8$–$C_{18}$ alkyl and/or alkenyl, e.g., 3-hexadecyl, 2-octadecyl, 4-eicosanyl, and 5-eicosanyl, and s being from about 2 to about 10;

alkyl phenol ethoxylates wherein the alkyl phenols having an alkyl or alkenyl group containing from about 3 to about 20 carbon atoms in a primary, secondary or branched chain configuration, preferably from about 6 to about 12 carbon atoms, and s is from about 2 to about 12, preferably from about 2 to about 8;

branched chain alcohol ethoxylates, wherein branched chain primary and secondary alcohols (or Guerbet alcohols) which are available, e.g., from the well-known "OXO" process, or modification thereof, are ethoxylated.

Especially preferred are alkyl ethoxylate surfactants with each $R^8$ being $C_8$–$C_{16}$ straight chain and/or branch chain alkyl and the number of ethyleneoxy groups s being from about 2 to about 6, preferably from about 2 to about 4, more preferably with $R^8$ being $C_8$–$C_{15}$ alkyl and s being from about 2.25 to about 3.5. These nonionic surfactants are characterized by an HLB of from 6 to about 11, preferably from about 6.5 to about 9.5, and more preferably from about 7 to about 9. Nonlimiting examples of commercially available preferred surfactants are Neodol 91-2.5 ($C_9$–$C_{10}$, s=2.7, HLB=8.5), Neodol 23-3 ($C_{12}$–$C_{13}$, s=2.9, HLB=7.9) and Neodol 25-3 ($C_{12}$–$C_{15}$, s=2.8, HLB=7.5). It is found, very surprisingly, that these preferred surfactants which are themselves not very water soluble (0.1% aqueous solutions of these surfactants are not clear), can at low levels, effectively emulsify and or disperse silicone oils and these surfactants can also solubilize and/or disperse shape retention polymers such as copolymers containing acrylic acid and tert-butyl acrylate into clear compositions, even without the presence of a low molecular weight alcohol.

Other useful nonionic alkyl alkoxylated surfactants are ethoxylated alkyl amines derived from the condensation of ethylene oxide with hydrophobic alkyl amines, with $R^8$ having from about 8 to about 22 carbon atoms and s being from about 3 to about 30.

Other examples of useful ethoxylated surfactant include carboxylated alcohol ethoxylate, also known as ether carboxylate, with $R^8$ having from about 12 to about 16 carbon atoms and s being from about 5 to about 13; ethoxylated alkyl amine or quaternary ammonium surfactants, $R^8$ having from about 8 to about 22 carbon atoms and s being from about 3 to about 30, such as PEG-S cocomonium methosulfate, PEG-15 cocomonium chloride, PEG-15 oleammonium chloride and bis(polyethoxyethanol) tallow ammonium chloride.

Additional suitable nonionic surfactants include surfactants derived from carbohydrates such as sorbitan esters, especially sorbitan monoesters, also alkyl glucosides, and alkyl polyglucosides. A specific description of many surfactants which are derived from carbohydrates can be found in *Handbook of Surfactants*, M. R. Porter, 1991, Blackie & Son Ltd, pp. 142–145. Glucamines are additional examples of surfactants derived from carbohydrates and are included herein by reference to U.S. Pat. No. 5,194,639 issued Mar. 16, 1993 to D. S. Connor, J. J. Scheibel, and R. G. Severson; U.S. Pat. No. 5,338,487 issued Aug. 16, 1993 to D. S. Connor, J. J. Scheibel, and J.-N. Kao; U.S. Pat. No. 5,489, 393 issued Feb. 6, 1996 to D. S. Connor, J. J. Scheibel, and Y. C. Fu; and U.S. Pat. No. 5,512,699 issued Apr. 30, 1996 to D. S. Connor, Y. C. Fu, and J. J. Scheibel. Preferred alkyl polyglucosides are those having aqueous surface tension below about 35 mN/m such as AG 6202 and AG6210 from Akzo Nobel Chemicals, Inc., Chicago, Ill.

The conventional nonionic surfactant is typically incorporated in the present compositions at a level based on the amount of silicone oil in the composition, wherein the ratio of conventional nonionic surfactant:silicone oil, by weight, is typically no greater than about 1.0:1, preferably no greater than about 0.8:1, more preferably no greater than about 0.75:1, even more preferably no greater than about 0.5:1, still more preferably no greater than about 0.25:1, and most preferably no greater than about 0.2:1. The ratio of conventional nonionic surfactant:silicone oil, by weight, is typically at least about 0.001:1, preferably at least about 0.01:1, more preferably at least about 0.025:1, still more preferably at least about 0.05:1, and most preferably at least about 0.1:1.

(3) Ionic Surfactant

Ionic surfactants are a highly preferred, and often a necessary, essential ingredient within compositions disclosed herein to aid in solubilizing sparing soluble, but preferred, nonionic surfactants. Ionic surfactants tend to improve the water miscibility, dispersibility, and/or solubility of such nonionic surfactants, especially the more sparingly soluble nonionic surfactants by forming comicelles to slow or prevent condensation of the nonionics. Normally, a 2% solution of a sparingly soluble nonionic surfactant, such as Silwet® L77, will be cloudy indicating separation of surfactant particles from water. Addition of small amounts of ionic surfactants, e.g. less than about 1%, into an approximately 2% solution of sparingly soluble nonionic solution will usually cause the solution to become clear, indicating that the nonionic surfactant is more miscible, dispersed in smaller particles, and/or more soluble in combination with the ionic surfactant. Combination of ionic surfactant with the nonionic surfactants also results in improved emulsion stability especially at the minimal surfactant to silicone oil ratios useful for this invention. A co-micelle that is formed between the nonionic and the ionic surfactant typically has a greater charge versus a micelle composed of only nonionic surfactants. The greater charge on the co-micelles causes emulsion droplets/particles to repel each other thus slowing or preventing coalescence of droplets and eventual phase separation, particular at higher temperatures where this type of behavior is typically accelerated.

Nonlimiting preferred ionic surfactants are the class of anionic surfactants. Anionic surfactants are preferred ionic surfactants since they are least likely to leave residues. Alkyl sulfates are a particularly preferred, but nonlimiting, class of anionic surfactants for use in compositions disclosed herein. Many suitable nonlimiting examples from the class of anionic surfactants can be found in *Surfactants and Interfacial Phenomena*, $2^{nd}$ Ed., Milton J. Rosen, 1989, John Wiley & Sons, Inc., pp. 7–16, which is hereby incorporated by reference. Additional suitable nonlimiting examples of anionic surfactants can be found in *Handbook of Surfactants*, M. R. Porter, 1991, Blackie & Son Ltd, pp. 54–115 and references therein, the disclosure of which is incorporated herein by reference.

Structurally, suitable anionic surfactants contain at least one hydrophobic moiety and at least one hydrophilic moiety. The surfactant can contain multiple hydrophobic moieties and/or multiple hydrophilic moieties, but preferably less than or equal to about 2 hydrophobic moieties and less than or equal to about 3 hydrophilic moieties. The hydrophobic moiety is typically comprised of hydrocarbons either as an alkyl group or an alkyl-aryl group. Alkyl groups typically contain from about 6 to about 22 carbons, preferably about 10 to about 18 carbons, and more preferably from about 12 to about 16 carbons; aryl groups typically contain alkyl groups containing from about 4 to about 6 carbons. Each alkyl group can be a branched or linear chain and is either saturated or unsaturated. A typical aryl group is benzene. Some typical hydrophilic groups for anionic surfactants include but are not limited to $-CO_2^-$, $-OSO_3^-$, $-SO_3^+$, $-(OR_1)_x-CO_2^+$, $-(OR_1)_x-OSO_3^+$, $-(OR_1)_x-SO_3^-$. With x being less than about 10 and preferably less than about 5. Some nonlimiting examples of suitable surfactants includes, Stepanol® WAC, Biosoft® 40 (Stepan Co., Northfield, Ill.).

Other suitable ionic surfactants include the cationic and amphoteric surfactants. Nonlimiting examples of these classes of surfactants can be found in *Handbook of Surfactants*, M. R. Porter, 1991, Blackie & Son Ltd, pp. 179–202 as well as in *Surfactants and Interfacial Phenomena*, $2^{nd}$ Ed., Milton J. Rosen, 1989, John Wiley & Sons, Inc., pp. 17–20 and pp. 28–31 and references therein, the disclosures of which are hereby incorporated herein by reference.

The ionic surfactant is typically incorporated in the present compositions at a level based on the amount of silicone oil in the composition, wherein the ratio of ionic surfactant:silicone oil, by weight, is typically no greater than about 0.5:1, preferably no greater than about 0.3:1, more preferably no greater than about 0.2:1, still more preferably no greater than about 0.1:1, and most preferably no greater than about 0.04:1. The ratio of ionic surfactant:silicone oil, by weight, is typically at least about 0.0001:1, preferably at least about 0.001:1, more preferably at least about 0.002:1, still more preferably at least about 0.01:1, and most preferably at least about 0.02:1. When optional ingredients (e.g. anti-microbials, aminocarboxylate chelators) in the said composition are charged it is preferable to match the charge of the surfactant to the charge of other ingredients to prevent precipitation of the surfactant with other ingredients.

(C) Buffering System

To reduce staining potential during consumer use, the amount of surfactant is reduced to the minimum level needed in order to emulsify the silicone oil. Surprisingly, over time, the pH of the composition drops, emulsion stability is lost, and separation and creaming occur. The loss of emulsion stability can be related to surfactant degradation. Since the amount of surfactant used is minimized as much as possible, any loss of surfactant due to degradation can cause a loss of emulsion stability. Surfactant degradation is both caused by and causes the pH to drop. Buffers can be used to stabilize the pH at a suitably high level to prevent and/or minimize surfactant degradation. Silicone oils, which are more polar than hydrocarbon oils, also tend to be more water soluble versus hydrocarbon oils and therefore are harder to emulsify by nature and more susceptible to processes such as Oswald ripening. Therefore any loss of surfactant for emulsification in a silicone oil emulsion is critical. The slightly more soluble nonionic silicone surfactant will typically transport through water and migrate to another emulsion droplet. By this process, know as Oswald ripening, larger emulsion droplets continue to grow and smaller emulsion droplets continue to shrink. This process typically leads to emulsion instability resulting in separation within the composition and/or creaming of the silicone oil out of the composition matrix. Surprisingly, for compositions disclosed herein, it is found that if the composition is made with a pH lower than about 6 or if compositions initially has a pH above about 6 but that pH drops below about 6, instability, and in some cases creaming, can occur. It is found that simply adjusting compositions to an appropriate pH above about 6 is not sufficient to prevent the pH from dropping below about 6 which then leads to composition instability and creaming. Compositions containing water which are made with a pH about equal to or above 6, can go through a pH drop due to the absorption of $CO_2$ from the atmosphere. As $CO_2$ is absorbed into an aqueous environment, $CO_2$ forms carbonic acid which disassociates to form $H^+$ and $HCO_3^-$ and $CO_3^{-2}$. As the pH drops, this increases the likelihood of surfactant degradation. Alkyl sulfate hydrolyses and the rate of this hydrolysis is typically increased as the pH decreases. Additionally, as the alkyl sulfate hydrolyzes, it forms fatty alcohol and sulfuric acid, which is an extremely strong acid and therefore can have a significant impact on reducing the pH of an aqueous system, thus the alkyl sulfate hydrolysis stimulates further alkyl sulfate hydrolysis by contributing to the reduction of the pH of the composition. Also, ethoxylated chemicals, such as the ethoxylated silicone surfactants and various preferred conventional nonionic surfactants, are normally susceptible to auto-oxidation. This process is also catalyzed by low pH. Additionally, auto-oxidation of ethoxylated chemicals, eventually results in the formation of carboxylic acids, which promote a drop in the pH of a system over time (see "Stability of the Polyxoyethylene Chain" by M. Donbrow pp 1011–1067 in *Nonionic Surfactant. Physical Chemistry*, ed. M. J. Schick, Marcel Dekker, Inc., 1987) thus, again, the auto-oxidation of ethoxylated compounds promotes further auto-oxidation. Loss of even small amounts of any surfactant in these compositions is critical and results in a loss of stability because the minimum amount of surfactant necessary to achieve a stable emulsion is used to prevent staining on fabric. Clearly, it is highly advantageous to stop or slow surfactant degradation.

In order to prevent pH drops which contribute to accelerating the rate of surfactant degradation, it is essential to buffer the composition with sufficient buffer capacity to absorb acid introduced by continual absoption of carbon dioxide. Suprisingly, simply adjusting the pH of the system to about 8 or above using a small amount of strong bases alone, such as NaOH, or using small doses of weaker bases, such as triethanolamine, is insufficient to provide the necessary amount of buffering capacity to prevent the pH from dropping to a point which leads to the initiation of the self-inducing surfactant degradation resulting in instability and creaming.

Buffering capacity is related to having a sufficient level or concentration of a buffering system in the composition to prevent large changes in pH as acids or bases are added to a buffered system. Buffering capacity is typically expressed as dB/dpH which is a unitless, positive number representing the gram equivalents per liter of strong acid or base which must be added to a system to effect a change in the pH of the system by one unit. The buffering capacity is related to the initial pH of the system as well as the disassociation constant and the concentration of the buffer.

Buffering capacity of a system, in this case the present compositions, can be calculated from the following equation:

$$dB/dpH = 2.3\ K_a C[H^+]/(K_a+[H^+])^2$$

wherein $K_a$=the ionization constant of the buffer, C=the concentration of the buffer and $[H^+]$=the initial concentration of the hydrogen ion in the composition. As an example, simply adjusting the pH using a weak base, like triethanolamine, is not sufficient to provide necessary buffering capacity to this system, and the above calculation is performed for the amount of triethanolamine necessary to raise the pH of the a composition from pH=6.8 (a typical pH for the deionized water used to formulate the said composition) to pH=9, a preferred pH level for the said composition. For triethanolamine the $K_a=1.2\times10^{-8}$ and the initial=$1\times10^{-9}$. The amount of triethanolamine necessary to raise the pH from 6.8 to 9 is 0.1 g per liter or $6.7\times10^{-4}$. The buffering capacity of the above system is equal to:

$$2.3\ (1.2\times10^{-8})(6.7\times10^{-4})(1\times10^{-9})/(1.2\times10^{-8}+1\times10^{-9})_2 = 0.00011$$

This result indicates that a composition where pH is simply raised to a high pH by a base, even a buffering base such as triethanolamine, has very little buffering capacity. The buffering capacity indicates that it takes only 0.00011 gram equivalents per liter of a strong acid to change the pH by one unit. Such a system is not robust to pH drift over time and tends to de-emulsify. The buffering capacity introduces an important concept—the concentration (or level) of the buffer in the composition is important because the concentration of buffer present is directly related to how much hydrogen ion the system can absorb without significant changes in pH. A thorough discussion of buffering capacity and the theory associated with it is given in the treatise "On the Measurement of Buffer Values and on the Relationship of Buffer Value to the Dissociation Constant of the Buffer and the Concentration and Reaction of the Buffer Solution" by Donald D. Van Slyke, *J. Biol. Chem.*, volume 52, pp 525–570, 1922, which is hereby incorporated herein by reference.

Many commonly used buffers are listed and discussed in the book *Buffers for pH and Metal Ion Control* by D. D. Perrin and B. Dempsey (John Wiley & Sons, 1974) and in references therein, which are hereby incorporated by reference. Buffering agents preferred for use in the compositions discussed herein are selected from the group consisting of buffering systems, acid-base conjugate pairs, and salts together with an acid or a base, which are incorporated in the present compositions at a level that maintains the pH of the composition to be at least about 6, preferably at least about 7, and more preferably at least about 7.5, and even more preferably at least about 8 for a period of at least about 3 months, preferably at least about 6 months, more preferably at least about 12 months, even more preferably at least about 18 months, and still more preferably at least about 24 months. Buffering agents are preferably incorporated in the present compositions at a level that maintains the pH of the composition to be no greater than about 12, more preferably no greater than about 10, even more preferably no greater than about 9, and most preferably no greater than about 8.5 for a period of at least about 3 months, preferably at least about 6 months, more preferably at least about 12 months, even more preferably at least about 18 months, and still more preferably at least about 24 months. Some nonlimiting examples of preferred buffer systems include the Tris/HCl pair (Tris=Tris (hydroxymethyl) aminomethane available from the Angus® Chemical Co. St. Louis, Mo.), Borax/HCl (Borax is available from U.S. Borax, Inc., Valencia, Calif.), Diethanolamine/HCl (Diethanolamine is available from Dow Chemial, Midland, Mich.), sodium borate/NaOH (sodium borate is available from U.S. Borax, Inc., Valencia, Calif.), sodium bicarbonate/NaOH (sodium bicarbonate is available from the FMC Corporation, Philadelphia, Pa.), sodium hydrogen phosphate/NaOH (sodium hydrogen phosphate is available from Monsanto, St. Louis, Mo.), sodium carbonate/sodium bicarbonate (sodium carbonate and sodium bicarbonate are available from FMC Corporation, Philadelphia, Pa.), boric acid/NaOH (boric acid is available from U.S. Borax, Inc., Valencia, Calif.), glycine/NaOH (glycine is available from Sigma Chemcial, Inc, St. Louis, Mo.), and KCl/NaOH (KCl is available from North American Chemical Co., Overland Pk., Kans.). Sodium hydroxide is available from FMC Corporation, Philadelphia, Pa. and hydrogen chloride is available from Air Products and Chemicals, Inc., Allentown, Pa.

An effective amount of a buffering system wherein the concentration of all components of the buffering system including the acid-base conjugate pair as well as any salt used to boost the buffering capacity typically constitute from about 0.05% to about 10%, preferably from about 0.02% to about 8%, more preferably from about 0.1% to about 5%, and most preferably from about 0.2% to about 2.5% of the composition by weight. Preferred buffering systems are chosen from the group consisting of, but not limited to, buffering systems, acid-base conjugate pairs, and salts paired with an acid or a base, or self-buffering compounds and together with any salt intended to improve the buffering capacity of the system and utilized at a level that maintains the pH of the composition to be at least about 6, preferably at least about 7, more preferably at least about 7.5, and even more preferably at least about 8 for a period of at least about 3 months, preferably at least about 6 months, more preferably at least about 12 months, even more preferably at least about 18 months, and still more preferably at least about 24 months. The buffering system is utilized in the present compositions at a level that maintains the pH of the composition to be no greater than about 12, more preferably no greater than about 10, even more preferably no greater than about 9, and most preferably no greater than about 8.5. The preferred buffering capacity of the system is at least about 0.01, and more preferably at least about 0.02.

Optional Ingredients

In highly preferred versions, the present silicone oil emulsion compositions can also comprise: (1) optional supplemental wrinkle control agent, (2) optional odor control agent, (3) optional perfume, (4) optional antimicrobial active, (5) optional chelator, e.g. aminocarboxylate chelator, (6) optional water-soluble polyionic polymer, (7) optional antistatic agent, (8) optional insect repellant, (9) optional colorant, (10) optional anti-clogging agent, and (11) mixtures thereof (1) Optional Supplimental Wrinkle Control Agents Optionally an effective amount of a supplemental wrinkle control agent, selected from the groups consisting of (a) fabric (fiber) lubricant, (b) shape retention polymer, (c) lithium salts, (d) hydrophilic plasticizer, and (e) mixtures thereof, can be used in the present compositions to provide further wrinkle control.

Fiber lubricants impart a lubricating property or increased gliding ability to fibers in fabric, particularly clothing. Water and other alcoholic solvents typically break or weaken the hydrogen bonds that hold the wrinkles, and the fabric lubricant facilitates the ability of the fibers to glide on one another to further release the fibers from the wrinkle condition in wet or damp fabric. After the fabric is dried, the residual silicone can provide lubricity to reduce the tendency of fabric rewrinkling.

The shape retention polymers can be natural, or synthetic, and can act by forming a film, and/or by providing adhesive properties. E.g., the present invention can optionally use film-forming and/or adhesive polymer to impart shape retention to fabric, particularly clothing. The preferred shape retention polymer is copolymer containing hydrophilic unsaturated organic mono-carboxylic and polycarboxylic acid monomers, and salts thereof, and mixtures thereof, more preferably copolymer containing hydrophobic monomers and hydrophilic monomers wherein the hydrophilic monomers include unsaturated organic mono-carboxylic and polycarboxylic acid monomers, and salts thereof, and mixtures thereof. The preferred shape retention polymers of the current invention surprisingly provide control of certain amine type malodors on fabrics, in addition to providing the fabric wrinkle control benefit. When the shape retention polymer is present, it is present in least an effective amount to provide wrinkle control and/or shape retention, typically from about 0.05% to about 15%, preferably from about 0.1% to about 5%, more preferably from about 0.2% to about 3%, and even more preferably from about 0.3% to about 1.5%, by weight of the usage composition.

Aqueous compositions comprising lithium salts and/or lithium salt hydrates provide improved fabric wrinkle control. The preferred lithium salt is lithium bromide, lithium lactate, and/or mixtures thereof Useful levels of lithium salts are from about 0.1% to about 10%, preferably from about 0.5% to about 7%, and more preferably from about 1% to about 5%, by weight of the usage composition.

(a) Fabric (Fiber) Lubricant

An effective amount of an optional fabric (fiber) lubricant, is preferably selected from the group consisting of: (i) soluble silicone compounds, (ii) synthetic solid particles (iii) quaternary ammonium compounds, and (iv) mixtures thereof, and can be utilized in the present preferred silicone oil emulsion compositions as described below.

(i) Synthetic Solid Particles

Solid polymeric particles of average particle size smaller than about 10 microns, preferably smaller than 5 microns, more preferably smaller than about 1 Micron, e.g., Velustrol® P-40 oxidized polyethylene emulsion available from Clariant, can be used as a lubricant, also Tospearl™ 105, 120, 130, 145, 240 polydimethyl siloxane polymers available from GE Silicones, since they can provide a "roller-bearing" action. When solid polymeric particles are present, they are present at an effective amount to provide lubrication of the fibers, typically from about 0.01% to about 5%, preferably from about 0.025% to about 3%, more preferably from about 0.05% to about 1.5% and even more preferably from about 0.1% to about 0.5%, by weight of the usage composition.

(ii) Quaternary Ammonium Compounds

Although many quaternary ammonium compounds with alkyl substituents are suitable for this composition, quaternary ammonium compounds that contain hydrocarbon groups, including substituted groups and groups that are part of, e.g., acyl groups, which are unsaturated or branched are particularly suited for this composition. In some cases, amine precursors of the quaternary ammonium compounds can themselves be useful in this composition.

Typical levels of incorporation of the quaternary ammonium compound (active) in the wrinkle composition are of from about 0.025% to about 10% by weight, preferably from about 0.05% to about 5%, more preferably from about 0.1% to about 3%, and even more preferably from about 0.2% to about 2%, by weight of the composition, and preferably is biodegradable as disclosed hereinafter.

Suitable quaternary ammonium compounds for use in the wrinkle composition have been previously disclosed in U.S.

Pat. No. 5,759,990, issued Jun. 2, 1998 in the names of E. H. Wahl, H. B. Tordil, T. Trinh, E. R. Carr, R. O. Keys, and L. M. Meyer, for Concentrated Fabric Softening Composition with Good Freeze/Thaw Recovery and Highly Unsaturated Fabric Softener Compound Therefor, and in U.S. Pat. No. 5,747,443, issued May 5, 1998 in the names of Wahl, Trinh, Gosselink, Letton, and Sivik for Fabric Softening Compound/Composition, said patents being incorporated herein by reference. An indicator of the suitability of quaternary ammonium actives for use in the compositions of the present invention is the phase transition temperature. Preferably, the phase transition temperature of the quaternary ammonium active or mixture of actives, containing less than about 5% organic solvent or water, is less than about 70° C., preferably less than about 50° C., more preferably less than about 35° C., even more preferably less than about 20° C., and yet even more preferably less than about 100° C., or is amorphous and has no significant endothermic phase transition in the region from about −50° C. to about 100° C.

The phase transition temperature can be measured with a Mettler TA 3000 differential scanning calorimeter with Mettler TC 10A Processor.

Typical suitable quaternary ammonium compounds or amine precursors are defined hereinafter.

Preferred Diester Quaternary Ammonium Active Compound (DEQA)

(1) The first type of DEQA preferably comprises, as the principal active, [DEQA (1)] compounds of the formula

wherein each R substituent is either hydrogen, a short chain $C_1$–$C_6$, preferably $C_1$–$C_3$ alkyl or hydroxyalkyl group, e.g., methyl (most preferred), ethyl, propyl, hydroxyethyl, and the like, poly ($C_{2-3}$ alkoxy), preferably polyethoxy, group, benzyl, or mixtures thereof; each m is 2 or 3; each n is from 1 to about 4, preferably 2; each Y is —O—(O)C—, —C(O)—O—, —NR—C(O)—, or —C(O)—NR—; the sum of carbons in each $R^1$, plus one when Y is —O—(O)C— or —NR—C(O)—, is $C_{12}$–$C_{22}$, preferably $C_{14}$–$C_{20}$, with each $R^1$ being a hydrocarbyl, or substituted hydrocarbyl group, and $X^-$ can be any quaternary ammonium-compatible anion, preferably, chloride, bromide, methylsulfate, ethylsulfate, sulfate, and nitrate, more preferably chloride or methyl sulfate (As used herein, the "percent of quaternary ammonium active" containing a given $R^1$ group is based upon taking a percentage of the total active based upon the percentage that the given $R^1$ group is, of the total $R^1$ groups present.);

(2) A second type of DEQA active [DEQA (2)] has the formula:

wherein each Y, R, $R^1$, and $X^-$ have the same meanings as before. Such compounds include those having the formula:

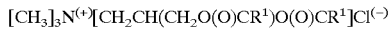

wherein each R is a methyl or ethyl group and preferably each $R^1$ is in the range of $C_{15}$ to $C_{19}$. As used herein, when the diester is specified, it can include the monoester that is present. The amount of monoester that can be present is the same as in DEQA (1).

These types of agents and general methods of making them are disclosed in U.S. Pat. No. 4,137,180, Naik et al., issued Jan. 30, 1979, which is incorporated herein by reference. An example of preferred DEQA (2) is the "propyl" ester quaternary ammonium active having the formula 1,2-di(acyloxy)-3-trimethylammoniopropane chloride, where the acyl is the same as that of $FA^1$ disclosed hereinafter.

Some preferred wrinkle compositions of the present invention contain as an essential component from about 0.025% to about 10%, preferably from about 0.05% to about 5%, more preferably from about 0.1% to about 3%, and even more preferably from about 0.2% to about 2% by weight of the composition, of quaternary ammonium active having the formula:

wherein each $R^1$ in a compound is a $C_6$–$C_{22}$ hydrocarbyl group, typically having an IV from about 10 to about 140, but preferrably from 70 to about 140 based upon the IV of the equivalent fatty acid with the cis/trans ratio preferably being as described hereinafter, m is a number from 1 to 3 on the weight average in any mixture of compounds, each R in a compound is a $C_{1-3}$ alkyl or hydroxy alkyl group, the total of m and the number of R groups that are hydroxyethyl groups equaling 3, and X is a quaternary ammonium compatible anion, preferably methyl sulfate. Preferably the cis-:trans isomer ratio of the fatty acid (of the C18:1 component) is at least about 1:1, preferably about 2:1, more preferably about 3:1, and even more preferably about 4:1, or higher.

These preferred compounds, or mixtures of compounds, have (a) either a Hunter "L" transmission of at least about 85, typically from about 85 to about 95, preferably from about 90 to about 95, more preferably above about 95, if possible, (b) only low, relatively non-detectable levels, at the conditions of use, of odorous compounds selected from the group consisting of: isopropyl acetate; 2,2'-ethylidenebis (oxy)bis-propane; 1,3,5-trioxane; and/or short chain fatty acid (4–12, especially 6–10, carbon atoms) esters, especially methyl esters; or (c) preferably, both.

The Hunter L transmission is measured by (1) mixing the quaternary ammonium active with solvent at a level of about 10% of active, to assure clarity, the preferred solvent being ethoxylated (one mole EO) 2,2,4-trimethyl-1,3-pentanediol and (2) measuring the L color value against distilled water with a Hunter ColorQUEST® colorimeter made by Hunter Associates Laboratory, Reston, Va.

The level of odorant is defined by measuring the level of odorant in a headspace over a sample of the quaternary ammonium active (about 92% active). Chromatograms are generated using about 200 mL of head space sample over about 2.0 grams of sample. The head space sample is trapped on to a solid absorbent and thermally desorbed onto a column directly via cryofocussing at about −100° C. The identifications of materials is based on the peaks in the chromatograms. Some impurities identified are related to the solvent used in the quaternization process, (e.g., ethanol and isopropanol). The ethoxy and methoxy ethers are typically sweet in odor. There are $C_6$–$C_8$ methyl esters found in a typical current commercial sample, but not in the typical quaternary ammonium actives of this invention. These esters contribute to the perceived poorer odor of the current commercial samples. The level of each odorant in ng/L found in the head space over a preferred active is as follows: isopropyl acetate-<1; 1,3,5-trioxane-<5; 2,2'-ethylidenebis (oxy)-bispropane-<1; $C_6$ methyl ester-<1; $C_8$ Methyl ester-<1; and $C_{10}$ Methyl ester-<1.

The acceptable level of each odorant is as follows: isopropyl acetate should be less than about 5, preferably less than about 3, and more preferably less than about 2, nanograms per liter (ηg/L.); 2,2'-ethylidenebis(oxy)bis-propane should be less than about 200, preferably less than about 100, more preferably less than about 10, and even more preferably less than about 5, nanograms per liter (ηg/L.); 1,3,5-trioxane should be less than about 50, preferably less than about 20, more preferably less than about 10, and even more preferably less than about 7, nanograms per liter (ηg/L.); and/or each short chain fatty acid (4–12, especially 6–10, carbon atoms) ester, especially methyl esters should be less than about 4, preferably less than about 3, and more preferably less than about 2, nanograms per liter (ηg/L.).

The elimination of color and odor materials can either be accomplished after formation of the compound, or, preferably, by selection of the reactants and the reaction conditions. Preferably, the reactants are selected to have good odor and color. For example, it is possible to obtain fatty acids, or their esters, for sources of the long fatty acyl group, that have good color and odor and which have extremely low levels of short chain ($C_{4-12}$, especially $C_{6-10}$) fatty acyl groups. Also, the reactants can be cleaned up prior to use. For example, the fatty acid reactant can be double or triple distilled to remove color and odor causing bodies and remove short chain fatty acids. Additionally, the color of a triethanolamine reactant, if used, needs to be controlled to a low color level (e.g., a color reading of about 20 or less on the APHA scale). The degree of clean up required is dependent on the level of use, clarity of the product, and the presence of other ingredients. For example, adding a dye or starting with an opaque product can cover up some colors. However, for clear and/or light colored products, the color must be almost non-detectable. This is especially true as the level of the quaternary ammonium compound used in the product goes up. The degree of clean up would be especially important in products sold as concentrates that are intended for dilution by the consumer. Similarly, the odor can be covered up by higher levels of perfume, but as perfume level increases, cost associated with this approach increases too, also many consumers prefer a product with a lighter scent which precludes the approach of using higher perfume levels. Odor quality can be further improved by use of, e.g., ethanol as the quaternization reaction solvent.

Preferred biodegradable quaternary ammonium compounds comprise quaternary ammonium salt, the quaternary ammonium salt being a quaternized product of the condensation reaction between:
a)-a fraction of saturated or unsaturated, linear or branched fatty acids, or of derivatives of said acids, said fatty acids or derivatives each possessing a hydrocarbon chain in which the number of atoms is between 5 and 21, and
b)-triethanolamine,
characterized in that said condensation product has an acid value, measured by titration of the condensation product with a standard KOH solution against a phenolphthalein indicator, of less than about 6.5.

The acid value is preferably less than or equal to about 5, more preferably less than about 3.

The acid value is determined by titration of the condensation product with a standard KOH solution against a phenolphthalein indicator according to ISO#53402. The Acid Value (AV) is expressed as mg KOH/g of the condensation product.

These quaternary ammonium compounds for use herein are typically mixtures of materials. The weight percentages of compounds wherein one (monoester), two (diester), or three (triester) of the triethanolamine hydroxy groups is esterified with a fatty acyl group are as follows: Monoester—from about 12% to about 22%; diester—from about 43% to about 57%; and triester—from about 13% to about 28%. These compounds, as formed and used in the formulation of wrinkle compositions, typically contain from about 6% to about 20% by weight of solvent, e.g., from about 3% to about 10% of a lower molecular alcohol like ethanol and from about 3% to about 10% of solvent that is more hydrophobic, like hexylene glycol.

Quaternary compounds for use herein can also be mixtures generated by starting with diethanolamine as a starting material. In this case, typical mixtures generated include compounds wherein one (monoester) and two (diester) of the diethanolamine hydroxy groups are esterified with a fatty acyl group as follows: Monoester—from about 5% to about 15%;.and diester from about 85% to about 95%. These compounds as formed and used in the formulation of wrinkle compositions, typically contain from about 6% to about 20% by weight of solvent, e.g., from about 3% to about 20% of lower molecular alcohol like ethanol and/or isopropanol and from about 3% to about 20% of solvent that is more hydrophobic, like hexylene glycol.

Preferred cationic, preferably biodegradable, quaternary, ammonium compounds can contain the group —(O)CR$^1$ which is derived from animal fats, unsaturated, and polyunsaturated, fatty acids, e.g., oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, etc. Non-limiting examples of fatty acids (FA) are listed in U.S. Pat. No. 5,759,990 at column 4, lines 45–66.

Mixtures of fatty acids, and mixtures of FAs that are derived from different fatty acids can be used, and are preferred. Nonlimiting examples of FA's that can be blended, to form FA's of this invention are as follows:

| Fatty Acyl Group | FA$^1$ | FA$^2$ | FA$^3$ |
| --- | --- | --- | --- |
| $C_{14}$ | 0 | 0 | 1 |
| $C_{16}$ | 3 | 11 | 25 |
| $C_{18}$ | 3 | 4 | 20 |
| C14:1 | 0 | 0 | 0 |
| C16:1 | 1 | 1 | 0 |
| C18:1 | 79 | 27 | 45 |
| C18:2 | 13 | 50 | 6 |
| C18:3 | 1 | 7 | 0 |
| Unknowns | 0 | 0 | 3 |
| Total | 100 | 100 | 100 |
| IV | 99 | 125–138 | 56 |
| cis/trans (C18:1) | 5–6 | Not Available | 7 |
| TPU | 14 | 57 | 6 |

FA$^1$ is a partially hydrogenated fatty acid prepared from canola oil, FA$^2$ is a fatty acid prepared from soy bean oil, and FA$^3$ is a slightly hydrogenated tallow fatty acid.

Preferred quaternary ammonium actives contain an effective amount of molecules containing two ester linked hydrophobic groups [R$^1$C(CO)O—], said actives being referred to herein as "DEQA's", are those that are prepared as a single DEQA from blends of all the different fatty acids that are represented (total fatty acid blend), rather than from blends of mixtures of separate finished DEQA's that are prepared from different portions of the total fatty acid blend.

It is preferred that at least a majority of the fatty acyl groups are unsaturated, e.g., from about 50% to 100%, preferably from about 55% to about 99%, more preferably from about 60% to about 98%, and that the total level of active containing polyunsaturated fatty acyl groups (TPU) be preferably from 0% to about 30%. The cis/trans ratio for the unsaturated fatty acyl groups is usually important, with the cis/trans ratio being from about 1:1 to about 50:1, the minimum being about 1:1, preferably at least about 3:1, and more preferably from about 4:1 to about 20:1. (As used herein, the "percent of quaternary ammonium active" containing a given $R^1$ group is the same as the percentage of that same $R^1$ group is to the total $R^1$ groups used to form all of the quaternary ammonium actives.). Less preferred, but still suitable quaternary ammonium actives can have as little as 10% unsaturation or even essentially no unsaturation.

The preferred unsaturated, including the preferred polyunsaturated, fatty acyl and/or alkylene groups, discussed hereinbefore and hereinafter, surprisingly provide good dewrinkling and effective softening.

Highly unsaturated actives are also easier to process at lower temperatures. These highly unsaturated materials (total level of active containing polyunsaturated fatty acyl groups (TPU) being typically from about 3% to about 30%, with only the low amount of solvent that normally is associated with such materials, i.e., from about 5% to about 20%, preferably from about 8% to about 25%, more preferably from about 10 to about 20%, weight of the total quaternary ammonium/solvent mixture are easier to formulate into the product and remain in stable solutions, emulsions, and or dispersions longer. This ability to process the actives at low temperatures is especially important for the polyunsaturated groups, since it minimizes degradation. Additional protection against degradation can be provided when the compounds and wrinkle compositions contain effective antioxidants, chelants, and/or reducing agents, as disclosed hereinafter.

It will be understood that substituents R and $R^1$ can optionally be substituted with various groups such as alkoxy or hydroxyl groups, and can be straight, or branched so long as the $R^1$ groups maintain their basically hydrophobic character.

A preferred long chain DEQA is the DEQA prepared from sources containing high levels of polyunsaturation, i.e., N,N-di(acyl-oxyethyl)N,N-methylhydroxyethylammonium methyl sulfate, where the acyl is derived from fatty acids containing sufficient polyunsaturation, e.g., mixtures of tallow fatty acids and soybean fatty acids. Another preferred long chain DEQA is the dioleyl (nominally) DEQA, i.e., DEQA in which N,N-di(oleoyl-oxyethyl)-N,N-methylhydroxyethylammonium methyl sulfate is the major ingredient. Preferred sources of fatty acids for such DEQAs are vegetable oils, and/or partially hydrogenated vegetable oils, with high contents of unsaturated, e.g., oleoyl groups.

As used herein, when the DEQA diester (m=2) is specified, it can include the monoester (m=1) and/or triester (m=3) that are present. Preferably, at least about 30% of the DEQA is in the diester form, and from 0% to about 30% can be DEQA monoester, e.g., there are three R groups and one $R^1$ group.

The above compounds can be prepared using standard reaction chemistry. In one synthesis of a di-ester variation of DTDMAC, triethanolamine of the formula $N(CH_2CH_2OH)_3$ is esterified, preferably at an average of about two hydroxyl groups, with an acid chloride of the formula $R^1C(O)Cl$, to form an amine which can be made cationic by acidification (one R is H) to be one type of active, or then quaternized with an alkyl halide, RX, to yield the desired reaction product (wherein R and $R^1$ are as defined hereinbefore). However, it will be appreciated by those skilled in the chemical arts that this reaction sequence allows a broad selection of agents to be prepared.

In preferred DEQA(1) and DEQA(2) quaternary ammonium actives, each $R^1$ is a hydrocarbyl, or substituted hydrocarbyl, group, preferably, alkyl, monounsaturated alkenyl, and polyunsaturated alkenyl groups, with the quaternary ammonium active containing polyunsaturated alkenyl groups being preferably at least about 3%, more preferably at least about 5%, more preferably at least about 10%, and even more preferably at least about 15%, by weight of the total quaternary ammonium active present; the actives preferably containing mixtures of $R^1$ groups, especially within the individual molecules.

The DEQAs herein can also contain a low level of fatty acid, which can be from unreacted starting material used to form the DEQA and/or as a by-product of any partial degradation (hydrolysis) of the quaternary ammonium active in the finished composition. It is preferred that the level of free fatty acid be low, preferably below about 15%, more preferably below about 10%, and even more preferably below about 5%, by weight of the quaternary ammonium active.

The quaternary ammonium actives herein are preferably prepared by a process wherein a chelant, preferably a diethylenetriaminepentaacetate (DTPA) and/or an ethylene diamine-N,N'-disuccinate (EDDS) is added to the process. Another acceptable chelant is tetrakis-(2-hydroxylpropyl) ethylenediamine (TPED). Also, preferably, antioxidants are added to the fatty acid immediately after distillation and/or fractionation and/or during the esterification reactions and/or post-added to the finished quaternary ammonium active. The resulting active has reduced discoloration and malodor associated therewith.

The total amount of added chelating agent is preferably within the range of from about 10 ppm to about 5,000 ppm, more preferably within the range of from about 100 ppm to about 2500 ppm by weight of the formed quaternary ammonium active. The source of triglyceride is preferably selected from the group consisting of animal fats, vegetable oils, partially hydrogenated vegetable oils, and mixtures thereof. More preferably, the vegetable oil or partially hydrogenated vegetable oil is selected from the group consisting of canola oil, partially hydrogenated canola oil, safflower oil, partially hydrogenated safflower oil, peanut oil, partially hydrogenated peanut oil, sunflower oil, partially hydrogenated sunflower oil, corn oil, partially hydrogenated corn oil, soybean oil, partially hydrogenated soybean oil, tall oil, partially hydrogenated tall oil, rice bran oil, partially hydrogenated rice bran oil, and mixtures thereof. Most preferably, the source of triglyceride is canola oil, partially hydrogenated canola oil, and mixtures thereof. The process can also include the step of adding from about 0.01% to about 2% by weight of the composition of an antioxidant compound to any or all of the steps in the processing of the triglyceride up to, and including, the formation of the quaternary ammonium active.

The above processes produce a quaternary ammonium active with reduced coloration and malodor.

Other Quaternary Ammonium Actives

Other less preferred quaternary ammonium actives include, but are not limited to, those disclosed hereinafter. When quaternary ammonium compounds are include in the wrinkle composition, these less preferred quaternary ammonium actives can be present in minor amounts, either alone, or as part of the total amount of quaternary ammonium in the said composition, said other fabric quaternary ammonium active being selected from:

(1) quaternary ammonium having the formula:

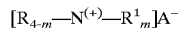

wherein each m is 2 or 3, each $R^1$ is a $C_6$–$C_{22}$, preferably $C_{14}$–$C_{20}$, but no more than one being less than about $C_{12}$ and then the other is at least about 16, hydrocarbyl, or substituted hydrocarbyl substituent, preferably $C_{10}$–$C_{20}$ alkyl or alkenyl (unsaturated alkyl, including polyunsaturated alkyl, also referred to sometimes as "alkylene"), most preferably $C_{12}$–$C_{18}$ alkyl or alkenyl, and where the Iodine Value (hereinafter referred to as "IV") of a fatty acid containing this $R^1$ group is from about 70 to about 140, more preferably from about 80 to about 130; and most preferably from about 90 to about 115 (as used herein, the term "Iodine Value" means the Iodine Value of a "parent" fatty acid, or "corresponding" fatty acid, which is used to define a level of unsaturation for an $R^1$ group that is the same as the level of unsaturation that would be present in a fatty acid containing the same $R^1$ group) with, preferably, a cis/trans ratio of from about 1:1 to about 50:1, the minimum being 1:1, preferably from about 2:1 to about 40:1, more preferably from about 3:1 to about 30:1, and even more preferably from about 4:1 to about 20:1; less preferred, but still suitable for these wrinkle compositions are quaternary ammonium compounds with an IV as low as 10; each $R^1$ can also preferably be a branched chain $C_{14}$–$C_{22}$ alkyl group, preferably a branched chain $C_{16}$–$C_{18}$ group; each R is H or a short chain $C_1$–$C_6$, preferably $C_1$–$C_3$ alkyl or hydroxyalkyl group, e.g., methyl (most preferred), ethyl, propyl, hydroxyethyl, and the like, benzyl, or $(R_2O)_{2-4}H$ where each $R^2$ is a $C_{1-6}$ alkylene group; and $A^-$ is a quaternary ammonium compatible anion, preferably, chloride, bromide, methylsulfate, ethylsulfate, sulfate, and nitrate, more preferably chloride and methyl sulfate;

(2) quaternary ammonium having the formula:

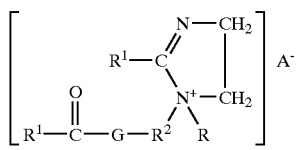

wherein each R, $R^1$, and $A^-$ have the definitions given above; each $R^2$ is a $C_{1-6}$ alkylene group, preferably an ethylene group; and G is an oxygen atom or an —NR— group;

(3) active having the formula:

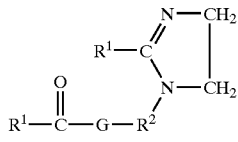

wherein $R^1$, $R^2$ and G are defined as above;

(4) reaction products of substantially unsaturated and/or branched chain higher fatty acids with dialkylenetriamines in, e.g.; a molecular ratio of about 2:1, said reaction products containing compounds of the formula:

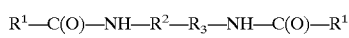

R$^1$—C(O)—NH—R$^2$—R$_3$—NH—C(O)—R$^1$ wherein $R^1$, $R^2$ are defined as above, and each $R^3$ is a $C_{1-6}$ alkylene group, preferably an ethylene group;

(5) quaternary ammonium having the formula:

[R$^1$—C(O)—NR—R$^2$—N(R)R$_2$—R$^3$—NR—C(O)—R$^1$]$^+$A$^+$ wherein R, $R^1$, $R^2$, $R^3$ and $A^-$ are defined as above;

(6) the reaction product of substantially unsaturated and/or branched chain higher fatty acid with hydroxyalkylalkylenediamines in a molecular ratio of about 2:1, said reaction products containing compounds of the formula:

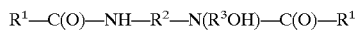

R$^1$—C(O)—NH—R$^2$—N(R$^3$OH)—C(O)—R$^1$ wherein $R^1$, $R^2$ and $R^3$ are defined as above;

(7) quaternary ammonium having the formula:

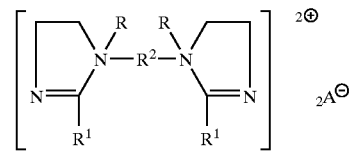

wherein R, $R^1$, $R^2$, and $A^-$ are defined as above; and

Other optional but highly desirable cationic compounds which can be used in combination with the above quaternary ammonium actives are compounds containing one long chain acyclic $C_8$–$C_{22}$ hydrocarbon group, selected from the group consisting of:

(8) acyclic quaternary ammonium salts having the formula:

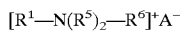

[R$^1$—N(R$^5$)$_2$—R$^6$]$^+$A$^-$ wherein $R^5$ and $R^6$ are $C_1$–$C_4$ alkyl or hydroxyalkyl groups, and $R^1$ and $A^-$ are defined as herein above;

(9) substituted imidazolinium salts having the formula:

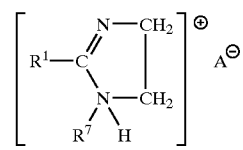

wherein $R^7$ is hydrogen or a $C_1$–$C_4$ saturated alkyl or hydroxyalkyl group, and $R^1$ and $A^-$ are defined as hereinabove;

(10) substituted imidazolinium salts having the formula:

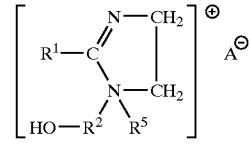

wherein $R^5$ is a $C_1$–$C_4$ alkyl or hydroxyalkyl group, and $R^1$, $R^2$, and $A^-$ are as defined above;

(11) alkylpyridinium salts having the formula:

wherein $R^4$ is an acyclic aliphatic $C_8$–$C_{22}$ hydrocarbon group and $A^-$ is an anion; and

(12) alkanamide alkylene pyridinium salts having the formula:

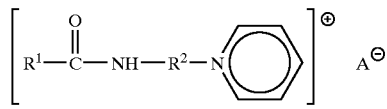

wherein $R^1$, $R^2$ and $A^-$ are defined as herein below; and mixtures thereof.

Examples of Compound (8) are the monoalkenyltrimethylammonium salts such as monooleyltrimethylammonium chloride, monocanolatrimethylammonium chloride, and soyatrimethylammonium chloride. Monooleyltrimethylammonium chloride and monocanolatrimethylammonium chloride are preferred. Other examples of Compound (8) are soyatrimethylammonium chloride available from Witco Corporation under the trade name Adogen® 415, erucyltrimethylammonium chloride wherein $R^1$ is a $C_{22}$ hydrocarbon group derived from a natural source; soyadimethylethylammonium ethylsulfate wherein $R^1$ is a $C_{16}$–$C_{18}$ hydrocarbon group, $R^5$ is a methyl group, $R^6$ is an ethyl group, and $A^-$ is an ethylsulfate anion; and methyl bis(2-hydroxyethyl) oleylammonium chloride wherein $R^1$ is a $C_{18}$ hydrocarbon group, $R^5$ is a 2-hydroxyethyl group and $R^6$ is a methyl group.

Additional actives that can be used herein are disclosed, at least generically for the basic structures, in U.S. Pat. No. 3,861,870, Edwards and Diehl; U.S. Pat. No. 4,308,151, Cambre; U.S. Pat. No. 3,886,075, Bernardino; U.S. Pat. No. 4,233,164, Davis; U.S. Pat. No. 4,401,578, Verbruggen; U.S. Pat. No. 3,974,076, Wiersema and Rieke; and U.S. Pat. No. 4,237,016, Rudkin, Clint, and Young, all of said patents being incorporated herein by reference. The additional actives herein are preferably those that are highly unsaturated versions of the traditional quaternary ammonium actives, i.e., di-long chain alkyl nitrogen derivatives, normally cationic materials, such as dioleyldimethylammonium chloride and imidazolinium compounds as described hereinafter. Examples of more biodegradable fabric quaternary ammonium actives can be found in U.S. Pat. Nos. 3,408,361, Mannheimer, issued Oct. 29, 1968; U.S. Pat. No. 4,709,045, Kubo et al., issued Nov. 24, 1987; U.S. Pat. No. 4,233,451, Pracht et al., issued Nov. 11, 1980; U.S. Pat. No. 4,127,489, Pracht et al., issued Nov. 28, 1979; U.S. Pat. No. 3,689,424, Berg et al., issued Sept. 5, 1972; U.S. Pat. No. 4,128,485, Baumann et al., issued Dec. 5, 1978; U.S. Pat. No. 4,161,604, Elster et al., issued Jul. 17, 1979; U.S. Pat. No. 4,189,593, Wechsler et al., issued Feb. 19, 1980; and U.S. Pat. No. 4,339,391, Hoffman et al., issued Jul. 13, 1982, said patents being incorporated herein by reference.

Examples of Compound (1) are dialkylenedimethylammonium salts such as dicanoladimethylammonium chloride, dicanoladimethylammonium methylsulfate, di(partially hydrogenated soybean, cis/trans ratio of about 4:1) dimethylammonium chloride, dioleyldimethylammonium chloride. Dioleyldimethylammonium chloride and di(canola)dimethylammonium chloride are preferred. An example of commercially available dialkylenedimethylammonium salts usable in the present invention is dioleyldimethylammonium chloride available from Witco Corporation under the trade name Adogen® 472.

An example of Compound (2) is 1-methyl-1-oleylamidoethyl-2-oleylimidazolinium methylsulfate wherein $R^1$ is an acyclic aliphatic $C_{15}$–$C_{17}$ hydrocarbon group, $R^2$ is an ethylene group, G is a NH group, $R^5$ is a methyl group and $A^-$ is a methyl sulfate anion, available commercially from the Witco Corporation under the trade name Varisoft® 3690.

An example of Compound (3) is 1-oleylamidoethyl-2-oleylimidazoline wherein $R^1$ is an acyclic aliphatic $C_{15}$–$C_{17}$ hydrocarbon group, $R^2$ is an ethylene group, and G is a NH group.

An example of Compound (4) is reaction products of oleic acids with diethylenetriamine in a molecular ratio of about 2:1, said reaction product mixture containing N,N"-dioleoyldiethylenetriamine with the formula:

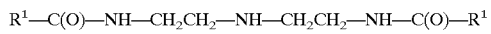

wherein $R^1$—C(O) is oleoyl group of a commercially available oleic acid derived from a vegetable or animal source, such as Emersol® 223LL or Emersol® 7021, available from Henkel Corporation, and $R^2$ and $R^3$ are divalent ethylene groups.

An example of Compound (5) is a difatty amidoamine based active having the formula:

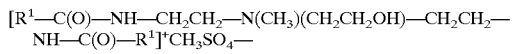

wherein $R^1$—C(O) is oleoyl group, available commercially from the Witco Corporation under the trade name Varisoft® 222LT.

An example of Compound (6) is reaction products of commercial "oleic" acids with N-2-hydroxyethylethylenediamine in a molecular ratio of about 2:1, said reaction product mixture containing a compound of the formula:

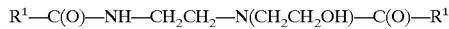

wherein $R^1$—C(O) is oleoyl group of a commercially available oleic acid derived from a vegetable or animal source, such as Emersol® 223LL or Emersol® 7021, available from Henkel Corporation.

An example of Compound (7) is the diquaternary compound having the formula:

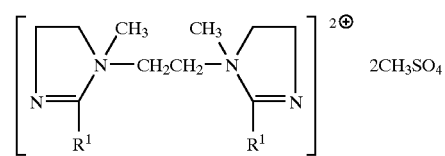

wherein $R^1$ is derived from oleic acid, and the compound is available from Witco Company.

An example of Compound (11) is 1-ethyl-1-(2-hydroxyethyl)-2-isoheptadecylimidazolinium ethylsulfate wherein $R^1$ is a $C_{17}$ hydrocarbon group, $R^2$ is an ethylene group, $R^5$ is an ethyl group, and $A^-$ is an ethylsulfate anion.

Other materials containing at least one long hydrocarbon group and one, or more, quaternary ammonium moieties can also be used. E.g., diquaternary, and polyquaternary ammonium compounds with the quaternary groups being linked by, e.g., alkylene, ester, ether, etc. groups.

It will be understood that suitable wrinkle compositions can include combinations of quaternary ammonium actives disclosed herein.

Anion A

In the cationic nitrogenous salts herein, the anion $A^-$, which is any quaternary ammonium compatible anion, provides electrical neutrality. Most often, the anion used to provide electrical neutrality in these salts is from a strong acid, especially a halide, such as chloride, bromide, or iodide. However, other anions can be used, such as methylsulfate, ethylsulfate, acetate, formate, sulfate, carbonate, and the like. Chloride and methylsulfate are preferred herein as anion A. The anion can also, but less preferably, carry a double charge in which case A⁻ represents half a group.

In addition to lubricating fibers, quaternary ammonium compound disclosed herein can offer addition benefits including improved softening and handfeel as well as protection and/or restoration of fibers and fabric appearance.

Polyquaternary amine compounds also act as suitable quaternary compounds to increase fabric (fiber) lubricity and these are diclosed for use herein by reference to prior art including:

European Patent Application EP 0,803,498, A1, Robert O. Keys and Floyd E. Friedli, filed Apr. 25, 1997;
British Pat. 808,265, issued Jan. 28, 1956 to Arnold Hoffman & Co., Incorporated;
British Pat. 1,161,552, Koebner and Potts, issued Aug. 13, 1969;
DE 4,203,489 A1, Henkel, published Aug. 12, 1993;
EP 0,221,855, Topfl, Heinz, and Jorg, issued Nov. 3, 1986;
EP 0,503,155, Rewo, issued Dec. 20, 1991;
EP 0,507,003, Rewo, issued Dec. 20, 1991
EPA 0,803,498, published Oct. 29, 1997;
French Pat. 2,523,606, Marie-Helene Fraikin, Alan Dillarstone, and Marc Couterau, filed Mar. 22, 1983;
Japanese Pat. 84-273918, Terumi Kawai and Hiroshi Kitamura, 1986;
Japanese Pat 2-011,545, issued to Kao Corp., Jan. 16, 1990;
U.S. Pat. No. 3,079,436, Hwa, issued Feb. 26, 1963;
U.S. Pat. No. 4,418,054, Green et al., issued Nov. 29, 1983;
U.S. Pat. No. 4,721,512, Topfl, Abel, and Binz, issued Jan. 26, 1988;
U.S. Pat. No. 4,728,337, Abel, Topfl, and Riehen, issued Mar. 1, 1988;
U.S. Pat. No. 4,906,413, Topfl and Binz, issued Mar. 6, 1990;
U.S. Pat. No. 5,194,667, Oxenrider et al., issued Mar. 16, 1993;
U.S. Pat. No. 5,235,082, Hill and Snow, issued Aug. 10, 1993;
U.S. Pat. No. 5,670,472, Keys, issued Sep. 23, 1997;
Weirong Miao, Wei Hou, Lie Chen, and Zongshi Li, Studies on Multifunctional Finishing Agents, Riyong Huaxue Gonye, No. 2, pp. 8–10, 1992;
Yokagaku, Vol 41, No. 4 (1992); and
Disinfection, Sterilization, and Preservation, 4$^{th}$ Edition, published 1991 by Lea & Febiger, Chapter 13, pp. 226–30. All of these references are incorporated herein, in their entirety, by reference.

(iv) Mixtures Thereof

A variety of mixtures of soluble silicone compounds, synthetic solid particles, and quaternary ammonium compounds can be used as fabric lubricants in the present compositions.

(b) Shape Retention Polymer

These polymers can be natural, or synthetic, and can act by forming a film, and/or by providing adhesive properties. E.g., the present invention can optionally use film-forming and/or adhesive polymer to impart shape retention to fabric, particularly clothing. By "adhesive" it is meant that when applied as a solution or a dispersion to a fiber surface and dried, the polymer can attach to the surface. The polymer can form a film on the surface, or when residing between two fibers and in contact with the two fibers, it can bond the two fibers together. Other polymers such as starches can form a film and/or bond the fibers together when the treated fabric is pressed by a hot iron. Such a film will have adhesive strength, cohesive breaking strength, and cohesive breaking strain. Preferably, the composition will be free of such polymers that can cause a deposit to be seen, e.g., starch, for normal use.

Nonlimiting examples for natural polymers are starches and their derivatives, and chitins and their derivatives. These are normally not preferred.

The preferred synthetic polymers useful in the present invention are comprised of monomers. Some nonlimiting examples of monomers which can be used to form the synthetic polymers of the present invention include: low molecular weight $C_1$–$C_6$ unsaturated organic monocarboxylic and polycarboxylic acids, such as acrylic acid, methacrylic acid, crotonic acid, maleic acid and its half esters, itaconic acid, and mixtures thereof; esters of said acids with $C_1$–$C_{12}$ alcohols, such as methanol, ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, t-butanol, cyclohexanol, 2-ethyl-1-butanol, neodecanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, 1-decanol, 1-dodecanol, and the like, and mixtures thereof Nonlimiting examples of said esters are methyl acrylate, ethyl acrylate, t-butyl acrylate, methyl methacrylate, hydroxyethyl methacrylate, methoxy ethyl methacrylate, and mixtures thereof; amides and imides of said acids, such as N,N-dimethylacrylamide, N-t-butyl acrylamide, maleimides; low molecular weight unsaturated alcohols such as vinyl alcohol (produced by the hydrolysis of vinyl acetate after polymerization), allyl alcohol; esters of said alcohols with low molecular weight carboxylic acids, such as, vinyl acetate, vinyl propionate; ethers of said alcohols such as methyl vinyl ether, aromatic vinyl such as styrene, alpha-methylstyrene, t-butylstyrene, vinyl toluene, polystyrene macromer, and the like; polar vinyl heterocyclics, such as vinyl pyrrolidone, vinyl caprolactam, vinyl pyridine, vinyl imidazole, and mixtures thereof; other unsaturated amines and amides, such as vinyl amine, diethylene triamine, dimethylaminoethyl methacrylate, ethenyl formamide; vinyl sulfonate; salts of acids and amines listed above; low molecular weight unsaturated hydrocarbons and derivatives such as ethylene, propylene, butadiene, cyclohexadiene, vinyl chloride; vinylidene chloride; and mixtures thereof and alkyl quaternized derivatives thereof, and mixtures thereof. Preferably, said monomers are selected from the group consisting of vinyl alcohol; acrylic acid; methacrylic acid; methyl acrylate; ethyl acrylate; methyl methacrylate; t-butyl acrylate; t-butyl methacrylate; n-butyl acrylate; n-butyl methacrylate; isobutyl methacrylate; 2-ethylhexyl methacrylate; dimethylaminoethyl methacrylate; N,N-dimethyl acrylamide; N,N-dimethyl methacrylamide; N-t-butyl acrylamide; vinylpyrrolidone; vinyl pyridine; adipic acid; diethylenetriamine; salts thereof and alkyl quaternized derivatives thereof, and mixtures thereof.

Preferably, said monomers form homopolymers and/or copolymers (i.e., the film-forming and/or adhesive polymer) having a glass transition temperature (Tg) of from about −20° C. to about 150° C., preferably from about −10° C. to about 150° C., more preferably from about 0° C. to about 100° C., most preferably, the adhesive polymer hereof, when dried to form a film will have a Tg of at least about 25° C., so that they are not unduly sticky, or "tacky" to the touch. Preferably said polymer is soluble and/or dispersible in water and/or alcohol. Said polymer typically has a molecular weight of at least about 500, preferably from about 1,000 to about 2,000,000, more preferably from about 5,000 to about 1,000,000, and even more preferably from about 30,000 to about 300,000 for some polymers.

Some non-limiting examples of homopolymers and copolymers which can be used as film-forming and/or adhesive polymers of the present invention are: adipic acid/dimethylaminohydroxypropyl diethylenetriamine copolymer; adipic acid/epoxypropyl diethylenetriamine copolymer; poly(vinylpyrrolidone/dimethylaminoethyl methacrylate); polyvinyl alcohol; polyvinylpyridine n-oxide; methacryloyl ethyl betaine/methacrylates copolymer; ethyl acrylate/methyl methacrylate/methacrylic acid/ acrylic acid copolymer, polyamine resins; and polyquaternary amine resins; poly(ethenylformamide); poly (vinylamine) hydrochloride; poly(vinyl alcohol-co-6% vinylamine); poly(vinyl alcohol-co-12% vinylamine); poly (vinyl alcohol-co-6% vinylamine hydrochloride); and poly (vinyl alcohol-co-12% vinylamine hydrochloride). Preferably, said copolymer and/or homopolymers are selected from the group consisting of: adipic acid/ dimethylaminohydroxypropyl diethylenetriamine copolymer; poly(vinylpyrrolidone/dimethylaminoethyl methacrylate); polyvinyl alcohol; ethyl acrylate/methyl methacrylate/methacrylic acid/acrylic acid copolymer; methacryloyl ethyl betaine/methacrylates copolymer; polyquaternary amine resins; poly(ethenylformamide); poly (vinylamine) hydrochloride; poly(vinyl alcohol-co-6% vinylamine); poly(vinyl alcohol-co-12% vinylamine); poly (vinyl alcohol-co4% vinylamine hydrochloride); and poly (vinyl alcohol-co-12% vinylamine hydrochloride).

Nonlimiting examples of the preferred polymer that are commercially available are: polyvinylpyrrolidone/ dimethylaminoethyl methacrylate copolymer, such as Copolymer 958™, molecular weight of about 100,000 and Copolymer 937, molecular weight of about 1,000,000, available from GAF Chemicals Corporation; adipic acid/ dimethylaminohydroxypropyl diethylenetriamine copolymer, such as Cartaretin F-4® and F-23, available from Sandoz Chemicals Corporation; methacryloyl ethyl betaine/methacrylates copolymer, such as Diaformer Z-SM®, available from Mitsubishi Chemicals Corporation; polyvinyl alcohol copolymer resin, such as Vinex 2019®, available from Air Products and Chemicals or Moweol®, available from Clariant; adipic acid/epoxypropyl diethylenetriamine copolymer, such as Delsette 101®, available from Hercules Incorporated; polyamine resins, such as Cypro 515®, available from Cytec Industries; polyquaternary amine resins, such as Kymene 557H®, available from Hercules Incorporated; and polyvinylpyrrolidonetacrylic acid, such as Sokalan EG 310®, available from BASF.

Preferred polymers useful in the present invention are selected from the group consisting of copolymers of hydrophilic monomers and hydrophobic monomers. The polymer can be linear random or block copolymers, and mixtures thereof. Such hydrophobic/hydrophilic copolymers typically have a hydrophobic monomer/hydrophilic monomer ratio of from about 95:5 to about 20:80, preferably from about 90:10 to about 40:60, more preferably from about 80:20 to about 50:50 by weight of the copolymer. The hydrophobic monomer can comprise a single hydrophobic monomer or a mixture of hydrophobic monomers, and the hydrophilic monomer can comprise a single hydrophilic monomer or a mixture of hydrophilic monomers. The term "hydrophobic" is used herein consistent with its standard meaning of lacking affinity for water, whereas "hydrophilic" is used herein consistent with its standard meaning of having affinity for water. As used herein in relation to monomer units and polymeric materials, including the copolymers, "hydrophobic" means substantially water insoluble; "hydrophilic" means substantially water soluble. In this regard, "substantially water insoluble" shall refer to a material that is not soluble in distilled (or equivalent) water, at 25° C., at a concentration of about 0.2% by weight, and preferably not soluble at about 0.1% by weight (calculated on a water plus monomer or polymer weight basis). "Substantially water soluble" shall refer to a material that is soluble in distilled (or equivalent) water, at 25° C., at a concentration of about 0.2% by weight, and are preferably soluble at about 1% by weight. The terms "soluble", "solubility" and the like, for purposes hereof, corresponds to the maximum concentration of monomer or polymer, as applicable, that can dissolve in water or other solvents to form a homogeneous solution, as is well understood to those skilled in the art.

Nonlimiting examples of useful hydrophobic monomers are acrylic acid $C_1$–$C_{18}$ alkyl esters, such as methyl acrylate, ethyl acrylate, t-butyl acrylate; methacrylic $C_1$–$C_{18}$ alkyl esters, such as methyl methacrylate, 2-ethyl hexyl methacrylate, methoxy ethyl methacrylate; vinyl alcohol esters of carboxylic acids, such as, vinyl acetate, vinyl propionate, vinyl neodecanoate; aromatic vinyls, such as styrene, t-butyl styrene, vinyl toluene; vinyl ethers, such as methyl vinyl ether; vinyl chloride; vinylidene chloride; ethylene, propylene and other unsaturated hydrocarbons; and the like; and mixtures to thereof Some preferred hydrophobic monomers are methyl acrylate, methyl methacrylate, t-butyl acrylate, t-butyl methacrylate, n-butyl acrylate, n-butyl methacrylate, and mixtures thereof.

Nonlimiting examples of useful hydrophilic monomers are unsaturated organic mono-carboxylic and polycarboxylic acids, such as acrylic acid, methacrylic acid, crotonic acid, maleic acid and its half esters, itaconic acid; unsaturated alcohols, such as vinyl alcohol, allyl alcohol; polar vinyl heterocyclics, such as vinyl pyrrolidone, vinyl caprolactam, vinyl pyridine, vinyl imidazole; vinyl amine; vinyl sulfonate; unsaturated amides, such as acrylamides, e.g., N,N-dimethylacrylamide, N-t-butyl acrylamide; hydroxyethyl methacrylate; dimethylaminoethyl methacrylate; salts of acids and amines listed above; and the like; and mixtures thereof Some preferred hydrophilic monomers are acrylic acid, methacrylic acid, N,N-dimethyl acrylamide, N,N-dimethyl methacrylamide, N-t-butyl acrylamide, dimethylamino ethyl methacrylate, vinyl pyrrolidone, salts thereof and alkyl quaternized derivatives thereof, and mixtures thereof Non limiting examples of polymers for use in the present invention include the following, where the composition of the copolymer is given as approximate weight percentage of each monomer used in the polymerization reaction used to prepare the polymer: vinyl pyrrolidone/vinyl acetate copolymers (at ratios of up to about 30% by weight of vinyl pyrrolidone); dimethyl acrylamide/t-butyl acrylate/ethyl hexyl methacrylate copolymer (10/45/45); vinyl pyrrolidone/vinyl acetate/butyl acrylate copolymer (10/78/12 and 10/70/20); vinyl pyrrolidone/vinyl propionate copolymer (5/95); vinyl caprolactam/vinyl acetate copolymer (5/95); acrylic acid/t-butyl acrylate (25/75) and styling resins sold under the trade names Ultrahold CA 8® by Ciba Geigy (ethyl acrylate/ acrylic acid/N-t-butyl acrylamide copolymer); Resyn 28-1310® by National Starch and Luviset CA 66® Luviset CAN® and Luviflex Soft® by BASF (vinyl acetate/crotonic acid copolymer 90/10); Luviset CAP® by BASF (vinyl acetate/vinyl propionate/crotonic acid 50/40/10); Resyn 28-2930® by National Starch (vinyl acetate/vinyl neodecanoate/crotonic acid copolymer), Amerhold DR-25® by Union Carbide (ethyl acrylate/methacrylic acid/methyl methacrylate/acrylic acid copolymer), and Poligen A® by BASF (polyacrylate dispersion).

Preferably, the shape retention polymers contain an effective amount of monomers having carboxylic groups to control amine odor. Highly preferred shape retention copolymers contain hydrophobic monomers and hydrophilic monomers which comprise unsaturated organic mono-carboxylic and polycarboxylic acid monomers, such as acrylic acid, methacrylic acid, crotonic acid, maleic acid and its half esters, itaconic acid, and salts thereof, and mixtures thereof; and optionally other hydrophilic monomers. These preferred polymers of the current invention surprisingly provide control of certain amine type malodors in fabrics, in addition to providing the fabric wrinkle control benefit. Examples of the hydrophilic unsaturated organic mono-carboxylic and polycarboxylic acid monomers are acrylic acid, methacrylic acid, crotonic acid, maleic acid and its half esters, itaconic acid, and mixtures thereof. Nonlimiting examples of the hydrophobic monomers are esters of the unsaturated organic mono-carboxylic and polycarboxylic acids cited hereinabove with $C_1$–$C_{12}$ alcohols, such as methanol, ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, t-butanol, cyclohexanol, 2-ethyl-1-butanol, and mixtures thereof, preferably methanol, ethanol, 1-propanol, 2-propanol, 1-butanol, 2-methyl-1-propanol, t-butanol, and mixtures thereof. One highly preferred copolymer contains acrylic acid and t-butyl acrylate monomeric units, preferably with acrylic acid/t-butyl acrylate ratios of from about 90:10 to about 10:90, preferably from about 70:30 to about 15:85, more preferably from about 40:60 to about 20:80. Nonlimiting examples of acrylic acid/tert-butyl acrylate copolymers useful in the present invention are those typically with a molecular weight of from about 1,000 to about 2,000,000, preferably from about 5,000 to about 1,000,000, and more preferably from about 30,000 to about 300,000, and with an approximate acrylic acid/tert-butyl acrylate weight ratio of about 25:75 and an average molecular weight of from about 70,000 to about 100,000, and those with an approximate acrylic acid/tert-butyl acrylate weight ratio of about 35:65 and an average molecular weight of from about 60,000 to about 90,000. Compositions containing these polymers also can additionally comprise perfume, antibacterial active, odor control agent, static control agent, and mixtures thereof.

The film-forming and/or adhesive polymer of the present invention is present at least an effective amount to provide shape retention, typically from about 0.05% to about 10%, preferably from about 0.1% to about 5%, more preferably from about 0.2% to about 3%, even more preferably from about 0.3% to about 1.5%, by weight of the usage composition.

The adhesive polymer is present in the composition in a sufficient amount to result in an amount of from about 0.001% to about 1%, preferably from about 0.01% to about 0.5%, more preferably from about 0.02% to about 0.4% by weight of polymer per weight of dry fabrics.

It is not intended to exclude the use of higher or lower levels of the polymers, as long as an effective amount is used to provide adhesive and film-forming properties to the composition and the composition can be formulated and effectively applied for its intended purpose.

Concentrated compositions can also be used in order to provide a less expensive product. When a concentrated product is used, i.e., when the wrinkle reducing active is from about 5% to about 50%, by weight of the concentrated composition, it is preferable to dilute the composition before treating fabric. Preferably, the wrinkle reducing active is diluted with about 50% to about 10,000%, more preferably from about 50% to about 8,000%, and even more preferably from about 50% to about 5,000%, by weight of the composition, of water.

Silicones and film-forming polymers can be combined to produce preferred wrinkle reducing actives. Typically the weight ratio of silicone to film-forming polymer is from about 10:1 to about 1:10, preferably from about 5:1 to about 1:5, and more preferably from about 2:1 to about 1:2. Typically, the preferred wrinkle reducing active of silicone plus polymer is present at a level of from about 0.1% to about 8%, preferably from about 0.3% to about 5%, more preferably from about 0.5% to about 3%, by weight of the composition.

Highly preferred adhesive and/or film forming polymers that are useful in the composition of the present invention actually contain silicone moieties in the polymers themselves. These preferred polymers include graft and block copolymers of silicone with moieties containing hydrophilic and/or hydrophobic monomers described hereinbefore. The silicone-containing copolymers in the spray composition of the present invention provide shape retention, body, and/or good, soft fabric feel.

Both silicone-containing graft and block copolymers useful in the present invention have the following properties:

(1) the silicone portion is covalently attached to the non-silicone portion, (2) the molecular weight of the silicone portion is from about 1,000 to about 50,000; and (3) the non-silicone portion must render the entire copolymer soluble or dispersible in the wrinkle control composition vehicle and permit the copolymer to deposit on/adhere to the treated fabrics.

Suitable silicone copolymers include the following:

(i) Silicone Graft Copolymers

Preferred silicone-containing polymers are the silicone graft copolymers comprising acrylate groups described, along with methods of making them, in U.S. Pat. No. 5,658,557, Bolich et al., issued Aug. 19, 1997, U.S. Pat. No. 4,693,935, Mazurek, issued Sep. 15, 1987, and U.S. Pat. No. 4,728,571, Clemens et al., issued Mar. 1, 1988. Additional silicone-containing polymers are disclosed in U.S. Pat. Nos. 5,480,634, Hayama et al, issued Oct. 2, 1996, U.S. Pat. No. 5,166,276, Hayama et al., issued Nov. 24, 1992, U.S. Pat. No. 5,061,481, issued Oct. 29, 1991, Suzuki et al., U.S. Pat. No. 5,106,609, Bolich et al., issued Apr. 21, 1992, U.S. Pat. No. 5,100,658, Bolich et al., issued Mar. 31, 1992, U.S. Pat. No. 5,100,657, Ansher-Jackson, et al., issued Mar. 31, 1992, U.S. Pat. No. 5,104,646, Bolich et al., issued Apr. 14, 1992, all of which are incorporated herein by reference.

These polymers preferably include copolymers having a vinyl polymeric backbone having grafted onto it monovalent siloxane polymeric moieties, and components consisting of non-silicone hydrophilic and hydrophobic monomers.

The silicone-containing monomers are exemplified by the general formula:

$$X(Y)_n Si(R)_{3-m} Z_m$$

wherein X is a polymerizable group, such as a vinyl group, which is part of the backbone of the polymer; Y is a divalent linking group; R is a hydrogen, hydroxyl, lower alkyl (e.g. $C_1-C_4$), aryl, alkaryl, alkoxy, or alkylamino; Z is a monovalent polymeric siloxane moiety having an average molecular weight of at least about 500, is essentially unreactive under copolymerization conditions, and is pendant from the vinyl polymeric backbone described above; n is 0 or 1; and m is an integer from 1 to 3.

The preferred silicone-containing monomer has a weight average molecular weight of from about 1,000 to about 50,000, preferably from about 3,000 to about 40,000, most preferably from about 5,000 to about 20,000.

Nonlimiting examples of preferred silicone-containing monomers have the following formulas:

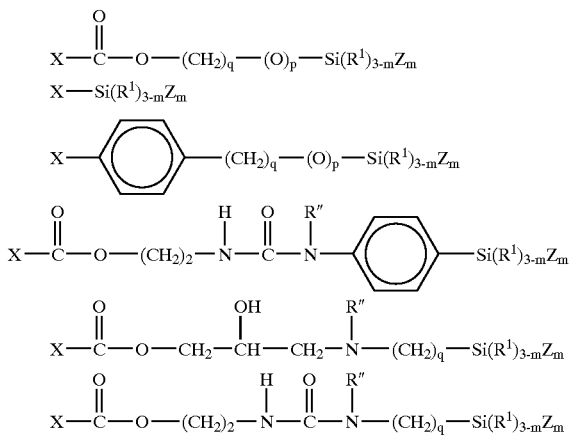

In these structures m is an integer from 1 to 3, preferably 1; p is 0 or 1; q is an integer from 2 to 6; n is an integer from 0 to 4, preferably 0 or 1, more preferably 0; $R^1$ is hydrogen, lower alkyl, alkoxy, hydroxyl, aryl, alkylamino, preferably $R^1$ is alkyl; R" is alkyl or hydrogen; X is

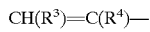

$R^3$ is hydrogen or —COOH, preferably hydrogen; $R_4$ is hydrogen, methyl or —CH$_2$COOH, preferably methyl; Z is

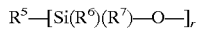

wherein $R^5$, $R^6$, and $R^7$, independently are lower alkyl, alkoxy, alkylamino, hydrogen or hydroxyl, preferably alkyl; and r is an integer of from about 5 to about 700, preferably from about 60 to about 400, more preferably from about 100 to about 300. Most preferably, $R^5$, $R^6$, and $R^7$ are methyl, p=0, and q=3.

Silicone-containing adhesive and/or film-forming copolymers useful in the present invention comprise from 0% to about 90%, preferably from about 10% to about 80%, more preferably from about 40% to about 75% of hydrophobic monomer, from about 0% to about 90%, preferably from about 5% to about 80% of hydrophilic monomer, and from about 5% to about 50%, preferably from about 10% to about 40%, more preferably from about 15% to about 25% of silicone-containing monomer.

The composition of any particular copolymer will help determine its formulation properties. In fact, by appropriate selection and combination of particular hydrophobic, hydrophilic and silicone-containing components, the copolymer can be optimized for inclusion in specific vehicles. For example, polymers which are soluble in an aqueous formulation preferably contain from 0% to about 70%, preferably from about 5% to about 70% of hydrophobic monomer, and from about 30% to about 98%, preferably from about 30% to about 80%, of hydrophilic monomer, and from about 1% to about 40% of silicone-containing monomer. Polymers which are dispersible preferably contain from 0% to about 70%, more preferably from about 5% to about 70%, of hydrophobic monomer, and from about 20% to about 80%, more preferably from about 20% to about 60%, of hydrophilic monomer, and from about 1% to about 40% of silicone-containing monomer.

The silicone-containing copolymers preferably have a weight average molecular weight of from about 10,000 to about 1,000,000, preferably from about 30,000 to about 300,000.

The preferred polymers comprise a vinyl polymeric backbone, preferably having a Tg or a Tm as defined above of about −20° C. and, grafted to the backbone, a polydimethylsiloxane macromer having a weight average molecular weight of from about 1,000 to about 50,000, preferably from about 5,000 to about 40,000, most preferably from about 7,000 to about 20,000. The polymer is such that when it is formulated into the finished composition, and then dried, the polymer phase separates into a discontinuous phase which includes the polydimethylsiloxane macromer and a continuous phase which includes the backbone. Exemplary silicone grafted polymers for use in the present invention include the following, where the composition of the copolymer is given with the approximate weight percentage of each monomer used in the polymerization reaction to prepare the copolymer: N,N-dimethylacrylamide/isobutyl methacrylate/ (PDMS macromer—20,000 approximate molecular weight) (20/60/20 w/w/w), copolymer of average molecular weight of about 400,000; N,N-dimethylacrylamide/(PDMS macromer—20,000 approximate molecular weight) (80/20 w/w), copolymer of average molecular weight of about 300,000; and t-butylacrylate/N,N-dimethylacrylamide/ (PDMS macromer—10,000 approximate molecular weight) (70/10/20), copolymer of average molecular weight of about 400,000.

Highly preferred shape retention copolymers of this type contain hydrophobic monomers, silicone-containing monomers and hydrophilic monomers which comprise unsaturated organic mono- and polycarboxylic acid monomers, such as acrylic acid, methacrylic acid, crotonic acid, maleic acid and its half esters, itaconic acid, and salts thereof, and mixtures thereof. These preferred polymers surprisingly provide control of certain amine type malodors in fabrics, in addition to providing the fabric wrinkle control benefit. A nonlimiting example of such copolymer is n-butylmethacrylate/acrylic acid/(polydimethylsiloxane macromer, 20,000 approximate molecular weight) copolymer of average molecular weight of about 100,000, and with an approximate monomer weight ratio of about 70/10/20. A highly preferred copolymer is composed of acrylic acid, t-butyl acrylate and silicone-containing monomeric units, preferably with from about 20% to about 90%, preferably from about 30% to about 80%, more preferably from about 50% to about 75% t-butyl acrylate; from about 5% to about 60%, preferably from about 8% to about 45%, more preferably from about 10% to about 30% of acrylic acid; and from about 5% to about 50%, preferably from about 10% to about 40%, more preferably from about 15% to about 30% of polydimethylsiloxane of an average molecular weight of from about 1,000 to about 50,000, preferably from about 5,000 to about 40,000, most preferably from about 7,000 to about 20,000. Nonlimiting examples of acrylic acid/tert-butyl acrylate/polydimethyl siloxane macromer copolymers useful in the present invention, with approximate monomer weight ratio, are: t-butylacrylate/acrylic acid/

(polydimethylsiloxane macromer, 10,000 approximate molecular weight) (70/10/20 w/w/w), copolymer of average molecular weight of about 300,000; t-butyl acrylate/acrylic acid/(polydimethylsiloxane macromer, 10,000 approximate molecular weight) (63/20/17), copolymer of average molecular weight of from about 120,000 to about 150,000; and n-butylmethacrylate/acrylic acid/(polydimethylsiloxane macromer—20,000 approximate molecular weight) (70/10/20 w/w/w), copolymer of average molecular weight of about 100,000. A useful and commercially available copolymer of this type is Diahold® ME from Mitsubishi Chemical Corp., which is a t-butyl acrylate/acrylic acid/(polydimethylsiloxane macromer, 12,000 approximate molecular weight) (60/20/20), copolymer of average molecular weight of about 128,000.

(ii) Silicone Block Copolymers

Also useful herein are silicone block copolymers comprising repeating block units of polysiloxanes.

Examples of silicone-containing block copolymers are found in U.S. Pat. No. 5,523,365, to Geck et al., issued Jun. 4, 1996; U.S. Pat. No. 4,689,289, to Crivello, issued Aug. 25, 1987; U.S. Pat. No. 4,584,356, to Crivello, issued Apr. 22, 1986; *Macromolecular Design, Concept & Practice*, Ed: M. K. Mishra, Polymer Frontiers International, Inc., Hopewell Jct., N.Y. (1994), and *Block Copolymers*, A. Noshay and J. E. McGrath, Academic Press, NY (1977), which are all incorporated by reference herein in their entirety. Other silicone block copolymers suitable for use herein are those described, along with methods of making them, in the above referenced and incorporated U.S. Pat. No. 5,658,577.

The silicone-containing block copolymers useful in the present invention can be described by the formulas A-B, A-B-A, and -(A-B)$_n$- wherein n is an integer of 2 or greater. A-B represents a diblock structure, A-B-A represents a triblock structure, and -(A-B)$_n$- represents a multiblock structure. The block copolymers can comprise mixtures of diblocks, triblocks, and higher multiblock combinations as well as small amounts of homopolymers.

The silicone block portion, B, can be represented by the following polymeric structure

wherein each R is independently selected from the group consisting of hydrogen, hydroxyl, $C_1$–$C_6$ alkyl, $C_1$–$C_6$ alkoxy, $C_2$–$C_6$ alkylamino, styryl, phenyl, $C_1$–$C_6$ alkyl or alkoxy-substituted phenyl, preferably methyl; and m is an integer of about 10 or greater, preferably of about 40 or greater, more preferably of about 60 or greater, and most preferably of about 100 or greater.

The non-silicone block, A, comprises monomers selected from the monomers as described hereinabove in reference to the non-silicone hydrophilic and hydrophobic monomers for the silicone grafted copolymers. Vinyl blocks are preferred co-monomers. The block copolymers preferably contain one or more non-silicone blocks, and up to about 50%, preferably from about 10% to about 20%, by weight of one or more polydimethyl siloxane blocks.

(iii) Sulfur-Linked SiliconeContaining Copolymers

Also useful herein are sulfur-linked silicone containing copolymers, including block copolymers. As used herein in reference to silicone containing copolymers, the term "sulfur-linked" means that the copolymer contains a sulfur linkage (i.e., —S—), a disulfide linkage (i.e., —S—S—), or a sulfhydryl group (i.e., —SH).

These sulfur-linked silicone-containing copolymers are represented by the following general formula:

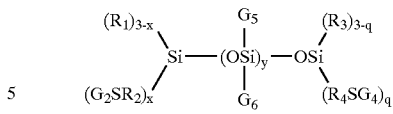

wherein each $G_5$ and $G_6$ is independently selected from the group consisting of alkyl, aryl, alkaryl, alkoxy, alkylamino, fluoroalkyl, hydrogen, and -ZSA, wherein A represents a vinyl polymeric segment consisting essentially of polymerized free radically polymerizable monomer, and Z is a divalent linking group (Useful divalent linking groups Z include but are not limited to the following: $C_1$ to $C_{10}$ alkylene, alkarylene, arylene, and alkoxyalkylene. Preferably, Z is selected from the group consisting of methylene and propylene for reasons of commercial availability.);

each $G_2$ comprises A;

each $G_4$ comprises A;

each $R^1$ is a monovalent moiety selected from the group consisting of alkyl, aryl, alkaryl, alkoxy, alkylamino, fluoroalkyl, hydrogen, and hydroxyl (Preferably, $R_1$ represents monovalent moieties which can independently be the same or different selected from the group consisting of $C_{1-4}$ alkyl and hydroxyl for reasons of commercial availability. Most preferably, $R^1$ is methyl.);

each $R_2$ is a divalent linking group (Suitable divalent linking groups include but are not limited to the following: $C_1$ to $C_{10}$ alkylene, arylene, alkarylene, and alkoxyalkylene. Preferably, $R_2$ is selected from the group consisting of $C_{1-3}$ alkylene and $C_7$–$C_{10}$ alkarylene due to ease of synthesis of the compound. Most preferably, $R_2$ is selected from the group consisting of —CH$_2$—, 1,3-propylene, and

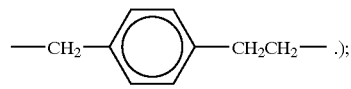

each $R_3$ represents monovalent moieties which can independently be the same or different and are selected from the group consisting of alkyl, aryl, alkaryl, alkoxy, alkylamino, fluoroalkyl, hydrogen, and hydroxyl (Preferably, $R_3$ represents monovalent moieties which can independently be the same or different selected from the group consisting of $C_{1-4}$ alkyl and hydroxyl for reasons of commercial availability. Most preferably, $R_3$ is methyl.);

each $R_4$ is a divalent linking group(Suitable divalent linking groups include but are not limited to the following: $C_1$ to $C_{10}$ alkylene, arylene, alkarylene, and alkoxyalkylene. Preferably, $R_4$ is selected from the group consisting of $C_{1-3}$ alkylene and $C_7$–$C_{10}$ alkarylene for ease of synthesis. Most preferably, $R_4$ is selected from the group consisting of —CH$_2$—, 1,3-propylene, and

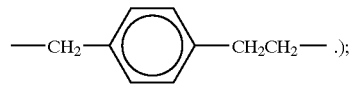

x is an integer of 0–3;

y is an integer of 5 or greater(preferably y is an integer ranging from about 14 to about 700, preferably from about 20 to about 200); and q is an integer of 0–3;
wherein at least one of the following is true:
q is an integer of at least 1;
x is an integer of at least 1;
$G_5$ comprises at least one -ZSA moiety; or
$G_6$ comprises at least one -ZSA moiety.

As noted above, A is a vinyl polymeric segment formed from polymerized free radically polymerizable monomers. The selection of A is typically based upon the intended uses of the composition, and the properties the copolymer must possess in order to accomplish its intended purpose. If A comprises a block in the case of block copolymers, a polymer having AB and/or ABA architecture will be obtained depending upon whether a mercapto functional group —SH is attached to one or both terminal silicon atoms of the mercapto functional silicone compounds, respectively. The weight ratio of vinyl polymer block or segment, to silicone segment of the copolymer can vary. The preferred copolymers are those wherein the weight ratio of vinyl polymer segment to silicone segment ranges from about 98:2 to 50:50, in order that the copolymer possesses properties inherent to each of the different polymeric segments while retaining the overall polymer's solubility.

Sulfur linked silicone copolymers are described in more detail in U.S. Pat. No. 5,468,477, to Kumar et al., issued Nov. 21, 1995, and PCT Application No. WO 95/03776, assigned to 3M, published Feb. 9, 1995, which are incorporated by reference herein in their entirety.

The film-forming and/or adhesive silicone-containing copolymer of the present invention is present at least an effective amount to provide shape retention, typically from about 0.05% to about 10%, preferably from about 0.1% to about 5%, more preferably from about 0.2% to about 3%, even more preferably from about 0.3% to about 1.5%, by weight of the usage composition.

The silicone-containing copolymer is present in the composition in a sufficient amount to result in an amount of from about 0.001% to about 1%, preferably from about 0.01% to about 0.5%, more preferably from about 0.02% to about 0.4% by weight of polymer per weight of dry fabrics.

When the optional cyclodextrin is present in the composition, the polymer useful in providing shape retention in the composition of the present invention should be. cyclodextrin-compatible, that is it should not substantially form complexes with cyclodextrin so as to diminish performance of the cyclodextrin and/or the polymer. Complex formation affects both the ability of the cyclodextrin to absorb odors and the ability of the polymer to impart shape retention to fabric. In this case, the monomers having pendant groups that can complex with cyclodextrin are not preferred because they can form complexes with cyclodextrin. Examples of such monomers are acrylic or methacrylic acid esters of $C_7$–$C_{18}$ alcohols, such as neodecanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, and 1-decanol; aromatic vinyls, such as styrene; t-butylstyrene; vinyl toluene; and the like.

These polymers, by themselves, also provide odor control to some amine type malodors. If amine malodor control is desired, the pH of the solution should be kept as low as possible, preferably from about 6 to about 8, more preferably from about 6.5 to about 7.5.

Starch

Starch is not normally preferred, since it makes the fabric resistant to deformation. However, it does provide increased "body" which is often desired. Starch is particularly preferred in compositions of this invention to be used with ironing. When used, starch is solubilized or dispersed in the composition. Any type of starch, e.g. those derived from corn, wheat, rice, grain sorghum, waxy grain *sorghum*, waxy maize or tapioca, or mixtures thereof and water soluble or dispersible modifications or derivatives thereof, can be used in the composition of the present invention. Modified starches that can be used include natural starches that have been degraded to obtain a lower viscosity by acidic, oxidative or enzymatic depolymerization. Additionally, low viscosity commercially available propoxylated and/or ethoxylated starches are useable in the present composition and are preferred since their low viscosity at relatively high solids concentrations make them very adaptable to spraying processes. Suitable alkoxylated, low viscosity starches are submicron sized particles of hydrophobic starch that are readily dispersed in water and are prepared by alkoxylation of granular starch with a monofunctional alkoxylating agent which provides the starch with ether linked hydrophilic groups. A suitable method for their preparation is taught in U.S. Pat. No. 3,462,283. In accordance with the invention, the propoxylated or ethoxylated starch derivatives are dispersed in the aqueous medium in an amount of from about 0.1% to about 10%, preferably from about 0.5% to about 6%, more preferably from about 1% to about 4% by weight of the usage composition.

(c) Lithium Salts.

Lithium salts are disclosed as solubilizing aids,. e.g., lithium bromide in the production of silk fibroin, (U.S. Pat. No. 4,233,212, issued Nov. 11, 1980 to Otoi et al.), and lithium thiocyanate, (U.S. Pat. No. 5,252,285, issued Oct. 12, 1993 to Robert L. Lock). U.S. Pat. No. 5,296,269, issued Mar. 22, 1994 to Yang et al. discloses a process to produce crease-resistant silk using lithium bromide and lithium chloride. U.S. Pat. No. 5,199,954, issued Apr. 6, 1993 to Schultz et al. discloses a hair dye composition containing lithium bromide. U.S. Pat. No. 5,609,859, issued Mar. 11, 1997 to D. R. Cowsar discloses methods for preparing hair relaxer creams containing a lithium salt. Lithium salts are disclosed as static control agents in a liquid softener composition in U.S. Pat. No. 4,069,159, issued Jan. 17, 1978 to Mason Hayek. All of these patents are incorporated herein by reference.

It is now found that aqueous compositions comprising lithium salts provide improved fabric wrinkle control. Non-limiting examples of lithium salts that are useful in the present invention are lithium bromide, lithium chloride, lithium lactate, lithium benzoate, lithium acetate, lithium sulfate, lithium tartrate, and/or lithium bitartrate, preferably lithium bromide and/or lithium lactate. Some water soluble salts such as, lithium benzoate are not preferred when the optional cyclodextrin is present because they can form complexes with cyclodextrin. Useful levels of lithium salts are from about 0.1% to about 10%, preferably from about 0.5% to about 7%, more preferably from about 1% to about 5%, by weight of the usage composition.

(d) Hydrophilic Plasticizer

Optionally, the composition can contain a hydrophilic plasticizer to soften both the fabric fibers, especially cotton fibers, and the adhesive and/or film-forming shape retention polymers. Examples of the preferred hydrophilic plasticizers are short chain low molecular weight polyhydric alcohols, such as is glycerol, ethylene glycol, propylene glycol, diethylene glycol, dipropylene glycol, sorbitol, erythritol or mixtures thereof, more preferably diethylene glycol, dipropylene glycol, ethylene glycol, propylene glycol. Other suitable polyhydric alcohols include: hexylene glycol, 1,2-hexanediol, isopropylene glycol, 1,2-butylene glycol, 2,3- butylene glycol. Mixtures of plasticizers are also suitable for the present invention. When cyclodextrin is present, the plasticizer should be compatible with it.

The aqueous compositions containing these plasticizers also tend to provide a slower drying profile for clothing/ fabrics, to allow time for any wrinkles to disappear when the clothing/fabrics are hung to dry. This is balanced by the desire by most consumer to have the garments to dry faster. Therefore, when needed, the plasticizers should be used at an effective, but as low as possible, level in the composition. When a hydrophilic plasticizer is used, it is present in the at a level of from 0.01% to 5%, preferably from 0.05% to 2%, more preferably from 0. 1% to 1% by weight of the usage composition.

(e) Mixtures Thereof

The present compositions can also include supplemental wrinkle control agents comprising a variety of mixtures of fabric (fiber) lubricant, shape retention polymer, lithium salts, and hydrophilic plasticizer.

(2) Optional Odor Control Agent

The compositions for odor control are of the type disclosed in U.S. Pat. Nos. 5,534,165; 5,578,563; 5,663,134; 5,668,097; 5,670,475; and 5,714,137, Trinh et al. issued Jul. 9, 1996; Nov. 26, 1996; Sep. 2, 1997; Sep. 16, 1997; Sep. 23, 1997; and Feb. 3, 1998 respectively, all of said patents being incorporated herein by reference. Such compositions can contain several different optional odor control agents in addition to the polymers described hereinbefore that can control amine odors.

(a) Cyclodextrin

As used herein, the term "cyclodextrin" includes any of the known cyclodextrins such as unsubstituted cyclodextrins containing from six to twelve glucose units, especially, alpha-cyclodextrin, beta-cyclodextrin, gamma-cyclodextrin and/or their derivatives and/or mixtures thereof. The alpha-cyclodextrin consists of six glucose units, the betacyclodextrin consists of seven glucose units, and the gamma-cyclodextrin consists of eight glucose units arranged in donut-shaped rings. The specific coupling and conformation of the glucose units give the cyclodextrins a rigid, conical molecular structures with hollow interiors of specific volumes. The "lining" of each internal cavity is formed by hydrogen atoms and glycosidic bridging oxygen atoms; therefore, this surface is fairly hydrophobic. The unique shape and physical-chemical properties of the cavity enable the cyclodextrin molecules to absorb (form inclusion complexes with) organic molecules or parts of organic molecules which can fit into the cavity. Many odorous molecules can fit into the cavity including many malodorous molecules and perfume molecules. Therefore, cyclodextrins, and especially mixtures of cyclodextrins with different size cavities, can be used to control odors caused by a broad spectrum of organic odoriferous materials, which may, or may not, contain reactive functional groups. The complexation between cyclodextrin and odorous molecules occurs rapidly in the presence of water. However, the extent of the complex formation also depends on the polarity of the absorbed molecules. In an aqueous solution, strongly hydrophilic molecules (those which are highly water-soluble) are only partially absorbed, if at all. Therefore, cyclodextrin does not complex effectively with some very low molecular weight organic amines and acids when they are present at low levels on wet fabrics. As the water is being removed however, e.g., the fabric is being dried off, some low molecular weight organic amines and acids have more affinity and will complex with the cyclodextrins more readily.

The cavities within the cyclodextrin in the solution of the present invention should remain essentially unfilled (the cyclodextrin remains uncomplexed) while in solution, in order to allow the cyclodextrin to absorb various odor molecules when the solution is applied to a surface. Non-derivatised (normal) beta-cyclodextrin can be present at a level up to its solubility limit of about 1.85% (about 1.85 g in 100 grams of water) at room temperature. Beta-cyclodextrin is not preferred in compositions which call for a level of cyclodextrin higher than its water solubility limit. Non-derivatised beta-cyclodextrin is generally not preferred when the composition contains surfactant since it affects the surface activity of most of the preferred surfactants that are compatible with the derivatised cyclodextrins.

Preferably, the cyclodextrins used in the present invention are highly water-soluble such as, alpha-cyclodextrin and/or derivatives thereof, gamma-cyclodextrin and/or derivatives thereof, derivatised beta-cyclodextrins, and/or mixtures thereof. The derivatives of cyclodextrin consist mainly of molecules wherein some of the OH groups are converted to OR groups. Cyclodextrin derivatives include, e.g., those with short chain alkyl groups such as methylated cyclodextrins, and ethylated cyclodextrins, wherein R is a methyl or an ethyl group; those with hydroxyalkyl substituted groups, such as hydroxypropyl cyclodextrins and/or hydroxyethyl cyclodextrins, wherein R is a —CH$_2$—CH(OH)—CH$_3$ or a —CH$_2$CH$_2$—OH group; branched cyclodextrins such as maltose-bonded cyclodextrins; cationic cyclodextrins such as those containing 2-hydroxy-3-(dimethylamino)propyl ether, wherein R is CH$_2$—CH(OH)—CH$_2$—N(CH$_3$)$_2$ which is cationic at low pH; quaternary ammonium, e.g., 2-hydroxy-3-(trimethylammonio) propyl ether chloride groups, wherein R is CH$_2$—CH(OH)—CH$_2$—N$^+$(CH$_3$)$_3$C$^-$; anionic cyclodextrins such as carboxymethyl cyclodextrins, cyclodextrin sulfates, and cyclodextrin succinylates; amphoteric cyclodextrins such as carboxymethyl/quaternary ammonium cyclodextrins; cyclodextrins wherein at least one glucopyranose unit has a 3-6-anhydro-cyclomalto structure, e.g., the mono-3-6-anhydrocyclodextrins, as disclosed in "Optimal Performances with Minimal Chemical Modification of Cyclodextrins", F. Diedaini-Pilard and B. Perly, The 7th International Cyclodextrin Symposium Abstracts, Apr. 1994, p. 49, said references being incorporated herein by reference; and mixtures thereof. Other cyclodextrin derivatives are disclosed in U.S. Pat. No. 3,426,011, Parmerter et al., issued Feb. 4, 1969; U.S. Pat. Nos. 3,453,257; 3,453, 258; 3,453,259; and 3,453,260, all in the names of Parmerter et al., and all issued Jul. 1, 1969; U.S. Pat. No. 3,459,731, Gramera et al., issued Aug. 5, 1969; U.S. Pat. No. 3,553,191, Parmerter et al., issued Jan. 5, 1971; U.S. Pat. No. 3,565, 887, Parmerter et al., issued Feb. 23, 1971; U.S. Pat. No. 4,535,152, Szejtli et al., issued Aug. 13, 1985; U.S. Pat. No. 4,616,008, Hirai et al., issued Oct. 7, 1986; U.S. Pat. No. 4,678,598, Ogino et al., issued Jul. 7, 1987; U.S. Pat. No. 4,638,058, Brandt et al., issued Jan. 20, 1987; and U.S. Pat. No. 4,746,734, Tsuchiyama et al., issued May 24, 1988; all of said patents being incorporated herein by reference.

Highly water-soluble cyclodextrins are those having water solubility of at least about 10 g in 100 ml of water at room temperature, preferably at least about 20 g in 100 ml of water, more preferably at least about 25 g in 100 ml of water at room temperature. The availability of solubilized, uncomplexed cyclodextrins is essential for effective and efficient odor control performance. Solubilized, water-soluble cyclodextrin can exhibit more efficient odor control performance than non-water-soluble cyclodextrin when deposited onto surfaces, especially fabric.

Examples of preferred water-soluble cyclodextrin derivatives suitable for use herein are hydroxypropyl alpha-cyclodextrin, methylated alpha-cyclodextrin, methylated beta-cyclodextrin, hydroxyethyl beta-cyclodextrin, and hydroxypropyl beta-cyclodextrin. Hydroxyalkyl cyclodextrin derivatives preferably have a degree of substitution of from about 1 to about 14, more preferably from about 1.5 to about 7, wherein the total number of OR groups per cyclodextrin is defined as the degree of substitution. Methylated cyclodextrin derivatives typically have a degree of substitution of from about 1 to about 18, preferably from about 3 to about 16. A known methylated beta-cyclodextrin is heptakis-2,6-di-O-methyl-β-cyclodextrin, commonly known as DIMEB, in which each glucose unit has about 2 methyl groups with a degree of substitution of about 14. A preferred, more commercially available, methylated beta-cyclodextrin is a randomly methylated beta-cyclodextrin, commonly known as RAMEB, having different degrees of substitution, normally of about 12.6. RAMEB is more preferred than DIMEB, since DIMEB affects the surface activity of the preferred surfactants more than RAMEB. The preferred cyclodextrins are available, e.g., from Cerestar USA, Inc. and Wacker Chemicals (USA), Inc.

It is also preferable to use a mixture of cyclodextrins. Such mixtures absorb odors more broadly by complexing with a wider range of odoriferous molecules having a wider range of molecular sizes. Preferably at least a portion of the cyclodextrins is alpha-cyclodextrin and its derivatives thereof, gammacyclodextrin and its derivatives thereof, and/or derivatised beta-cyclodextrin, more preferably a mixture of alpha-cyclodextrin, or an alpha-cyclodextrin derivative, and derivatised beta-cyclodextrin, even more preferably a mixture of derivatised alpha-cyclodextrin and derivatised beta-cyclodextrin, most preferably a mixture of hydroxypropyl alpha-cyclodextrin and hydroxypropyl beta-cyclodextrin, and/or a mixture of methylated alpha-cyclodextrin and methylated beta-cyclodextrin.

Preferably, the solution used to treat the surface under usage conditions is virtually not discernible when dry. Typical levels of cyclodextrin in usage compositions for usage conditions are from about 0.01% to about 5%, preferably from about 0.1% to about 4%, more preferably from about 0.5% to about 2% by weight of the composition. Compositions with higher concentrations can leave unacceptable visible stains on fabrics as the solution evaporates off of the fabric. This is especially a problem on thin, colored, is synthetic fabrics. In order to avoid or minimize the occurrence of fabric staining, it is preferable that the fabric be treated at a level of less than about 5 mg of cyclodextrin per gram of fabric, more preferably less than about 2 mg of cyclodextrin per gram of fabric. The presence of the surfactant can improve appearance by minimizing localized spotting.

When it is desired to incorporate cyclodextrin into a concentrated product, the cyclodextrin level is typically from about 3% to about 20%, more preferably from about 5% to about 10%, by weight of the concentrated composition, it is preferable to dilute the concentrated composition before treating fabrics in order to avoid staining. The resulting diluted compostion have usage concentrations of cyclodextrin as discussed hereinbefore, e.g., of from about 0.1% to about 5%, by weight of the diluted composition.

Cyclodextrin Preservative

Optionally, but desirably if cyclodextrin is present, preferably solubilized, water soluble, antimicrobial preservative can be added to the composition of the present invention if the antimicrobial material is not sufficient to protect the cyclodextrin, or is not present, because cyclodextrin molecules are made up of varying numbers of glucose units which can make them a prime breeding ground for certain microorganisms, especially when in aqueous compositions. This drawback can lead to the problem of storage stability of cyclodextrin solutions for any significant length of time. Contamination by certain microorganisms with subsequent microbial growth can result in an unsightly and/or malodorous solution. Because microbial growth in cyclodextrin solutions is highly objectionable when it occurs, it is highly preferable to include a solubilized, water-soluble, antimicrobial preservative, which is effective for inhibiting and/or regulating microbial growth in order to increase storage stability of the preferably clear, aqueous odor-absorbing solution containing water-soluble cyclodextrin.

It is preferable to use a broad spectrum preservative, e.g., one that is effective on both bacteria (both gram positive and gram negative) and fungi. A limited spectrum preservative, e.g., one that is only effective on a single group of microorganisms, e.g., fungi, can be used in combination with a broad spectrum preservative or other limited spectrum preservatives with complimentary and/or supplementary activity. A mixture of broad spectrum preservatives can also be used. In some cases where a specific group of microbial contaminants is problematic (such as Gram negatives), aminocarboxylate chelators may be used alone or as potentiators in conjunction with other preservatives. These chelators which include, e.g., ethylenediaminetetraacetic acid (EDTA), hydroxyethylenediaminetriacetic acid, diethylenetriaminepentaacetic acid, and other aminocarboxylate chelators, and mixtures thereof, and their salts, and mixtures thereof, can increase preservative effectiveness against Gram-negative bacteria, especially *Pseudomonas* species.

Antimicrobial preservatives useful in the present invention include biocidal compounds, i.e., substances that kill microorganisms, or biostatic compounds, i.e., substances that inhibit and/or regulate the growth of microorganisms. Suitable preservatives are disclosed in U.S. Pat. Nos. 5,534,165; 5,578,563; 5,663,134; 5,668,097; 5,670,475; and 5,714,137, Trinh et al. issued Jul. 9, 1996; Nov. 26, 1996; Sep. 2, 1997; Sep. 16, 1997; Sep. 23, 1997; and Feb. 3, 1998 respectively, all of said patents being incorporated hereinbefore by reference. Preferred antimicrobial preservatives are those that are water-soluble and are effective at low levels because the organic preservatives can form inclusion complexes with the cyclodextrin molecules and compete with the malodorous molecules for the cyclodextrin cavities, thus rendering the cyclodextrins ineffective as odor controlling actives. Water-soluble preservatives useful in the present invention are those that have a solubility in water of at least about 0.3 g per 100 ml of water, i.e., greater than about 0.3% at room temperature, preferably greater than about 0.5% at room temperature. These types of preservatives have a lower affinity to the cyclodextrin cavity, at least in the aqueous phase, and are therefore more available to provide antimicrobial activity. Preservatives with a water-solubility of less than about 0.3% and a molecular structure that readily fits into the cyclodextrin cavity, have a greater tendency to form inclusion complexes with the cyclodextrin molecules, thus rendering the preservative less effective to control microbes in the cyclodextrin solution. The water-soluble antimicrobial preservative in the present invention is included at an effective amount The term "effective amount" as herein defined means a level sufficient to prevent spoilage, or prevent growth of inadvertently added microorganisms, for a specific period of time. In other words, the preservative is not being used to kill microorganisms on the surface onto which the composition is deposited in order to eliminate odors produced by microorganisms. Instead, it is preferably being used to prevent spoilage of the cyclodextrin solution in order to increase the shelf-life of the composition. Preferred levels of preservative are from about 0.0001% to about 0.5%, more preferably from about 0.0002% to about 0.2%, most preferably from about 0.0003% to about 0.1%, by weight of the usage composition.

In order to reserve most of the cyclodextrins for odor control, the cyclodextrin to preservative molar ratio should be greater than about 5:1, preferably greater than about 10:1, more preferably greater than about 50:1, even more preferably greater than about 100:1.

The preservative can be any organic preservative material which will not cause damage to fabric appearance, e.g., discoloration, coloration, bleaching. Preferred water-soluble preservatives include organic sulfur compounds, halogenated compounds, cyclic organic nitrogen compounds, low molecular weight aldehydes, quaternary ammonium compounds, dehydroacetic acid, phenyl and phenolic compounds, and mixtures thereof.

The preservatives of the present invention can be used in mixtures in order to control a broad range of microorganisms.

Bacteriostatic effects can sometimes be obtained for aqueous compositions by adjusting the composition pH to an acid pH, e.g., less than about pH 4, preferably less than about pH 3, or a basic pH, e.g., greater than about 10, preferably greater than about 11. Low pH for microbial control is not a preferred approach in the present invention because the low pH can cause chemical degradation of surfactant system and the cyclodextrins. High pH for microbial control is also not preferred in compositions containing cyclodextrin because at high pH's, e.g., greater than about 10, preferably greater than about 11, the cyclodextrins can be ionized and their ability to complex with organic materials is reduced. Therefore, when compositions contain optional cyclodextrin, the pH should be at or above about 6 and at or below about 10. When optional cyclodextrin is included it is preferable to adjust the pH with a buffer system that is compatible with cyclodextrin and does not significantly complex with cyclodextrin.

(b) Low Molecular Weight Polyols

Low molecular weight polyols with relatively high boiling points, as compared to water, such as ethylene glycol, propylene glycol and/or glycerol are preferred optional ingredients for improving odor control performance of the composition of the present invention, especially when cyclodextrin is present. The incorporation of a small amount of low molecular weight glycols into the composition of the present invention typically enhances the formation of the cyclodextrin inclusion complexes as the fabric dries.

The polyols' ability to remain on the fabric for a longer period of time than water, as the fabric dries, typically allows it to form ternary complexes with the cyclodextrin and some malodorous molecules. The addition of the glycols tends to fill up void space in the cyclodextrin cavity that is unable to be filled by some malodor molecules of relatively smaller sizes. Preferably the glycol used is glycerin, ethylene glycol, propylene glycol, diethylene glycol, dipropylene glycol or mixtures thereof, and more preferably ethylene glycol and/or propylene glycol. Cyclodextrins prepared by processes that result in a level of such polyols are highly desirable, since they can be used without removal of the polyols.

Some polyols, e.g., dipropylene glycol, are also useful to facilitate the solubilization of some perfume ingredients in the composition of the present invention.

Typically, glycol is added to the composition of the present invention at a level of is from about 0.01% to about 3%, by weight of the composition, preferably from about 0.05% to about 1%, more preferably from about 0.1% to about 0.5%, by weight of the composition. The preferred weight ratio of low molecular weight polyol to cyclodextrin is from about 2:1,000 to about 20:100, more preferably from about 3:1,000 to about 15:100, even more preferably from about 5:1,000 to about 10:100, and most preferably from about 1:100 to about 7:100.

(c) Metal Salts

Optionally, but highly preferred, the present invention can include metallic salts for added odor absorption and/or antimicrobial benefit for the cyclodextrin solution when cyclodextrin is present. The metallic salts are selected from the group consisting of copper salts, zinc salts, and mixtures thereof.

Copper salts have some antimicrobial benefits. Specifically, cupric abietate acts as a fungicide, copper acetate acts as a mildew inhibitor, cupric chloride acts as a fungicide, copper lactate acts as a fungicide, and copper sulfate acts as a germicide. Copper salts also possess some malodor control abilities. See U.S. Pat. No. 3,172,817, Leupold, et al., which discloses deodorizing compositions for treating disposable articles, comprising at least slightly water-soluble salts of acylacetone, including copper salts and zinc salts, all of said patents are incorporated herein by reference.

The preferred zinc salts possess malodor control abilities. Zinc has been used most often for its ability to ameliorate malodor, e.g., in mouth wash products, as disclosed in U.S. Pat. No. 4,325,939, issued Apr. 20, 1982 and U.S. Pat. No. 4,469,674, issued Sep. 4, 1983, to N. B. Shah, et al., all of which are incorporated herein by reference. Highly-ionized and soluble zinc salts such as zinc chloride, provide the best source of zinc ions. Zinc borate functions as a fungistat and a mildew inhibitor, zinc caprylate functions as a fungicide, zinc chloride provides antiseptic and deodorant benefits, zinc ricinoleate functions as a fungicide, zinc sulfate heptahydrate functions as a fungicide and zinc undecylenate functions as a fungistat.

Preferably the metallic salts are water-soluble zinc salts, copper salts or mixtures thereof, and more preferably zinc salts, especially $ZnCl_2$. These salts are preferably present in the present invention primarily to absorb amine and sulfur-containing compounds that have molecular sizes too small to be effectively complexed with the cyclodextrin molecules. Low molecular weight sulfur-containing materials, e.g., sulfide and mercaptans, are components of many types of malodors, e.g., food odors (garlic, onion), body/perspiration odor, breath odor, etc. Low molecular weight amines are also components of many malodors, e.g., food odors, body odors, urine, etc.

When metallic salts are added to the composition of the present invention they are typically present at a level of from about 0.1% to about 10%, preferably from about 0.2% to about 8%, more preferably from about 0.3% to about 5% by weight of the usage composition.

(d) Soluble Carbonate and/or Bicarbonate Salts

Water-soluble alkali metal carbonate and/or bicarbonate salts, such as sodium bicarbonate, potassium bicarbonate, potassium carbonate, cesium carbonate, sodium carbonate, and mixtures thereof can be added to the composition of the present invention in order to help to control certain acid-type odors. Preferred salts are sodium carbonate monohydrate, potassium carbonate, sodium bicarbonate, potassium bicarbonate, and mixtures thereof. When these salts are added to the composition of the present invention, they are typically present at a level of from about 0.1% to about 5%, preferably from about 0.2% to about 3%, more preferably from about 0.3% to about 2%, by weight of the composition. When these salts are added to the composition of the present invention it is preferably that incompatible metal salts not be present in the invention. Preferably, when these salts are used the composition should be essentially free of zinc and other incompatible metal ions, e.g., Ca, Fe, Ba, etc. which form water-insoluble salts.

(e) Enzymes

Enzymes can be used to control certain types of malodor, especially malodor from urine and other types of excretions, including regurgitated materials. Proteases are especially desirable. The activity of commercial enzymes depends very much on the type and purity of the enzyme being considered. Enzymes that are water soluble proteases like pepsin, tripsin, ticin, bromelin, papain, rennin, and mixtures thereof are particularly useful.

Enzymes are normally incorporated at levels sufficient to provide up to about 5 mg by weight, preferably from about 0.001 mg to about 3 mg, more preferably from about 0.002 mg to about 1 mg, of active enzyme per gram of the aqueous compositions. Stated otherwise, the aqueous compositions herein can comprise from about 0.0001% to about 0.5%, preferably from about 0.001% to about 0.3%, more preferably from about 0.005% to about 0.2% by weight of a commercial enzyme preparation. Protease enzymes are usually present in such commercial preparations at levels sufficient to provide from 0.0005 to 0.1 Anson units (AU) of activity per gram of aqueous composition.

Nonlimiting examples of suitable, commercially available, water soluble proteases are pepsin, tripsin, ficin, bromelin, papain, rennin, and mixtures thereof. Papain can be isolated, e.g., from papaya latex, and is available commercially in the purified form of up to, e.g., about 80% protein, or cruder, technical grade of much lower activity. Other suitable examples of proteases are the subtilisins which are obtained from particular strains of *B. subtilis* and *B. licheniforms*. Another suitable protease is obtained from a strain of *Bacillus*, having maximum activity throughout the pH range of 8–12, developed and sold by Novo Industries A/S under the registered trade name ESPERASE®. The preparation of this enzyme and analogous enzymes is described in British Patent Specification No. 1,243,784 of Novo. Proteolytic enzymes suitable for removing protein-based stains that are commercially available include those sold under the trade names ALCALASE® and SAVINASE® by Novo Industries A/S (Denmark) and MAXATASE® by International Bio-Synthetics, Inc. (The Netherlands). Other proteases include Protease A (see European Patent Application 130,756, published Jan. 9, 1985); Protease B (see European Patent Application Serial No. 87303761.8, filed Apr. 28, 1987, and European Patent Application 130,756, Bott et al, published Jan. 9, 1985); and proteases made by Genencor International, Inc., according to one or more of the following patents: Caldwell et al, U.S. Pat. Nos. 5,185,258, 5,204,015 and 5,244,791.

A wide range of enzyme materials and means for their incorporation into liquid compositions are also disclosed in U.S. Pat. No. 3,553,139, issued Jan. 5, 1971 to McCarty et al. Enzymes are further disclosed in U.S. Pat. No. 4,101,457, Place et al, issued Jul. 18, 1978, and in U.S. Pat. No. 4,507,219, Hughes, issued Mar. 26, 1985. Other enzyme materials useful for liquid formulations, and their incorporation into such formulations, are disclosed in U.S. Pat. No. 4,261,868, Hora et al, issued Apr. 14, 1981. Enzymes can be stabilized by various techniques, e.g., those disclosed and exemplified in U.S. Pat. No. 3,600,319, issued Aug. 17, 1971 to Gedge, et al., European Patent Application Publication No. 0 199 405, Application No. 86200586.5, published Oct. 29, 1986, Venegas, and in U.S. Pat. No. 3,519,570. All of the above patents and applications are incorporated herein, at least in pertinent part.

Enzyme-polyethylene glycol conjugates are also preferred. Such polyethylene glycol (PEG) derivatives of enzymes, wherein the PEG or alkoxy-PEG moieties are coupled to the protein molecule through, e.g., secondary amine linkages. Suitable derivatization decreases immunogenicity, thus minimizes allergic reactions, while still maintaining some enzymatic activity. An example of protease-PEG's is PEG-subtilisin Carlsberg from *B. licheniformis* coupled to methoxy-PEGs through secondary amine linkage, and is available from Sigma-Aldrich Corp., St. Louis, Mo.

(f) Zeolites

When the clarity of the solution is not needed, and the solution is not sprayed on fabrics, other optional odor absorbing materials, e.g., zeolites and/or activated carbon, can also be used. A preferred class of zeolites is characterized as "intermediate" silicate/aluminate zeolites. The intermediate zeolites are characterized by $SiO_2/AlO_2$ molar ratios of less than about 10. Preferably the molar ratio of $SiO_2/AlO_2$ ranges from about 2 to about 10. The intermediate zeolites have an advantage over the "high" zeolites. The intermediate zeolites have a higher affinity for amine-type odors, they are more weight efficient for odor absorption because they have a larger surface area, and they are more moisture tolerant and retain more of their odor absorbing capacity in water than the high zeolites. A wide variety of intermediate zeolites suitable for use herein are commercially available as Valfor® CP301-68, Valfor® 300-63, Valfor® CP300-35, and Valfor® CP300-56, available from PQ Corporation, and the CBV100® series of zeolites from Conteka.

Zeolite materials marketed under the trade name Abscents® and Smellrite®, available from The Union Carbide Corporation and UOP are also preferred. These materials are typically available as a white powder in the 3–5 micron particle size range. Such materials are preferred over the intermediate zeolites for control of sulfur-containing odors, e.g., thiols, mercaptans.

(g) Activated Carbon

The carbon material suitable for use in the present invention is the material well known in commercial practice as an absorbent for organic molecules and/or for air purification purposes. Often, such carbon material is referred to as "activated" carbon or "activated" charcoal. Such carbon is available from commercial sources under such trade names as; Calgon-Type CPG®; Type PCB®; Type SGL®; Type CAL®; and Type OL®. Activated carbon fibers and cloth may also be used in combination with the compositions and/or articles of manufacture disclosed herein to provide malodor removal and/or freshness benefits. Such activated carbon fibers and fabrics can be acquired from Calgon.

(h) Mixtures Thereof

Mixtures of the optional odor control agents described above are desirable, especially when the mixture provides control over a broader range of odors.

(3) Optimal Perfume

The wrinkle control composition of the present invention can also optionally provide a "scent signal" in the form of a pleasant odor which provides a freshness to impression to the treated fabrics. The scent signal can be designed to provide a fleeting perfume scent. When perfume is added as a scent signal, it is added only at very low levels, e.g., from about 0% to about 0.5%, preferably from about 0.003% to about 0.3%, more preferably from about 0.005% to about 0.2%, by weight of the usage composition.

Perfume can also be added as a more intense odor in product and on fabrics. When stronger levels of perfume are preferred, relatively higher levels of perfume can be added.

Any type of perfume can be incorporated into the composition of the present invention. The preferred perfume ingredients are those suitable for use to apply on fabrics and garments. Typical examples of such preferred ingredients are given in U.S. Pat. No. 5,445,747, issued Aug. 29, 1995 to Kvietok et al., incorporated herein by reference. When long lasting fragrance odor on fabrics is desired, it is preferred to use at least an effective amount of perfume ingredients which have a boiling point of about 300° C. or higher. Nonlimiting examples of such preferred ingredients are given in U.S. Pat. No. 5,500,138, issued Mar. 19, 1996 to Bacon et al., incorporated herein by reference. It is also preferred to use materials that can slowly release perfume ingredients after the fabric is treated by the wrinkle control composition of this invention. Examples of materials of this type are given in U.S. Pat. No. 5,531,910, Severns et al., issued Jul. 2, 1996, said patent being incorporated herein by reference.

When cyclodextrin is present, it is essential that the perfume be added at a level wherein even if all of the perfume in the composition were to complex with the cyclodextrin molecules when cyclodextrin is present, there will still be an effective level of uncomplexed cyclodextrin molecules present in the solution to provide adequate odor control. In order to reserve an effective amount of cyclodextrin molecules for odor control when cyclodextrin is present, perfume is typically present at a level wherein less than about 90% of the cyclodextrin complexes with the perfume, preferably less than about 50% of the cyclodextrin complexes with the perfume, more preferably, less than about 30% of the cyclodextrin complexes with the perfume, and most preferably, less than about 10% of the cyclodextrin complexes with the perfume. The cyclodextrin to perfume weight ratio should be greater than about 8:1, preferably greater than about 10:1, more preferably greater than about 20:1, even more preferably greater than about 40:1 and most preferably greater than about 70:1.

Preferably the perfume is hydrophilic and is composed predominantly of ingredients selected from two groups of ingredients, namely, (a) hydrophilic ingredients having a ClogP of less than about 3.5, more preferably less than about 3.0, and (b) ingredients having significant low detection threshold, and mixtures thereof. Typically, at least about 50%, preferably at least about 60%, more preferably at least about 70%, and most preferably at least about 80% by weight of the perfume is composed of perfume ingredients of the above groups (a) and (b). For these preferred perfumes, the cyclodextrin to perfume weight ratio is typically of from about 2:1 to about 200:1; preferably from about 4:1 to about 100:1, more preferably from about 6:1 to about 50:1, and even more preferably from about 8:1 to about 30:1.

(a) Hydrophilic Perfume Ingredients

The hydrophilic perfume ingredients are more soluble in water, have less of a tendency to complex with the cyclodextrins, and are more available in the odor absorbing composition than the ingredients of conventional perfumes. The degree of hydrophobicity of a perfume ingredient can be correlated with its octanol/water partition coefficient P. The octanol/water partition coefficient of a perfume ingredient is the ratio between its equilibrium concentration in octanol and in water. A perfume ingredient with a greater partition coefficient P is considered to be more hydrophobic. Conversely, a perfume ingredient with a smaller partition coefficient P is considered to be more hydrophilic. Since the partition coefficients of the perfume ingredients normally have high values, they are more conveniently given in the form of their logarithm to the base 10, logP. Thus the preferred perfume hydrophilic perfume ingredients of this invention have logP of about 3.5 or smaller, preferably of about 3.0 or smaller.

The logp of many perfume ingredients have been reported; for example, the Pomona92 database, available from Daylight Chemical Information Systems, Inc. (Daylight CIS), Irvine, Calif., contains many, along with citations to the original literature. However, the logp values are most conveniently calculated by the "CLOGP" program, also available from Daylight CIS. This program also lists experimental logp values when they are available in the Pomona92 database. The "calculated logP" (Clogp) is determined by the fragment approach of Hansch and Leo (cf., A. Leo, in Comprehensive Medicinal Chemistry, Vol. 4, C. Hansch, P. G. Sammens, J. B. Taylor and C. A. Ramsden, Eds., p. 295, Pergamon Press, 1990, incorporated herein by reference). The fragment approach is based on the chemical structure of each perfume ingredient, and takes into account the numbers and types of atoms, the atom connectivity, and chemical bonding. The ClogP values, which are the most reliable and widely used estimates for this physicochemical property, are used instead of the experimental logp values in the selection of perfume ingredients which are useful in the present invention.

Non-limiting examples of the more preferred hydrophilic perfume ingredients are allyl amyl glycolate, allyl caproate, amyl acetate, amyl propionate, anisic aldehyde, anisyl acetate, anisole, benzaldehyde, benzyl acetate, benzyl acetone, benzyl alcohol, benzyl formate, benzyl iso valerate, benzyl propionate, beta gamma hexenol, calone, camphor gum, laevo-carveol, d-carvone, laevo-carvone, cinnamic alcohol, cinnamyl acetate, cinnamic alcohol, cinnamyl formate, cinnamyl propionate, cis-jasmone, cis-3-hexenyl acetate, coumarin, cuminic alcohol, cuminic aldehyde, Cyclal C, cyclogalbanate, dihydroeuginol, dihydro isojasmonate, dimethyl benzyl carbinol, dimethyl benzyl carbinyl acetate, ethyl acetate, ethyl aceto acetate, ethyl amyl ketone, ethyl anthranilate, ethyl benzoate, ethyl butyrate, ethyl cinnamate, ethyl hexyl ketone, ethyl maltol, ethyl-2-methyl butyrate, ethyl methylphenyl glycidate, ethyl phenyl acetate, ethyl salicylate, ethyl vanillin, eucalyptol, eugenol, eugenyl acetate, eugenyl formate, eugenyl methyl ether, fenchyl alcohol, flor acetate (tricyclo decenyl acetate), fructone, frutene (tricyclo decenyl propionate), geraniol, geranyl oxyacetaldehyde, heliotropin, hexenol, hexenyl acetate, hexyl acetate, hexyl formate, hinokitiol, hydrotropic alcohol, hydroxycitronellal, hydroxycitronellal diethyl acetal, hydroxycitronellol, indole, isoamyl alcohol, iso cyclo citral, isoeugenol, isoeugenyl acetate, isomenthone, isopulegyl acetate, isoquinoline, keone, ligustral, linalool, linalool oxide, linalyl formate, lyral, menthone, methyl acetophenone, methyl amyl ketone, methyl anthranilate, methyl benzoate, methyl benzyl acetate, methyl cinnamate, methyl dihydrojasmonate, methyl eugenol, methyl heptenone, methyl heptine carbonate, methyl heptyl ketone, methyl hexyl ketone, methyl isobutenyl tetrahydropyran, methyl-N-methyl anthranilate, methyl beta naphthyl ketone, methyl phenyl carbinyl acetate, methyl salicylate, nerol, nonalactone, octalactone, octyl alcohol (octanol-2), para-anisic aldehyde, para-cresol, para-cresyl methyl ether, para hydroxy phenyl butanone, para-methoxy acetophenone, para-methyl acetophenone, phenoxy ethanol, phenoxyethyl propionate, phenyl acetaldehyde, phenylacetaldehyde diethyl ether, phenylethyl oxyacetaldehyde, phenyl ethyl acetate, phenyl ethyl alcohol, phenyl ethyl dimethyl carbinol, prenyl acetate, propyl butyrate, pulegone, rose oxide, safrole, terpineol, vanillin, viridine, and mixtures thereof.

Nonlimiting examples of other preferred hydrophilic perfume ingredients which can be used in perfume compositions of this invention are allyl heptoate, amyl benzoate, anethole, benzophenone, carvacrol, citral, citronellol, citronellyl nitrile, cyclohexyl ethyl acetate, cymal, 4-decenal, dihydro isojasmonate, dihydro myrcenol, ethyl methyl phenyl glycidate, fenchyl acetate, florhydral, gamma-nonalactone, geranyl formate, geranyl nitrile, hexenyl isobutyrate, alpha-ionone, isobornyl acetate, isobutyl benzoate, isononyl alcohol, isomenthol, para-isopropyl phenylacetaldehyde, isopulegol, linalyl acetate, 2-methoxy naphthalene, menthyl acetate, methyl chavicol, musk ketone, beta naphthol methyl ether, neral, nonyl aldehyde, phenyl heptanol, phenyl hexanol, terpinyl acetate, Veratrol, yara-yara, and mixtures thereof.

The preferred perfume compositions used in the present invention contain at least 4 different hydrophilic perfume ingredients, preferably at least 5 different hydrophilic perfume ingredients, more preferably at least 6 different hydrophilic perfume ingredients, and even more preferably at least 7 different hydrophilic perfume ingredients. Most common perfume ingredients which are derived from natural sources are composed of a multitude of components. When each such material is used in the formulation of the preferred perfume compositions of the present invention, it is counted as one single ingredient, for the purpose of defining the invention.

(b) Low Odor Detection Threshold Perfume Ingredients

The odor detection threshold of an odorous material is the lowest vapor concentration of that material which can be olfactorily detected. The odor detection threshold and some odor detection threshold values are discussed in, e.g., "Standardized Human Olfactory Thresholds", M. Devos et al, IRL Press at Oxford University Press, 1990, and "Compilation of Odor and Taste Threshold Values Data", F. A. Fazzalari, editor, ASTM Data Series DS 48A, American Society for Testing and Materials, 1978, both of said publications being incorporated by reference. The use of small amounts of perfume ingredients that have low odor detection threshold values can improve perfume odor character, even though they are not as hydrophilic as perfume ingredients of group (a) which are given hereinabove. Perfume ingredients that do not belong to group (a) above, but have a significantly low detection threshold, useful in the composition of the present invention, are selected from the group consisting of ambrox, bacdanol, benzyl salicylate, butyl anthranilate, cetalox, damascenone, alpha-damascone, gamma-dodecalactone, ebanol, herbavert, cis-3-hexenyl salicylate, alpha-ionone, beta-ionone, alpha-isomethylionone, lilial, methyl nonyl ketone, gamma-undecalactone, undecylenic aldehyde, and mixtures thereof. These materials are preferably present at low levels in addition to the hydrophilic ingredients of group (a), typically less than about 20%, preferably less than about 15%, more preferably less than about 10%, by weight of the total perfume compositions of the present invention. However, only low levels are required to provide an effect.

There are also hydrophilic ingredients of group (a) that have a significantly low detection threshold, and are especially useful in the composition of the present invention. Examples of these ingredients are allyl amyl glycolate, anethole, benzyl acetone, calone, cinnamic alcohol, coumarin, cyclogalbanate, Cyclal C, cymal, 4-decenal, dihydro isojasmonate, ethyl anthranilate, ethyl-2-methyl butyrate, ethyl methylphenyl glycidate, ethyl vanillin, eugenol, flor acetate, florhydral, fructone, frutene, heliotropin, keone, indole, iso cyclo citral, isoeugenol, lyral, methyl heptine carbonate, linalool, methyl anthranilate, methyl dihydrojasmonate, methyl isobutenyl tetrahydropyran, methyl beta naphthyl ketone, beta naphthol methyl ether, nerol, para-anisic aldehyde, para hydroxy phenyl butanone, phenyl acetaldehyde, vanillin, and mixtures thereof. Use of low odor detection threshold perfume ingredients minimizes the level of organic material that is released into the atmosphere.

(4) Optional Antimicrobial Active

Optionally, the wrinkle control composition of the present invention comprise an effective amount, to kill, or reduce the growth of microbes, of antimicrobial active; with the lower levels set typically at or above about 0.005%, preferably at or above about 0.001%, more preferably at or above about 0.002%, even more preferably at or above about 0.01% and still more preferably 0.02% by weight of the composition and the higher levels set typically at or below about 2%, preferably at or below about 1%, more preferably at or below about 0.7% by weight of the composition. The effective antimicrobial active can function as disinfectants/sanitizers, and is useful in providing protection against organisms that become attached to the fabrics.

Given below are nonlimiting examples of antimicrobial actives which are useful in the present invention:
Pyrithiones, especially the zinc complex (ZPT); Octopirox; Parabens, including Methylparaben, Propylparaben, Butylparaben, Ethylparaben, Isopropylparaben, Isobutylparaben, Benzylparaben, Sodium Methylparaben, and Sodium Propylparaben; DMDM Hydantoin (Glydant); Methylchloroisothiazolinone/methylisothiazolinone (Kathon® CG); 1,2benzisothiazolin-3-one (Proxel® GXL), Sodium Sulfite; Sodium Bisulfite; Imidazolidinyl Urea; Diazolidinyl Urea (Germail 2); Sorbic Acid/Potassium Sorbate; Dehydroacetic Acid/Sodium Dehydroacetate; Benzyl Alcohol; Sodium Borate; 2-Bromo-2-nitropropane-1,3-diol (Bronopol); Formalin; Iodopropynyl Butylcarbamate; Boric Acid; Chloroacetamide; Methenamine; Methyldibromo Glutaronitrile; Glutaraldehyde; Hexamidine Isethionate; 5-bromo-5-nitro-1,3-dioxane; Phenethyl Alcohol; o-Phenylphenol/sodium o-phenylphenol; Sodium Hydroxymethylglycinate; Polymethoxy Bicyclic Oxazolidine; Dimethoxane; Thimersol; Dichlorobenzyl alcohol; Captan; Chlorphenenesin; Dichlorophene; Chlorbutanol; Phenoxyethanol; Phenoxyisopropanol; Halogenated Diphenyl Ethers; 2,4,4'-trichloro-2'-hydroxy-diphenyl ether (Triclosan); 2,2'-dihydroxy-5,5'-dibromo-diphenyl ether; Phenolic Compounds—(including phenol and its homologs, mono- and poly-alkyl and aromatic halophenols, resorcinol and its derivatives, bisphenolic compounds and halogenated salicylanilides); Phenol and its Homologs including Phenol, 2 Methyl Phenol, 3 Methyl Phenol, 4 Methyl Phenol, 4 Ethyl Phenol, 2,4-Dimethyl Phenol, 2,5-Dimethyl Phenol, 3,4-Dimethyl Phenol, 2,6-Dimethyl Phenol, 4-n-Propyl Phenol, 4-n-Butyl Phenol, 4-n-Amyl Phenol, 4-tert-Amyl Phenol, 4-n-Hexyl Phenol, and 4-n-Heptyl Phenol; Monoand Poly-Alkyl and Aromatic Halophenols including p-Chlorophenol, Methyl p-Chlorophenol, Ethyl p-Chlorophenol, n-Propyl p-Chlorophenol, n-Butyl p-Chlorophenol, n-Amyl p-Chlorophenol, sec-Amyl p-Chlorophenol, n-Hexyl p-Chlorophenol, Cyclohexyl p-Chlorophenol, n-Heptyl p-Chlorophenol, n-Octyl p-Chlorophenol, o-Chlorophenol, Methyl o-Chlorophenol, Ethyl o-Chlorophenol, n-Propyl o-Chlorophenol, n-Butyl o-Chlorophenol, n-Amyl o-Chlorophenol, tert-Amyl o-Chlorophenol, n-Hexyl o-Chlorophenol, n-Heptyl o-Chlorophenol, o-Benzyl p-Chlorophenol, o-benzyl-m-methyl p-Chlorophenol, o-Benzyl-m, m-dimethyl p-Chlorophenol, o-Phenylethyl p-Chlorophenol, o-Phenylethyl-m-methyl p-Chlorophenol, 3-Methyl p-Chlorophenol, 3,5-Dimethyl p-Chlorophenol, 6-Ethyl-3-methyl p-Chlorophenol, 6-n-Propyl-3-methyl p-Chlorophenol, 6-iso-Propyl-3-methyl p-Chlorophenol, 2-Ethyl-3,5-dimethyl p-Chlorophenol, 6-sec-Butyl-3-methyl p-Chlorophenol, 2-iso-Propyl-3,5-dimethyl p-Chlorophenol, 6-Diethylmethyl-3-methyl p-Chlorophenol, 6-iso-Propyl-2-ethyl-3-methyl p-Chlorophenol, 2-sec-Amyl-3,5-dimethyl p-Chlorophenol, 2-Diethylmethyl-3,5-dimethyl p-Chlorophenol, 6-sec-Octyl-3-methyl p-Chlorophenol, p-Chloro-m-cresol, p-Bromophenol, Methyl p-Bromophenol, Ethyl p-Bromophenol, n-Propyl p-Bromophenol, n-Butyl p-Bromophenol, n-Amyl p-Bromophenol, sec-Amyl p-Bromophenol, n-Hexyl p-Bromophenol, cyclohexyl p-Bromophenol, o-Bromophenol, tert-Amyl o-Bromophenol, n-Hexyl o-Bromophenol, n-Propyl-m,m-Dimethyl o-Bromophenol, 2-Phenyl Phenol, 4-Chlom-2-methyl phenol, 4-Chloro-3-methyl phenol, 4-Chloro-3,5-dimethyl phenol, 2,4-dichloro-3,5-dimethylphenol, 3,4,5,6-terabromo-2-methylphenol, 5-methyl-2-pentylphenol, 4-isopropyl-3-methylphenol, para-chloro-meta-xylenol (PCMX), 5-Chloro-2-hydroxydiphenylmethane; Resorcinol and its Derivatives including Resorcinol, Methyl Resorcinol, Ethyl Resorcinol, n-Propyl Resorcinol, n-Butyl Resorcinol, n-Amyl Resorcinol, n-Hexyl Resorcinol, n-Heptyl Resorcinol, n-Octyl Resorcinol, n-Nonyl Resorcinol, Phenyl Resorcinol, Benzyl Resorcinol, Phenylethyl Resorcinol, Phenylpropyl Resorcinol, p-Chlorobenzyl Resorcinol, 5-Chloro 2,4-Dihydroxydiphenyl Methane, 4'-Chloro 2,4-Dihydroxydiphenyl Methane, 5-Bromo 2,4-Dihydroxydiphenyl Methane, and 4'-Bromo 2,4Dihydroxydiphenyl Methane; Bisphenolic Compounds including 2,2'-, methylene bis(4-chlorophenol), 2,2'-methylene bis(3,4,6-trichlorophenol), 2,2'-methylene bis(4-chloro-6-bromophenol), bis(2-hydroxy-3,5-dichlorophenyl) sulphide, and bis(2-hydroxy-5-chlorobenzyl)sulphide; Benzoic Esters including p-Hydroxybenzoic Acid, Methyl p-Hydroxybenzoic Acid, Ethyl p-Hydroxybenzoic Acid, Propyl p-Hydroxybenzoic Acid, and Butyl p-Hydroxybenzoic Acid.

Another class of antibacterial agents, which are useful in the present invention, are the so-called "natural" antibacterial actives, referred to as natural essential oils. These actives derive their names from their natural occurrence in plants. Typical natural essential oil antibacterial actives include oils of anise, lemon, orange, rosemary, wintergreen, thyme, lavender, cloves, hops, tea tree, citronella, wheat, barley, lemongrass, cedar leaf, cedarwood, cinnamon, fleagrass, geranium, sandalwood, violet, cranberry, eucalyptus, vervain, peppermint, gum benzoin, *Hydastis carradensis, Berberidaceae. daceae, Ratanhiae* and *Curcuma longa.*

Also included in this class of natural essential oils are the key chemical components of the plant oils which have been found to provide the antimicrobial benefit. These chemicals include, but are not limited to anethol, catechole, camphene, thymol, eugenol, eucalyptol, ferulic acid, farnesol, hinokitiol, tropolone, limonene, menthol, methyl salicylate, salicylic acid, thymol, terpineol, verbenone, berberine, ratanhiae extract, caryophellene oxide, citric acid, citronellic acid, curcumin, nerolidol, geraniol and benzoic acid.

Additional active agents are antibacterial metal salts. This class generally includes salts of metals in groups 3b–7b, 8 and 3a–5a. Specifically are the salts of aluminum, zirconium, zinc, silver, gold, copper, lanthanum, tin, mercury, bismuth, selenium, strontium, scandium, yttrium, cerium, praseodymiun, neodymium, promethum, samarium, europium, gadolinium, terbium, dysprosium, holmium, erbium, thulium, ytterbium, lutetium and mixtures thereof.

Preferred antimicrobial agents for use herein are the broad spectrum actives selected from the group consisting of Triclosan, phenoxyisopropanol, phenoxyethanol, PCMX, natural essential oils and their key ingredients, and mixtures thereof. The most preferred antimicrobial active for use in the present invention is Triclosan.

(a) Ouaternary Compounds

A wide range of quaternary compounds can also be used as antimicrobial actives, in conjunction with the preferred surfactants, for compositions of the present invention. Non-limiting examples of useful quaternary compounds include: (1) benzalkonium chlorides and/or substituted benzalkonium chlorides such as commercially available Barquat® (available from Lonza), Maquat® (available from Mason), Variquat® (available from Witco/Sherex), and Hyamine® (available from Lonza); (2) di($C_6$–$C_{14}$)alkyl di-short chain ($C_{1-4}$ alkyl and/or hydroxyalkyl) quaternary such as Bardac® products of Lonza. These quaternary compounds contain two relatively short chains, e.g., $C_{1-4}$ alkyl and/or hydroxy alkyl groups and two $C_{6-12}$, preferably $C_{6-10}$, and more preferably $C_8$, alkyl groups,(3) N-(3-chloroallyl) hexaminium chlorides such as Dowicide® and Dowicil® available from Dow; (4) benzethonium chloride such as Hyamine® 1622 from Rohm & Haas; (5) methylbenzethonium chloride represented by Hyamine® 10× supplied by Rohm & Haas, (6) cetylpyridinium chloride such as Cepacol chloride available from of Merrell Labs. Examples of the preferred dialkyl quaternary compounds are didecyl dimethyl ammonium chlorid (Bardac® 2250) di($C_8$–$C_{12}$)dialkyl dimethyl ammonium chloride, such as didecyldimethylammonium chloride (Bardac® 22), and dioctyldimethylammonium chloride (Bardac® 2050). Typical concentrations for biocidal effectiveness of these quaternary compounds range from about 0.001% to about 0.8%, preferably from about 0.005% to about 0.3%, more preferably from about 0.01% to 0.2%, by weight of the usage composition. The corresponding concentrations for the concentrated compositions are from about 0.003% to about 2%, preferably from about 0.006% to about 1.2%, and more preferably from about 0.1% to about 0.8% by weight of the concentrated compositions.

When cyclodextrin is present, the solubilized, water-soluble antimicrobial active is useful in providing protection against organisms that become attached to the treated fabrics. The antimicrobial should be cyclodextrin-compatible, e.g., not substantially forming complexes with the cyclodextrin in the odor absorbing composition when cyclodextrin is present. The free, uncomplexed antimicrobial, e.g., antibacterial, active provides an optimum antibacterial performance.

Sanitization of fabrics can be achieved by the compositions of the present invention containing, antimicrobial materials, e.g., antibacterial halogenated compounds, quaternary compounds, and phenolic compounds.

(h) Biguanides

Some of the more robust cyclodextrin-compatible antimicrobial halogenated compounds which can function as disinfectants/sanitizers as well as finish product preservatives (vide infra), and are useful in the compositions of the present invention include 1,1'-hexamethylene bis(5-(p-chlorophenyl)biguanide), commonly known as chlorhexidine, and its salts, e.g., with hydrochloric, acetic and gluconic acids. The digluconate salt is highly water-soluble, about 70% in water, and the diacetate salt has a solubility of about 1.8% in water. When chlorhexidine is used as a sanitizer in the present invention it is typically present at a level of from about 0.001% to about 0.4%, preferably from about 0.002% to about 0.3%, and more preferably from about 0.05% to about 0.2%, by weight of the usage composition. In some cases, a level of from about 1% to about 2% may be needed for virucidal activity.

Other useful biguanide compounds include Cosmocil® CQ®, Vantocil® IB, including poly (hexamethylene biguanide) hydrochloride. Other useful cationic antimicrobial agents include the bis-biguanide alkanes. Usable water soluble salts of the above are chlorides, bromides, sulfates, alkyl sulfonates such as methyl sulfonate and ethyl sulfonate, phenylsulfonates such as p-methylphenyl sulfonates, nitrates, acetates, gluconates, and the like.

Examples of suitable bis biguanide compounds are chlorhexidine; 1,6-bis-(2-ethylhexylbiguanidohexane) dihydrochloride; 1,6-di-($N_1,N_1$'-phenyldiguanido-$N_5,N_5$')-hexane tetrahydrochloride; 1,6di-($N_1,N_1$'-phenyl-$N_1,N_1$'-methyldiguanido-$N_5,N_5$')-hexane dihydrochloride; 1,6-di($N_1,N_1$'-o-chlorophenyldiguanido-$N_5,N_5$')-hexane dihydrochloride; 1,6-di($N_1,N_1$'-2,6-dichlorophenyl-diguanido-$N_5,N_5$')hexane dihydrochloride; 1,6-di[$N_1,N_1$'-.beta.-(p-methoxyphenyl) diguanido-$N_5,N_5$']-hexane dihydrochloride; 1,6-di($N_1,N_1$'-.alpha.-methyl-.beta.-phenyldiguanido-$N_5,N_5$')-hexane dihydrochloride; 1,6-di ($N_1,N_1$'-p-nitrophenyldiguanido-$N_5,N_5$')hexane dihydrochloride;.omega.:.omega.'-di-($N_1,N_1$'-phenyldiguanido-$N_5,N_5$')-di-n-propylether dihydrochloride;.omega:omega'-di($N_1,N_1$'-p-chlorophenyldiguanido-$N_5,N_5$')-di-n-propylether tetrahydrochloride; 1,6-di($N_1,N_1$'-2,4dichlorophenyldiguanido-$N_5,N_5$')hexane tetrahydrochloride; 1,6-di($N_1,N_1$'-p-methylphenyldiguanido-$N_5,N_5$')hexane dihydrochloride; 1,6-di($N_1,N_1$'-2,4,5-trichlorophenyldiguanido-$N_5,N_5$') hexane tetrahydrochloride; 1,6-di[$N_1,N_1$'-.alpha.-(p-chlorophenyl) ethyldiguanido-$N_5,N_5$'] hexane dihydrochloride;.omega.:.omega.'di($N_1,N_1$'-p-chlorophenyldiguanido-$N_5,N_5$')m-xylene dihydrochloride; 1,12-di($N_1,N_1$'-p-chlorophenyldiguanido-$N_5,N_5$') dodecane dihydrochloride; 1,10-di($N_1,N_1$'-phenyldiguanido-$N_5,N_5$')-decane tetrahydrochloride; 1,12-di($N_1,N_1$'-phenyldiguanido-$N_5,N_5$') dodecane tetrahydrochloride; 1,6-di($N_1,N_1$'-o-chlorophenyldiguanido-$N_5,N_5$') hexane dihydrochloride; 1,6-di($N_1,N_1$'-p-chlorophenyldiguanido-$N_5,N_5$')-hexane tetrahydrochloride; ethylene bis(1-tolyl biguanide); ethylene bis(p-tolyl biguanide); ethylene bis(3,5-dimethylphenyl biguanide); ethylene bis(p-tert-amylphenyl biguanide); ethylene bis(nonylphenyl biguanide); ethylene his (phenyl biguanide); ethylene bis(N-butylphenyl biguanide); ethylene bis(2,5-diethoxyphenyl biguanide); ethylene bis(2,4-dimethylphenyl biguanide); ethylene bis(o-diphenylbiguanide); ethylene bis(mixed amyl naphthyl biguanide); N-butyl ethylene bis (phenylbiguanide); trimethylene bis(o-tolyl biguanide); N-butyl trimethylene bis(phenyl biguanide); and the corresponding pharmaceutically acceptable salts of all of the above such as the acetates; gluconates; hydrochlorides; hydrobromides; citrates; bisulfites; fluorides; polymaleates; N-coconutalkylsarcosinates; phosphites; hypophosphites; perfluorooctanoates; silicates; sorbates; salicylates; maleates; tartrates; fumarates; ethylenediaminetetraacetates; iminodiacetates; cinnamates; thiocyanates; arginates; pyromellitates; tetracarboxybutyrates; benzoates; glutarates; monofluorophosphates; and perfluoropropionates, and mixtures thereof. Preferred antimicrobials from this group are 1,6-di-($N_1,N_1$'-phenyldiguanido-$N_5,N_5$')-hexane tetrahydrochloride; 1,6-di($N_1,N_1$'-o-chlorophenyldiguanido-$N_5,N_5$')-hexane dihydrochloride; 1,6di($N_1,N_1$'-2,6-dichlorophenyldiguanido-$N_5,N_5$')hexane dihydrochloride; 1,6-di($N_1,N_1$'-2,4-dichlorophenyldiguanido-$N_5,N_5$')hexane tetrahydrochloride; 1,6-di[$N_1,N_1$'-.alpha.-(p-chlorophenyl) ethyldiguanido-$N_5,N_5$'] hexane dihydrochloride;.omega.:.omega.'di($N_1,N_1$'-p-chlorophenyldiguanido-$N_5,N_5$')m-xylene dihydrochloride; 1,12-di($N_1,N_1$'-p-chlorophenyldiguanido-$N_5,N_5$') dodecane dihydrochloride; 1,6-di($N_1,N_1$'-o-chlorophenyldiguanido-$N_5,N_5$') hexane dihydrochloride; 1,6-di($N_1,N_1$'-p-chlorophenyldiguanido-$N_5,N_5$')-hexane tetrahydrochloride; and mixtures thereof; more preferably, 1,6-di($N_1,N_1$'-o-chlorophenyldiguanido-$N_5,N_5$')-hexane dihydrochloride; 1,6-di($N_1,N_1$'-2,6-dichlorophenyldiguanido-$N_5,N_5$')hexane dihydrochloride; 1,6-di($N_1,N_1$'-2,4-dichlorophenyl-diguanido-$N_5,N_5$')hexane tetrahydrochloride; 1,6-di[$N_1,N_1$'-.alpha.-(p-chlorophenyl) ethyldiguanido-$N_5,N_5$'] hexane dihydrochloride;.omega.:.omega.'di($N_1,N_1$'-p-chlorophenyldiguanido-$N_5,N_5$')m-xylene dihydrochloride; 1,12-di($N_1,N_1$'-p-chlorophenyldiguanido-$N_5,N_5$') dodecane dihydrochloride; 1,6-di($N_1,N_1$'-o-chlorophenyldiguanido-$N_5,N_5$') hexane dihydrochloride; 1,6-di($N_1,N_1$'-p-chlorophenyldiguanido-$N_5,N_5$')-hexane tetrahydrochloride; and mixtures thereof As stated hereinbefore, the bis biguanide of choice is chlorhexidine its salts, e.g., digluconate, dihydrochloride, diacetate, and mixtures thereof The surfactants, when added to the antimicrobials tend to provide improved antimicrobial action. This is especially true for the siloxane surfactants, and especially when the siloxane surfactants are combined with the chlorhexidine antimicrobial actives.

(5) Optional Aminocarboxylate Chelators

Chelators, e.g., ethylenediaminetetraacetic acid (EDTA), hydroxyethylene-diaminetriacetic acid, diethylenetriamine-pentaacetic acid, and other aminocarboxylate chelators, and mixtures thereof, and their salts, and mixtures thereof, can optionally be used to increase antimicrobial and preservative effectiveness against Gram-negative bacteria, especially *Pseudomonas* species. Although sensitivity to EDTA and other aminocarboxylate chelators is mainly a characteristic of *Pseudomonas* species, other bacterial species highly susceptible to chelators include *Achromobacter, Alcaligenes, Azotobacter, Escherichia, Salmonella, Spirillum,* and *Vibrio.* Other groups of organisms also show increased sensitivities to these chelators, including fungi and yeasts. Furthermore, aminocarboxylate chelators can help, e.g., maintaining product clarity, protecting fragrance and perfume components, and preventing rancidity and off odors.

Although these aminocarboxylate chelators may not be potent biocides in their own right, they function as potentiators for improving the performance of other antimicrobials/preservatives in the compositions of the present invention. Aminocarboxylate chelators can potentiate the performance of many of the cationic, anionic, and nonionic antimicrobials/preservatives, phenolic compounds, and isothiazolinones, that are used as antimicrobials/ preservatives in the composition of the present invention. Nonlimiting examples of cationic antimicrobials/ preservatives potentiated by aminocarboxylate chelators in solutions are chlorhexidine salts (including digluconate, diacetate, and dihydrochloride salts), and Quaternium-15, also known as Dowicil 200, Dowicide Q, Preventol D1, benzalkonium chloride, cetrimonium, myristalkonium chloride, cetylpyridinium chloride, lauryl pyridinium chloride, and the like. Nonlimiting examples of useful anionic antimicrobials/preservatives which are enhanced by aminocarboxylate chelators are sorbic acid and potassium sorbate. Nonlimiting examples of useful nonionic antimicrobials/preservatives which are potentiated by aminocarboxylate chelators are DMDM hydantoin, phenethyl alcohol, monolaurin, imidazolidinyl urea, and Bronopol (2-bromo-2-nitropropane-1,3-diol).

Examples of useful phenolic antimicrobials/preservatives potentiated by these chelators are chloroxylenol, phenol, tert-butyl hydroxyanisole, salicylic acid, resorcinol, and sodium o-phenyl phenate. Nonlimiting examples of isothiazolinone antimicrobials/preservatives which are enhanced by aminocarboxylate chelators are Kathon®, Proxel® and Promexal®.

The optional chelators are present in the compositions of this invention at levels of, typically, from about 0.01% to about 0.3%, more preferably from about 0.02% to about 0.1%, most preferably from about 0.02% to about 0.05% by weight of the usage compositions to provide antimicrobial efficacy in this invention.

Free, uncomplexed aminocarboxylate chelators are required to potentiate the efficacy of the antimicrobials. Thus, when excess alkaline earth (especially calcium and magnesium) and transitional metals (iron, manganese, copper, and others) are present, free chelators are not available and antimicrobial potentiation is not observed. In the case where significant water hardness or transitional metals are available or where product esthetics require a specified chelator level, higher levels may be required to allow for the availability of free, uncomplexed aminocarboxylate chelators to function as antimicrobial/preservative potentiators.

Other Optional Ingredients

The composition of the present invention can optionally contain other adjunct odor-controlling materials, chelating agents, additional antistatic agents if more static control is desired, insect and moth repelling agents, colorants, especially bluing agents, anti-clogging agents, antioxidants, and mixtures thereof in addition to the antiwrinkle ingredients, e.g., cyclic silicone molecules. The total level of optional ingredients is low, preferably less than about 5%, more preferably less than about 3%, and even more preferably less than about 2%, by weight of the usage composition. These optional ingredients exclude the other ingredients specifically mentioned hereinbefore. Incorporating adjunct odor-controlling materials can enhance the capacity of the cyclodextrin to control odors as well as broaden the range of odor types and molecule sizes which can be controlled. Such materials include, for example, the metallic salts described hereinbefore, water-soluble cationic and anionic polymers in addition to those already disclosed, zeolites as discussed hereinbefore, water-soluble bicarbonate salts, and mixtures thereof.

(6) Optional Water-Soluble Polyionic Polymers

Some water-soluble polyionic polymers, e.g., water-soluble cationic polymer and water-soluble anionic polymers in addition to those discussed hereinbefore, can be used in the composition of the present invention to provide additional odor control benefits.

(a) Cationic Polymers, e.g., Polyamines

Water-soluble cationic polymers, e.g., those containing amino functionalities, amido functionalities, and mixtures thereof, are useful in the present invention to control certain acid-type odors.

(b) Anionic Polymers. e.g., Polyacrylic Acid

Water-soluble anionic polymers in addition to those described hereinbefore, e.g., polyacrylic acids and their water-soluble salts are useful in the present invention to control certain amine-type odors. Preferred polyacrylic acids and their alkali metal salts have an average molecular weight of less than about 20,000, more preferably less than 5,000000, preferably less than 10,000, more preferably from about 500 to about 5,000. Polymers containing sulfonic acid groups, phosphoric acid groups, phosphonic acid groups, and their water-soluble salts, and mixtures thereof, and mixtures with carboxylic acid and carboxylate groups, are also suitable.

Water-soluble polymers containing both cationic and anionic functionalities are also suitable. Examples of these polymers are given in U.S. Pat. No. 4,909,986, issued Mar. 20, 1990 to N. Kobayashi and A. Kawazoe, incorporated herein by reference. Another example of water-soluble polymers containing both cationic and anionic functionalities is a copolymer of dimethyldiallyl ammonium chloride and acrylic acid, commercially available under the trade name Merquat 280® from Calgon.

When a water-soluble polymer is used it is typically present at a level of from about 0.001% to about 3%, preferably from about 0.005% to about 2%, more preferably from about 0.01% to about 1%. and even more preferably from about 0.05% to about 0.5%, by weight of the usage composition.

(7) Optional Antistatic Agents

The composition of the present invention can optionally contain additional effective amounts of other antistatic agent to provide the treated clothes with in-wear static. Preferred antistatic agents are those that are water soluble in at least an effective amount, such that the composition remains a clear solution. Examples of these antistatic agents are monoalkyl cationic quaternary ammonium compounds, e.g., mono ($C_{10}$–$C_{14}$ alkyl)trimethyl ammonium halide, such as monolauryl trimethyl ammonium chloride, hydroxycetyl hydroxyethyl dimethyl ammonium chloride, available under the trade name Dehyquart E® from Henkel, and ethyl bis(polyethoxy ethanol) alkylammonium ethylsulfate, available under the trade name Variquat 66® from Witco Corp., polyethylene glycols, polymeric quaternary ammonium salts, such as polymers conforming to the general formula:

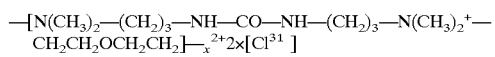

available under the trade name Mirapol A-15® from Rhône-Poulenc, and

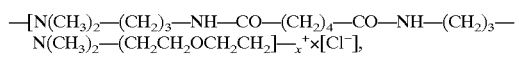

available under the trade name Mirapol AD-1® from Rhône-Poulenc, quaternized polyethyleneimines, vinylpyrrolidone/ methacrylamidopropyltrimethylammonium chloride copolymer, available under the trade name Gafquat HS-100® from GAF; triethonium hydrolyzed collagen ethosulfate, available under the trade name Quat-Pro E® from Maybrook; neutralized sulfonated polystyrene, available, e.g., under the trade name Versa TL-130® from Alco Chemical, neutralized sulfonated styrene/maleic anhydride copolymers, available, e.g., under the trade name Versa TL-4® from Alco Chemical; and mixtures thereof.

It is preferred that a no foaming, or low foaming, agent is used, to avoid foam formation during fabric treatment. It is also preferred that polyethoxylated agents such as polyethylene glycol or Variquat 66® are not used when alpha-cyclodextrin is used. The polyethoxylate groups have a strong affinity to, and readily complex with, alpha-cyclodextrin which in turn depletes the uncomplexed cyclodextrin available for odor control.

When an antistatic agent is used it is typically present at a level of from about 0.05% to about 10%, preferably from about 0.1% to about 5%, more preferably from about 0.3% to about 3%, by weight of the usage composition.

(8) Optional Insect and/or Moth Repelling Agent

The composition of the present invention can optionally contain an effective amount of insect and/or moth repelling agents. Typical insect and moth repelling agents are pheromones, such as anti-aggregation pheromones, and other natural and/or synthetic ingredients. Preferred insect and moth repellent agents useful in the composition of the present invention are perfume ingredients, such as citronellol, citronellal, citral, linalool, cedar extract, geranium oil, sandalwood oil, 2-diethylphenoxy)ethanol, 1-dodecene, etc. Other examples of insect and/or moth repellents useful in the composition of the present invention are disclosed in U.S. Pat. Nos. 4,449,987; 4,693,890; 4,696,676; 4,933,371; 5,030,660; 5,196,200; and in "Semio Activity of Flavor and Fragrance Molecules on Various Insect Species", B. D. Mookherjee et al., published in *Bioactive Volatile Compounds from Plants*, ASC Symposium Series 525, R. Teranishi, R. G. Buttery, and H. Sugisawa, 1993, pp. 35–48, all of said patents and publications being incorporated herein by reference. When an insect and/or moth repellent is used it is typically present at a level of from about 0.005% to about 3%, by weight of the usage composition.

(9) Optional Colorant

Colorants and dyes, especially bluing agents, can be optionally added to the wrinkle control compositions for visual appeal and performance impression. When colorants are used, they are used at extremely low levels to avoid fabric staining. Preferred colorants for use in the present compositions are highly water-soluble dyes, e.g., Liquitint® dyes available from Milliken Chemical Co. Non-limiting examples of suitable dyes are, Liquitint Blue HP®, Liquitint Blue 65®, Liquitint Patent Blue®, Liquitint Royal Blue®, Liquitint Experimental Yellow 8949-43®, Liquitint Green HMC®, Liquitint Yellow II®, and mixtures thereof, preferably Liquitint Blue HP®, Liquitint Blue 65®, Liquitint Patent Blue®, Liquitint Royal Blue®, Liquitint Experimental Yellow 8949-43®, and mixtures thereof.

(10) Optional Anti-Clogging Agent

Optional anti-clogging agent which enhances the wetting and anti-clogging properties of the composition, especially when starch is present, is chosen from the group of polymeric glycols of alkanes and olefins having from 2 to about 6, preferably 2 carbon atoms. The anti-clogging agent inhibits the formation of "plugs" in the spray nozzle. An example of the preferred anti-clogging agent is polyethylene glycol having an average molecular weight of from about 800 to about 12,000, more preferably from about 1,400 to about 8,000. When used, the anti-clogging agent is present at a level of from about 0.01% to about 1%, preferably from about 0.05% to about 0.5%, more preferably, from about 0.1% to about 0.3% by weight of the usage composition.

(11) Mixtures thereof

A variety of mixtures and combinations of optional supplemental wrinkle control agent, optional odor control agent, optional perfume, optional antimicrobial active, optional aminocarboxylate chelator, optional water-soluble polyionic polymer, optional antistatic agent, optional insect repellant, optional colorant, optional anti-clogging agent, can be used in the present silicone emulsion compositions.

(E) Carrier

The preferred carrier of the present invention is water. The water which is used can be distilled, deionized, or tap water. Water is the preferred main liquid carrier due to its low cost, availability, safety, and environmental compatibility. Aqueous solutions are preferred for wrinkle control and odor control.

Water is very useful for fabric wrinkle removal or reduction. Not to be bound by theory, it is believed that water breaks many intrafiber and interfiber hydrogen bonds that keep the fabric in a wrinkle state. It also swells, lubricates and relaxes the fibers to help the wrinkle removal process.

Water also serves as the liquid carrier for the cyclodextrins, and facilitates the complexation reaction between the cyclodextrin molecules and any malodorous molecules that are on the fabric when it is treated. The dilute aqueous solution also provides the maximum separation of cyclodextrin molecules on the fabric and thereby maximizes the chance that an odor molecule will interact with a cyclodextrin molecule. It has recently also been discovered that water has an unexpected odor controlling effect of its own. It has been discovered that the intensity of the odor generated by some polar, low molecular weight organic amines, acids, and mercaptans is reduced when the odor-contaminated fabrics are treated with an aqueous solution. Not to be bound by theory, it is believed that water solubilizes and depresses the vapor pressure of these polar, low molecular weight organic molecules, thus reducing their odor intensity.

The level of liquid carrier in the compositions of the present invention is typically greater than about 80%, preferably greater than about 90%, more preferably greater than about 94%, by weight of the composition. When a concentrated composition is used, the level of liquid carrier is typically from about 50% to about 98%, by weight of the composition, preferably from about 60% to about 97%, more preferably from about 70% to about 95%, by weight of the composition.

Optionally, in addition to water, the carrier can contain a low molecular weight organic solvent that is highly soluble in water, e.g., ethanol, propanol, isopropanol, and the like, and mixtures thereof. Low molecular weight alcohols can help the treated fabric to dry faster. The optional solvent is also useful in the solubilization of some shape retention polymers described hereinbefore. The optional water soluble low molecular weight solvent can be used at a level of up to about 50%, typically from about 1% to about 20%, preferably from about 2% to about 15%, more preferably from about 5% to about 10%, by weight of the total composition. Factors that need to be considered when a high level of solvent is used in the composition are odor, flammability, and environment impact.

II. Article of Manufacture

The present invention also encompasses articles of manufacture comprising (1) a container, (2) composition, and (3)

optionally, but preferably, instructions. A variety of containers, compositions, and instructions can be utilized in the present articles of manufacture as described hereinafter.

The articles of manufacture of the present invention further encompass articles of manufacture comprising (1) substrate, (2) composition, and (3) a set of instructions. In this embodiment, a variety of substrates, compositions, and instructions can be utilized as described hereinafter.

The present articles of manufacture preferably comprise a set of instructions that are typically in association with the container or substrate. The set of instructions typically communicates to the consumer of the present articles to dispense the composition in an amount effective to provide a solution to problems involving, and/or provision of a benefit related to, those selected from the group consisting of: killing or reducing the level of, microorganisms; reducing odors; and/or reducing static in addition to the reduction of wrinkles. It is important that the consumer of the present article be aware of these benefits, since otherwise the consumer would not know that the composition would solve these problems or combination of problems and/or provide these benefits or combination of benefits.

As used herein, the phrase "in association with" means the set of instructions are either directly printed on the container or substrate itself or presented in a separate manner including, but not limited to, a brochure, print advertisement, electronic advertisement, and/or broadcast communication, so as to communicate the set of instructions to a consumer of the article of manufacture. The set of instructions preferably comprises the instruction to apply an effective amount of the composition, preferably by spraying, to provide the indicated benefit, e.g., wrinkle reduction, and, optionally, antimicrobial action, and/or anti-static effect, etc. and, also optionally, the provision of odor control and/or reduction.

A more complete disclosure of the instructions is presented hereinafter.

(A) Container

The article of manufacture herein comprises a container, such as a spray dispenser. A fabric wrinkle control composition is placed into a spray dispenser in order to be distributed onto the fabric. Said spray dispenser for producing a spray of liquid droplets can be any of the manually activated means as is known in the art, e.g. triggertype, pump type, non-aerosol self-pressurized, and aerosol-type spray means, for treating the wrinkle control composition to small fabric surface areas and/or a small number of garments, as well as non-manually operated, powered sprayers for conveniently treating the wrinkle control composition to large fabric surface areas and/or a large number of garments. The spray dispenser herein does not normally include those that will substantially foam the clear, aqueous wrinkle control composition. It has been found that the performance is increased by providing smaller particle droplets. Desirably, the Sauter mean particle diameter is from about 10 $\mu$m to about 120 $\mu$m, more preferably, from about 20 $\mu$m to about 100 $\mu$m. Dewrinkling benefits are improved by providing small particles (droplets), as discussed hereinbefore, especially when the surfactant is present.

The spray dispenser can be an aerosol dispenser. Said aerosol dispenser comprises a container which can be constructed of any of the conventional materials employed in fabricating aerosol containers. The dispenser must be capable of withstanding internal pressure in the range of from about 20 to about 110 p.s.i.g., more preferably from about 20 to about 70 p.s.i.g. The one important requirement concerning the dispenser is that it be provided with a valve member which will permit the clear, aqueous dewrinkle composition contained in the dispenser to be dispensed in the form of a spray of very fine, or finely divided, particles or droplets. The aerosol dispenser utilizes a pressurized sealed container from which, e.g., the clear, aqueous wrinkle control composition is dispensed through a special actuator/valve assembly under pressure. The aerosol dispenser is pressurized by incorporating therein a gaseous component generally known as a propellant. Common aerosol propellants, e.g., gaseous hydrocarbons such as isobutane, and mixed halogenated hydrocarbons, can be used. Halogenated hydrocarbon propellants such as chlorofluoro hydrocarbons have been alleged to contribute to environmental problems, and are not preferred. When cyclodextrin is present hydrocarbon propellants are not preferred, because they can form complexes with the cyclodextrin molecules thereby reducing the availability of uncomplexed cyclodextrin molecules for odor absorption. Preferred propellants are compressed air, nitrogen, inert gases, carbon dioxide, etc. A more complete description of commercially available aerosol-spray dispensers appears in U.S. Pat. No. 3,436,772, Stebbins, issued Apr. 8, 1969; and U.S. Pat. No. 3,600,325, Kaufman et al., issued Aug. 17, 1971; both of said references are is incorporated herein by reference.

Preferably the spray dispenser can be a self-pressurized non-aerosol container having a convoluted liner and an elastomeric sleeve. Said self-pressurized dispenser comprises a liner/sleeve assembly containing a thin, flexible radially expandable convoluted plastic liner of from about 0.010 to about 0.020 inch thick, inside an essentially cylindrical elastomeric sleeve. The liner/sleeve is capable of holding a substantial quantity of wrinkle control composition product and of causing said product to be dispensed. A more complete description of self-pressurized spray dispensers can be found in U.S. Pat. No. 5,111,971, Winer, issued May 12, 1992, and U.S. Pat. No. 5,232,126, Winer, issued Aug. 3, 1993; both of said references are herein incorporated by reference. Another type of aerosol spray dispenser is one wherein a barrier separates the wrinkle control composition from the propellant (preferably compressed air or nitrogen), as disclosed in U.S. Pat. No. 4,260,110, issued Apr. 7, 1981, and incorporated herein by reference. Such a dispenser is available from EP Spray Systems, East Hanover, N.J.

More preferably, the spray dispenser is a non-aerosol, manually or non-manually activated, pump-spray dispenser. Said pump-spray dispenser comprises a container and a pump mechanism which securely screws or snaps onto the container. The container comprises a vessel for containing the aqueous wrinkle control composition to be dispensed.

The pump mechanism comprises a pump chamber of substantially fixed volume, having an opening at the inner end thereof. Within the pump chamber is located a pump stem having a piston on the end thereof disposed for reciprocal motion in the pump chamber. The pump stem has a passageway there through with a dispensing outlet at the outer end of the passageway and an axial inlet port located inwardly thereof.

The container and the pump mechanism can be constructed of any conventional material employed in fabricating pump-spray dispensers, including, but not limited to: polyethylene; polypropylene; polyethyleneterephthalate; blends of polyethylene, vinyl acetate, and rubber elastomer. A preferred container is made of clear, e.g., polyethylene terephthalate. Other materials can include stainless steel. A more complete disclosure of commercially available dispensing devices appears in: U.S. Pat. No. 4,895,279, Schultz, issued Jan. 23, 1990; U.S. Pat. No. 4,735,347, Schultz et al., issued Apr. 5, 1988; and U.S. Pat. No. 4,274,560, Carter, issued Jun. 23, 1981; all of said references are herein incorporated by reference.

Most preferably, the spray dispenser is a manually activated trigger-spray dispenser. Said trigger-spray dispenser comprises a container and a trigger both of which can be constructed of any of the conventional material employed in fabricating trigger-spray dispensers, including, but not limited to: polyethylene; polypropylene; polyacetal; polycarbonate; polyethyleneterephthalate; polyvinyl chloride; polystyrene; blends of polyethylene, vinyl acetate, and rubber elastomer. Other materials can include stainless steel and glass. A preferred container is made of clear, e.g. polyethylene terephthalate. The trigger-spray dispenser does not incorporate a propellant gas into the odor-absorbing composition, and preferably it does not include those that will foam the wrinkle control composition. The trigger-spray dispenser herein is typically one which acts upon a discrete amount of the wrinkle control composition itself, typically by means of a piston or a collapsing bellows that displaces the composition through a nozzle to create a spray of thin liquid. Said trigger-spray dispenser typically comprises a pump chamber having either a piston or bellows which is movable through a limited stroke response to the trigger for varying the volume of said pump chamber. This pump chamber or bellows chamber collects and holds the product for dispensing. The trigger spray dispenser typically has an outlet check valve for blocking communication and flow of fluid through the nozzle and is responsive to the pressure inside the chamber. For the piston type trigger sprayers, as the trigger is compressed, it acts on the fluid in the chamber and the spring, increasing the pressure on the fluid. For the bellows spray dispenser, as the bellows is compressed, the pressure increases on the fluid. The increase in fluid pressure in either trigger spray dispenser acts to open the top outlet check valve. The top valve allows the product to be forced through the swirl chamber and out the nozzle to form a discharge pattern. An adjustable nozzle cap can be used to vary the pattern of the fluid dispensed.

For the piston spray dispenser, as the trigger is released, the spring acts on the piston to return it to its original position. For the bellows spray dispenser, the bellows acts as the spring to return to its original position. This action causes a vacuum in the chamber. The responding fluid acts to close the outlet valve while opening the inlet valve drawing product up to the chamber from the reservoir.

A more complete disclosure of commercially available dispensing devices appears in U.S. Pat. No. 4,082,223, Nozawa, issued Apr. 4, 1978; U.S. Pat. No. 4,161, 288, McKinney, issued Jul. 17, 1985; U.S. Pat. No. 4,434,917, Saito et al., issued Mar. 6, 1984; and U.S. Pat. No. 4,819, 835, Tasaki, issued Apr. 11, 1989; U.S. Pat. No. 5,303,867, Peterson, issued Apr. 19, 1994; all of said references are incorporated herein by reference.

A broad array of trigger sprayers or finger pump sprayers are suitable for use with the compositions of this invention. These are readily available from suppliers such as Calmar, Inc., City of Industry, Calif.; CSI (Continental Sprayers, Inc.), St. Peters, Mo.; Berry Plastics Corp., Evansville, Ind., a distributor of Guala® sprayers; or Seaquest Dispensing, Cary, Ill.

The preferred trigger sprayers are the blue inserted Guala® sprayer, available from Berry Plastics Corp., or the Calmar TS800-1A®, TS1300®, and TS-800-2®, available from Calmar Inc., because of the fine uniform spray characteristics, spray volume, and pattern size. More preferred are sprayers with precompression features and finer spray characteristics and even distribution, such as Yoshino sprayers from Japan. Any suitable bottle or container can be used with the trigger sprayer, the preferred bottle is a 17 fl-oz. bottle (about 500 ml) of good ergonomics similar in shape to the Cinch® bottle. It can be made of any materials such as high density polyethylene, polypropylene, polyvinyl chloride, polystyrene, polyethylene terephthalate, glass, or any other material that forms bottles. Preferably, it is made of high density polyethylene or clear polyethylene terephthalate.

For smaller fluid ounce sizes (such as 1 to 8 ounces), a finger pump can be used with canister or cylindrical bottle. The preferred pump for this application is the cylindrical Euromist II® from Seaquest Dispensing. More preferred are those with precompression features.

The article of manufacture herein can also comprise a non-manually operated spray dispenser. By "non-manually operated" it is meant that the spray dispenser can be manually activated, but the force required to dispense the wrinkle control composition is provided by another, non-manual means. Non-manually operated sprayers include, but are not limited to, powered sprayers, air aspirated sprayers, liquid aspirated sprayers, electrostatic sprayers, and nebulizer sprayers. The wrinkle control composition is placed into a spray dispenser in order to be distributed onto the fabric.

Powered sprayers include self contained powered pumps that pressurize the aqueous dewrinkle composition and dispense it through a nozzle to produce a spray of liquid droplets. Powered sprayers are attached directly or remotely through the use of piping/tubing to a reservoir (such as a bottle) to hold the aqueous wrinkle control composition. Powered sprayers can include, but are not limited to, centrifugal or positive displacement designs. It is preferred that the powered sprayer be powered by a portable DC electrical current from either disposable batteries (such as commercially available alkaline batteries) or rechargeable battery units (such as commercially available nickel cadmium battery units). Powered sprayers can also be powered by standard AC power supply available in most buildings. The discharge nozzle design can be varied to create specific spray characteristics (such as spray diameter and particle size). It is also possible to have multiple spray nozzles for different spray characteristics. The nozzle may or may not contain an adjustable nozzle shroud that would allow the spray characteristics to be altered.

Nonlimiting examples of commercially available powered sprayers are disclosed in U.S. Pat. No. 4,865,255, Luvisotto, issued Sep. 12, 1989 which is incorporated herein by reference. Preferred powered sprayers are readily available from suppliers such as Solo, Newport News, Va. (e.g., Solo Spraystar™ rechargeable sprayer, listed as manual part #: US 460 395) and Multi-sprayer Systems, Minneapolis, Minn. (e.g., model: Spray 1).

Air aspirated sprayers include the classification of sprayers generically known as "air brushes". A stream of pressurized air draws up the aqueous wrinkle control composition and dispenses it through a nozzle to create a spray of liquid. The wrinkle control composition can be supplied via separate piping/tubing or more commonly is contained in a jar to which the aspirating sprayer is attached.

Nonlimiting examples of commercially available air aspirated sprayers appears in U.S. Pat. No. 1,536,352, Murray, issued Apr. 22, 1924 and U.S. Pat. No. 4,221,339, Yoshikawa, issues Sep. 9, 1980; all of said references are incorporated herein by reference. Air aspirated sprayers are readily available from suppliers such as The Badger Air- Brush Co., Franklin Park, Ill. (e.g., model #: 155) and Wilton Air Brush Equipment, Woodridge, Ill. (e.g., stock #: 415-4000, 415-4001, 415-4100).

Liquid aspirated sprayers are typical of the variety in widespread use to spray garden chemicals. The aqueous dewrinkling composition is drawn into a fluid stream by means of suction created by a Venturi effect. The high turbulence serves to mix the aqueous wrinkle control composition with the fluid stream (typically water) in order to provide a uniform mixture/concentration. It is possible with this method of delivery to dispense the aqueous concentrated wrinkle control composition of the present invention and then dilute it to a selected concentration with the delivery stream.

Liquid aspirated sprayers are readily available from suppliers such as Chapin Manufacturing Works, Batavia, N.Y. (e.g., model #: 6006).

Electrostatic sprayers impart energy to the aqueous dewrinkling composition via a high electrical potential. This energy serves to atomize and charge the aqueous wrinkle control composition, creating a spray of fine, charged particles. As the charged particles are carried away from the sprayer, their common charge causes them to repel one another. This has two effects before the spray reaches the target. First, it expands the total spray mist. This is especially important when spraying to fairly distant, large areas. The second effect is maintenance of original particle size. Because the particles repel one another, they resist collecting together into large, heavier particles like uncharged particles do. This lessens gravity's influence, and increases the charged particle reaching the target. As the mass of negatively charged particles approach the target, they push electrons inside the target inwardly, leaving all the exposed surfaces of the target with a temporary positive charge. The resulting attraction between the particles and the target overrides the influences of gravity and inertia. As each particle deposits on the target, that spot on the target becomes neutralized and no longer attractive. Therefore, the next free particle is attracted to the spot immediately adjacent and the sequence continues until the entire surface of the target is covered. Hence, charged particles improve distribution and reduce drippage.

Nonlimiting examples of commercially available electrostatic sprayers appears in U.S. Pat. No. 5,222,664, Noakes, issued Jun. 29, 1993; U.S. Pat. No. 4,962,885, Coffee, issued Oct. 16, 1990; U.S. Pat. No. 2,695,002, Miller, issued November 1954; U.S. Pat. No. 5,405,090, Greene, issued Apr. 11, 1995; U.S. Pat. No. 4,752,034, Kuhn, issued Jun. 21, 1988; U.S. Pat. No. 2,989,241, Badger, issued June 1961; all of said patents are incorporated herein by reference. Electrostatic sprayers are readily available from suppliers such as Tae In Tech Co, South Korea and Spectrum, Houston, Tex.

Nebulizer sprayers impart energy to the aqueous dewrinkling composition via ultrasonic energy supplied via a transducer. This energy results in the aqueous wrinkle control composition to be atomized. Various types of nebulizers include, but are not limited to, heated, ultrasonic, gas, venturi, and refillable nebulizers.

Nonlimiting examples of commercially available nebulizer sprayers appears in U.S. Pat. No. 3,901,443, Mitsui, issued Aug. 26, 1975; U.S. Pat. No. 2,847,248, Schmitt, issued August 1958; U.S. Pat. No. 5,511,726, Greenspan, issued Apr. 30, 1996; all of said patents are incorporated herein by reference. Nebulizer sprayers are readily available from suppliers such as A&D Engineering, Inc., Milpitas, Calif. (e.g., model A&D Un-231 ultrasonic handy nebulizer) and Amici, Inc., Spring City, Pa. (model: swirler nebulizer).

The preferred article of manufacture herein comprises a non-manually operated sprayer, such as a battery-powered sprayer, containing the aqueous wrinkle control composition. More preferably the article of manufacture comprises a combination of a non-manually operated sprayer and a separate container of the aqueous wrinkle control composition, to be added to the sprayer before use and/or to be separated for filling/refilling. The separate container can contain an usage composition, or a concentrated composition to be diluted before use, and/or to be used with a diluting sprayer, such as with a liquid aspirated sprayer, as described herein above.

Also, as described hereinbefore, the separate container should have structure that mates with the rest of the sprayer to ensure a solid fit without leakage, even after motion, impact, etc. and when handled by inexperienced consumers. The sprayer desirably can also have an attachment system that is safe and preferably designed to allow for the liquid container to be replaced by another container that is filled. E.g., the fluid reservoir can be replaced by a filled container. This can minimize problems with filling, including minimizing leakage, if the proper mating and sealing means are present on both the sprayer and the container. Desirably, the sprayer can contain a shroud to ensure proper alignment and/or to permit the use of thinner walls on the replacement container. This minimizes the amount of material to be recycled and/or discarded. The package sealing or mating system can be a threaded closure (sprayer) which replaces the existing closure on the filled and threaded container. A gasket is desirably added to provide additional seal security and minimize leakage. The gasket can be broken by action of the sprayer closure. These threaded scaling systems can be based on industry standards. However, it is highly desirable to use a threaded sealing system that has non-standard dimensions to ensure that the proper sprayer/bottle combination is always used. This helps prevent the use of fluids that are toxic, which could then be dispensed when the sprayer is used for its intended purpose.

An alternative sealing system can be based on one or more interlocking lugs and channels. Such systems are commonly referred to as "bayonet" systems. Such systems can be made in a variety of configurations, thus better ensuring that the proper replacement fluid is used. For convenience, the locking system can also be one that enables the provision of a "child-proof" cap on the refill bottle. This "lock-and-key" type of system thus provides highly desirable safety features. There are a variety of ways to design such lock and key sealing systems.

Care must be taken, however, to prevent the system from making the filling and sealing operation too difficult. If desired, the lock and key can be integral to the sealing mechanism. However, for the purpose of ensuring that the correct recharge or refill is used, the interlocking pieces can be separate from the sealing system. E.g., the shroud and the container could be designed for compatibility. In this way, the unique design of the container alone could provide the requisite assurance that the proper recharge/refill is used.

Examples of threaded closures and bayonet systems can be found in U.S. Pat. No. 4,781,311, Nov. 1, 1988 (Angular Positioned Trigger Sprayer with Selective Snap-Screw Container Connection, Clorox), U.S. Pat. No. 5,560,505, Oct. 1, 1996 (Container and Stopper Assembly Locked Together by Relative Rotation and Use Thereof, Cebal SA), and U.S. Pat. No. 5,725,132, Mar. 10, 1998 (Dispenser with Snap-Fit Container Connection, Centico International). All of said patents are incorporated herein by reference.

(B) Substrate

Wrinkle controlling compositions can be placed onto or into a substrate that will contain it until time of use. At the time of use, the article of manufacture (composition plus substrate) is placed into a machine or instrument used to change the physical nature and/or appearance of clothes, fabrics, or fibers. Nonlimiting examples of such machines or instruments include commercial clothes dryers, home clothes dryers, or baths used to finish fabrics in commercial fabric mills. The substrate can be any type of container constructed of any materials that adequately encloses the composition and contains it in a stable form until time of use.

The substrate is also required to release the compostion during use in the machine or instrument. A preferred substrate will release the said composition in a uniform manner over all clothes, fabrics, or fibers in the machine or instrument. A preferred substrate will release the composition in such a way so as to prevent perceptible staining on clothes, fabrics, or fibers after the composition dries.

Substrates can have many geometries, including, but not limited to, essentially three-dimensional objects (e.g. spherical, cylindrical, rectangular, square, polygonal, irregular, etc.), essentially two dimensional objects (planar, circular, plus-shaped, etc.). The preferred dimensionalities and shapes promote good distribution of composition on fabric in the mechanical device used to modify the physical properties of the clothes, fabric, or fiber. As a nonlimiting example, the dimensionality and shape of the substrate used in a clothes dryer should promote even movement between and around all clothes in the dryer to attain uniform distribution of the said composition.

Substrates can be made of many materials or combinations of materials, including, but not limited to, plastics, natural or synthetic woven or nonwoven fibers. Nonlimiting examples of substrates include those described in the following, which are hereby incorporated by reference: U.S. Pat. No. 3,956,556 issued May 11, 1976 to McQueary; U.S. Pat. No. 5,376,287 issued Dec. 27, 1994 to Borcher et al.; U.S. Pat. No. 5,470,492 issued Nov. 28, 1995 to Childs et al.; U.S. Pat. No. 5,630,848 issued May 20, 1997 to Young et al; U.S. Pat. No. 5,376,287 issued May 27, 1997 to Siklosi; U.S. Pat. No. 5,804,548 issued Sep. 8, 1998 to Davis; U.S. Pat. No. 5,840,675 issued Nov. 24, 1998 to Yeazell; U.S. Pat. No. 5,883,069 issued Mar. 16, 1999 to Childs et al.

(C) Wrinkle Controlling Composition

A variety of compositions can be utilized in the present articles of manufacture and present methods of use in addition to the specific preferred compositions described hereinbefore. Preferably, the composition is of the type described hereinbefore, i.e. a silicone oil emulsion composition comprising silicone oil, a surfactant system, a buffering system, and optional ingredients. However, a number of other acceptable compositions, in particular wrinkle controlling compositions, can be utilized in the present articles of manufacture. A suitable wrinking controlling composition comprises water. Another suitable wrinkle controlling composition comprises lower molecular weight (from about 30 to about 100) alcohol, preferably ethyl, propyl or isopropyl alcohol, quaternary ammonium salt surfactant, and water. Yet another suitable wrinkle controlling composition comprises alcohol, glycerine, nonionic surfactant, and water. Such wrinkle controlling compositions can also include silicone-glycol copolymer surfactants or fluorinated alkyl ester surfactants.

Additional nonlimiting examples of wrinkle controlling compositions include those disclosed in the following patents, which are hereby incorporated by reference: U.S. Pat. No. 4,800,026 issued Jan. 24, 1989 to Coffindaffer et al.; U.S. Pat. No. 4,911,853 issued Mar. 27, 1990 to Coffindaffer et al.; U.S. Pat. No. 4,923,623 issued May 8, 1990 to Coflindaffer ct al.; U.S. Pat. No. 5,532,023 issued Jul. 2, 1996 to Vogel et al.; U.S. Pat. No. 5,798,107 issued Aug. 25, 1998 to Vogel et al.

Other nonlimiting examples of wrinkle controlling compositions include those disclosed in the following patent applications, which are hereby incorporated by reference: U.S. Ser. No. 09/067,182, filed Apr. 27, 1998 by T. Trinh et al. (Case 7112) and U.S. Ser. No. 60/119,172, filed Feb. 8, 1999 by T. Trinh et al. (Case 7115P3).

(D) Set of Instructions

As discussed hereinbefore, the article of manufacture can also comprise the composition of the present invention in a container in association with a set of instructions to use the composition in an amount effective to provide a solution to problems involving and/or provision of a benefit related to those selected from the group consisting of: killing or reducing microbes; reducing odor; reducing time and/or effort involved in ironing fabrics, and/or reducing static in addition to the reduction in wrinkles. It is important that the consumer be aware of these additional benefits, since otherwise the consumer would not know that the composition would solve these problems and/or provide these benefits.

As used herein, the phrase "in association with" means the set of instructions are either directly printed on the container itself or presented in a separate manner including, but not limited to, a brochure, print advertisement, electronic advertisement, and/or verbal communication, so as to communicate the set of instructions to a consumer of the article of manufacture. The set of instructions preferably comprises the instruction to apply an effective amount of the composition, preferably by spraying, to provide the indicated benefit, e.g. wrinkle reduction, antimicrobial action, static effect, and/or reduction in time and/or effort of ironing and, optionally, the provision of the main effect of odor control and/or reduction.

The set of instructions of the present articles can comprise the instruction or instructions to achieve the benefits discussed herein by carrying out any of the methods of using wrinkle controlling compositions, including the present silicone oil emulsion compositions, as described herein.

III. Method of Use

A wrinkle controlling composition as described hereinbefore, which are preferably silicone oil emulsion compositions comprising silicone oil, a surfactant system, a buffer system, and optional components, e.g., antimicrobial compound, etc., can be used by distributing, e.g., by placing, an effective amount of the aqueous solution onto the surface or article to be treated. Distribution can be achieved by using a spray device, a substrate, a roller, a pad, etc., substrates (as disclosed herein) and spray dispensers are preferred for distributing wrinkle composition. For wrinkle control, an effective amount means an amount sufficient to remove or noticeably reduce the appearance of wrinkles on fabric. For odor control, an effective amount, as defined herein, means an amount sufficient to absorb odor to effect a noticeable reduction in the perceived odor, preferably to the point that it is not discernible, by the human sense of smell. For static control an effective amount, as defined herein, means and amount sufficient to noticeably reduce voltage on fabrics and cling between fabrics. Preferably, the amount of solution is not so much as to saturate or create a pool of liquid on said article or surface and so that when dry there is no visual deposit readily discernible.

Preferably, the present invention does not encompass distributing the composition onto non-fabric surfaces. However when optional cyclodextrin in the composition it can be used on other surfaces for odor control. However, care should be taken when treating such composition on shiny surfaces including, e.g., chrome, glass, smooth vinyl, leather, shiny plastic, shiny wood, etc., because spotting and filming can occur on such surfaces. However, when appearance is not important, the composition of the present invention containing optional cyclodextrin can be sprayed onto shiny surfaces to obtain odor control benefit. Although the cyclodextrin solution can be used on human skin, care should be taken, especially when an antimicrobial active is present in the composition.

The compositions and articles of the present invention which contain a fabric wrinkle control agent can be used to treat fabrics, garments, household fabrics, e.g. curtains, bed spreads, pillowcases, table clothes, napkins, and the like to remove or reduce, undesirable wrinkles, in addition to the optional removal or reduction of undesirable odor on said objects.

An effective amount of the liquid composition of the present invention is preferably sprayed onto fabrics, particularly clothing. When the composition is sprayed onto fabric, an effective amount should be deposited onto the fabric, with the fabric becoming damp or totally saturated with the composition, at least where the wrinkle exists, typically from about 5% to about 150%, preferably from about 10% to about 100%, more preferably from about 20% to about 75%, by weight of the fabric. The amount of volatile silicone active typically sprayed onto the fabric is from about 0.001% to about 2%, preferably from about 0.01% to about 0.5%, more preferably from about 0.02% to about 0.2%, by weight of the fabric. Once an effective amount of the composition is sprayed onto the fabric the fabric is optionally, but preferably stretched while still damp. The fabric is typically stretched perpendicular to the wrinkle, where the wrinkle has a clearly defined line. The fabric can also be smoothed by hand after it has been sprayed and is still damp. In some cases, it is acceptable to simply hang the fabric, while still damp on a hanger or clothes line without further manipulation by hand after spraying. The smoothing movement works particularly well on areas of clothing that have an interface sewn into them, or on the hems of clothing. Once the fabric has been sprayed and optionally, but preferably, stretched or smoothed, it is hung until dry or maintained under stress to reduce the reappearance of the wrinkle.

The compositions of the present invention can also be used as ironing aids. An effective amount of the composition can be sprayed onto fabric and the fabric is ironed at the normal temperature at which it should be ironed. The fabric can either be sprayed with an effective amount of the composition, allowed to dry and then ironed, or sprayed and ironed immediately. In another aspect of the invention, the composition can be poured directly into an iron or other hand-held device for dewrinkling and delivered to the fabric from that device. In a still further aspect of the invention, the composition can be sprayed onto fabrics in an in-home de-wrinkling chamber containing the fabric to be dewrinkled and/or optionally deodorized, thereby providing ease of operation. Conventional personal as well as industrial deodorizing and/or de-wrinkling apparatuses are suitable for use herein. Traditionally, these apparatuses act by a steaming process which effects a relaxation of the fibers. Examples of home dewrinkling chambers include shower stalls. The spraying of the composition or compounds onto the fabrics can then occur within the chamber of the apparatus or before placing the fabrics into the chamber. Again, the spraying means should preferably be capable of providing droplets with a weight average diameter of from about 8 to about 100 $\mu$m, preferably from about 10 to about 50 $\mu$m. Preferably, the loading of moisture on fabrics made of natural and synthetic fibers is from about 5 to about 25%, more preferably from about 5 to about 10% by weight of the dried fabric. Other conventional steps that can be carried out in the dewrinkling apparatus can be applied such as heating and drying. Preferably, for optimum dewrinkling benefit, the temperature profile inside the chamber ranges from about 40° C. to about 80° C., more preferably from about 50° C. to about 70° C. The preferred length of the drying cycle is from about 15 to about 60 minutes, more preferably from about 20 to about 45 minutes.

Distribution from a substrate is achieved by placing the substrate in a machine or instrument intended to modify the physical properties of clothes, fabrics, or fibers. A nonlimiting example of such a machine is a home or commercial clothes dryer. Distribution from the substrate in a clothes dryer is achieved via direct contact with clothes therefore, it is important that the substrate migrate evenly around the drum of the dryer and uniformly contact all the clothes, fabric, or fiber surfaces. To enhance uniform distribution from the substrate in a clothes dryer, it is preferably to run the clothes dryer for at least about 10 minutes.

Distribution in the dryer can be accomplished by spraying or misting clothes using a variety of spraying or misting equipment, including, but not limited to, all types of sprayers disclosed hereinbefore, as well as other mechanical devices, e.g. paint sprayers, or any dispensing device that may be mounted in a dryer by a user or incorporated by the manufacturer of the dryer.

The steaming step in the dewrinkling apparatus can also be eliminated while obtaining the benefits, if the composition is maintained within a temperature range from about 22° C. (about 72° F.) to about 76° C. (about 170° F.) before spraying.

The compositions herein are especially useful, when used to treat garments for extending the time before another wash cycle is needed. Such garments include uniforms and other garments which are normally treated in an industrial process, which can be dewrinkled and/or refreshed and the time between treatments extended.

The presence of the highly preferred surfactant promotes spreading of the solution and the highly preferred antimicrobial active provides improved odor control as well as antimicrobial action, by minimizing the formation of odors. Both the surfactant and the antimicrobial active provide improved performance and the mixture is especially good. When the compositions are applied in the form of the very small particles (droplets), as disclosed hereinbefore, additional benefits are found, since the distribution is even further improved and overall performance is improved.

Fabrics can be treated with wrinkle controlling compositions in either the dry state or a wet state. For some situations it is preferable to treat garments or fabrics while those garments or fabrics are dry. For instance, if the fabric is already dry and/or in place where removal would be difficult, e.g., if the wrinkle controlling composition will be used to smooth window curtains or shower curtains that are already hanging or bed clothes that are already on the bed, or dry clothes with minor wrinkles that will be worn soon, it is preferable to treat these items in the already dry state. A particularly preferred situation involves dry clothing or fabrics that have wrinkles caused by compression, e.g. stored in tight containers (suitcases, trunks), compressed in tight spaces (closets, cabinets), left for some period of time after the end of the drying cycle in an automatic clothes dryer, and/or wrinkled after in-wear conditions. For some situations it may be preferable to treat the fabrics while they are in the wet state before they are dry to simplify smoothing. For instance a consumer will normally find it convenient to treat fabrics as these fabrics are being hung to dry on a line or a hanger, e.g., when hand washing garments it is often more convenient to treat the garment just after the rinse and before drying. In general, for wrinkle controlling compositions treating in the wet state is preferable because the active from the wrinkle controlling compositions spreads better on wet fabrics vs. dry fabrics, since the dry fabrics will absorb some of the water and/or solvent, thus decreasing the mobility of the actives.

If the wrinkle controlling compositions show any separation, it will be desirable to shake well before using to guarantee good distribution and consistent dosing. The sprayer tip is then moved to the position marked "on" or to the position that is marked indicating the sprayer stream will be released when the triggering mechanism is activated. There can be more than one position marked to indicate different rates of delivery, or spray patterns. The stream with the desired characteristics is chosen. When treating the garments with the wrinkle controlling compositions herein it is recommended to hold the distribution means, e.g., a spray bottle, with the nozzle pointed towards the garment with the nozzle typically at distances where the lower distance from the fabric is at least about 2 inches from the fabric, preferably at least about 3 inches from the fabric, more preferably at least about 4 inches from the fabric, still more preferably at least about 5 inches from the fabric and most preferably at least about 6 inches from the fabric, while the upper distance from fabric is less than about 15 inches, preferably less than about 12 inches, more preferably less than about 10 inches, still more preferably less than about 9 inches and most preferably less than about 8 inches. Typically, wrinkle controlling compositions should be applied in a manner that achieves even coverage over the entire fabric surface. While it is acceptable to treat the overall garment using a discrete spraying action e.g. spray a spot on a fabric and then move to another spot on the fabric and spray, it is preferably to spray fabrics using a sweeping motion over the fabric to aid maximum spreading and coverage of the wrinkle controlling composition. This even distribution is conveniently achieved by using a powered sprayer e.g. battery or electrical powered. In cases where more difficult wrinkles exist on the fabrics, it is usually desirable to concentrate a higher dose of wrinkle controlling composition on these wrinkled sites vs. the bulk of the fabric. For garments that have a few lighter wrinkles, it is normally preferable to apply wrinkle controlling compositions generally over these sites. However, it is acceptable to treat only the part of a fabric that will be visible, e.g., the front of a shirt where only the front will be visible since the back will be covered by a jacket.

When dry fabrics are treated with the wrinkle controlling compositions, the amount of wrinkle controlling composition that should be used is dependent on several factors including, but not limited to, the weight of the fabric, the type of fabric, and the type of wrinkle in the fabric. Fabrics can have several types of wrinkles. One type of is wrinkle is characterized by its relative depth and sharpness. Such wrinkles are difficult to remove and require more of wrinkle controlling compositions and more work by the user to remove. When fabrics have such tough to remove wrinkles or the fabric is heavy, wrinkle controlling compositions are typically applied at lower levels of at least about 0.01 times the weight of the fabric, preferably at least about 0.1 time the weight of the fabric, more preferably at least about 0.25 times the weight of the fabric and at higher levels of about 2 times the weight of the fabric, more preferably about 1.5 times the weight of the fabric, even more preferably about 1 times the weight of the fabric and most preferably about 0.75 times the weight of the fabric.

Another type of wrinkle is characterized by its broad nature and lack of depth; such wrinkles are often referred to as "bumpiness", "waviness", or "rumples". Such wrinkles are often less difficult to remove than the sharp type of wrinkle discussed above. When fabrics are lighter in weight or have wrinkles that are less difficult to remove wrinkle controlling compositions are typically applied at lower levels of about 0.001 times the weight of the fabric, preferably about 0.01 times the weight of the fabric, more preferably about 0.05 times the weight of the fabric, even more preferably about 0.1 times the weight of the fabric and most preferably about 0.25 times the weight of the fabric and at higher levels of about 1.5 times the weight of the fabric, preferably about 1 times the weight of the fabric, more preferably about 0.75 times the weight of the fabric and most preferably about 0.5 times the weight of the fabric. To reduce the potential for staining, it is always preferable to minimize the total amount of wrinkle controlling composition needed to remove the wrinkles form the fabric.

After fabrics are treated with the wrinkle controlling composition, there are several manipulations that can be employed to aid in controlling the wrinkles. The garments can be stretched both perpendicular and parallel to the wrinkle (or at any angle around the wrinkle) which will help to ease the wrinkle out of the clothing. Stretching the fabrics in a direction perpendicular to the line of the wrinkle is especially helpful in removing the wrinkle from clothing. The fabrics can also be smoothed using the hands with pressing and gliding motions similar to those employed with an iron. The stretching and/or smoothing procedure can be performed with the garment hung vertically, e.g., on a clothes hanger or spread on a horizontal surface, such as, a bed, an ironing board, a table surface, and the like. Another method to loosen wrinkles after treating involves shaking out fabrics with enough energy to loosen wrinkles, in some cases it may be necessary to impart enough energy to cause the fabric to make a snapping noise or motion. The wrinkles could also be manipulated out of the fabric using an implement designed to help smooth the fabrics. Such an implement would be useful in preventing contacts between hands and wrinkle controlling composition; if desired. Many fabrics or garments also contain bends in the fabrics, often termed creases or pleats, that are desireable. Such creases or pleats are often found on the front of pant legs and the sides of sleeves. These can be reinforced while the garment is being shaped to preseve the crease. Creases are reinforced by applying pressure usually by pinching the fabric either with hands or an implement and pulling the crease through the pressure point or by hanging the garment so that it folds at the crease and reinforces it with the pressure of gravity. The fabric should then be laid out flat to dry or hung on a hanger or with some other apparatus such that the fabric will remain smooth while drying. Weights can be attached to critical points on fabrics and garments to aid in maintaining smooth appearance during drying. Depending on the amount of product used to treat the garment and the weight of the garment, the garment should be dried in air for an upper time of less than about 24 hours, preferably less than about 12 hours, more preferably less than about 6 hours, still more preferably less than about 3 hours, and most preferably equal to or less than about 2 hours and the lower limit of drying time is equal to or greater than about 5 minutes, preferably greater than about 10 minutes, more preferably equal to or greater than about 15 minutes, still more preferably greater than or equal to about 30 minutes and most preferably greater than or equal to about 60 minutes. It is preferable to let fabrics that were very wet prior to treating with the wrinkle controlling composition dry for longer periods. It is also preferable to let fabrics that are treated with higher amounts of the wrinkle controlling composition dry for longer periods of time.

It is preferable to assist the drying, either by heating, or blowing air across the fabric surface, or both. Thus, at times it is desirable to follow the use of wrinkle controlling composition by treating the fabric with an appliance that can help dry the clothes. Nonlimiting examples of such appliances are clothes dryers and hand-held hair dryers. The wrinkle controlling composition, in combination with an appliance, can be used on both dry or wet fabrics. For instance, when clothes are dried in a clothes dryer and then inadvertently left in the clothes dryer or in a laundry basket or piled on some surface or in some container with out folding, both wet and dry clothes can become badly wrinkled. To remedy this situation, the wrinkle controlling composition can be used in combination with a clothes dryer to remove wrinkles from single fabrics or garments as well as batches, or loads, of fabrics and garments. Drying with low-heat or cool air is preferred for fabrics that normally have a tendency to shrink, such as wool, silk, rayon, and the like.

The wrinkle controlling composition can be delivered to the clothes dryer by many means. The wrinkle controlling composition can be sprayed onto fabrics or garments prior to adding fabrics or garments to the dryer, sprayed on fabrics or garments while the fabrics or garments are in the dryer, poured directly on the batch of garments and fabrics, or poured on one of the fabrics or garments. The wrinkle controlling composition can also be sprayed onto the fabrics in the dryer by a device that is part of the dryer or attached to it. Available substrates can be used to deliver wrinkle controlling composition for instance, but not limited to, cloth diapers, rags, wash clothes, towels, flexible nonwoven sheet or towellete, or sponges. It should also be understood that an available substrate can be a manufactured item suitable for containing the wrinkle controlling composition before delivery to the dryer and suitable for releasing the wrinkle controlling composition after addition of the available substrate plus wrinkle controlling composition to the dryer. When used in combination with available substrates, the desired amount of the wrinkle controlling composition should be poured directly on the substrate (unless it is already contained within the substrate as an article of manufacture) and the substrate plus the wrinkle controlling composition is then placed in the clothes dryer and the dryer is activated. The dryer temperature should be set according to recommendations given by the fabric manufacturer. An available substrate can be chosen such that it has the capacity to contain the desired level of the said wrinkle controlling composition. Alternately, multiple available substrates can be used to deliver the desired amount of wrinkle controlling composition when the amount exceeds the capacity of one available substrate. Also, when the batch or load of fabrics is large either in number and/or weight, it is often desirable to use multiple available substrates in combination with the wrinkle controlling composition to achieve a more uniform distribution of the wrinkle controlling composition during the tumbling of the fabrics in the dryer. When the wrinkle controlling composition is poured on a fabric or substrate for delivery into the clothes dryer, it is preferred that the item used to deliver the wrinkle controlling composition is clean.

When using the wrinkle controlling composition through the dryer, it is preferred, to use smaller bundle sizes with typical sizes below about 15 lbs (about 6.8 kg), preferably below about 10 lbs (about 4.5 kg), more preferably below about 8 lbs. (about 3.6 kg), even more preferably below about 6 lbs. (about 2.7 kg) and most preferably at or below about 4 lbs. (about 1.8 kg) It is also desirable to arrange the bundle composition such that fabrics in the bundle have similar weights or densities to promote even distribution. It is also desirable for each substrate plus wrinkle controlling composition to have a weight or density similar to the fabrics in the bundle again to facilitate even distribution. Therefore, in cases where larger bundles are treated, it is preferable as stated above to use multiple available substrate plus wrinkle controlling composition. In cases where fabrics that are dry are treated in the dryer vs. fabrics that are wet, while it is acceptable to have one available substrate plus wrinkle controlling composition, it is preferred to have multiple available substrates plus wrinkle controlling composition in order to reduce the weight and/or density of each available substrate plus wrinkle controlling composition in order to make these more similar in weight and/or density to the dry clothes and thereby facilitate good distribution.

When treating fabrics in the clothes dryer the amount of wrinkle controlling composition used is dependent on the size of the load of fabrics. For a preferred 4 lbs. bundle of fabrics, wrinkle controlling compositions should be used typically at lower levels of least about 10 g, preferably at least about 20 g, even more preferably at least about 30 g, still more preferably at least about 50 g, and most preferably about 66 g, and at higher levels of equal to or less than about 3000 g, preferably equal to or less than about 1500 g, more preferably equal to or less than about 750 g, still more preferably equal to or less than about 500 g and most preferably equal to or less than about 100 g. When the bundle size is greater than about 4 lbs., higher amounts of wrinkle controlling composition are appropriate and when the bundle size is smaller than about 4 lbs. (about 1.8 kg) lower amounts of wrinkle controlling composition are appropriate. When the wrinkle controlling composition is provided together with an available substrate as an article of manufacture it will be understood that increasing the amount of wrinkle controlling composition in the dryer can mean adding more than one article of manufacture. Total drying time is typically set at a lower limit of at least about 1 minute, preferably about 2 minutes, more preferably about 3 minutes, even more preferably about 5 minutes and most preferably about 7 minutes and with an upper limit set at about 60 minutes, preferably 45 minutes, more preferably 30 minutes even more preferably about 20 minutes and still more preferably about 15 minutes and most preferably about 10 minutes. Preferably fabrics are still at least slightly damp when removed from the dryer.

Garments and fabrics should be removed as soon as possible, preferably immediately, following the drying cycle and arranged to maintain the smooth appearance of the fabrics with for instance, but not limited to, arranging sleeves, collars, pant legs so these are smooth and not twisted in any way, hanging the fabric on a hanger, laying the fabric flat on a or putting the fabric to its natural use to maintain its appearance e.g. hang curtains, put bed linens on the bed, put table linens on the table. Preferably the fabric will not be folded and stored until it is completely dry.

A hand-held hair dryer can be used to increase the speed of drying of individual fabrics. It is preferably to use the hand-held hair dryer on fabrics that are not very wet since it can be time consuming to dry fabrics with such an appliance. Therefore, it is preferably to employ this method on fairly dry fabrics, e.g., those that started in the dry state.

When using a hand-held hair dryer, wrinkle controlling compositions are applied preferably evenly over fabrics and preferably using the minimal amount of wrinkle controlling composition necessary. Preferably, the fabric is manipulated as described above to remove wrinkles prior to drying with the hand-held hair dryer. The hand-held dryer is turned on either low, medium, or high heat, preferably medium or high heat and the air stream is applied evenly over the fabrics until the fabrics are dry. However, care should be taken to preferably use low-heat and/or cool air to dry fabrics that are prone to shrinkage, such as , wool, silk, rayon, and the like, especially when the fabrics are reaching the point of drying completely. After drying the fabric should be placed in a configuration that will maintain its smoothness until use as discussed above.

Wrinkle controlling compositions can be used as ironing aids with either wet or dry fabrics to help ease removal of wrinkles by the ironing process. Wrinkle controlling composition is preferably applied to fabrics prior to ironing. A preferred way to deliver the wrinkle controlling composition to the fabrics is by spraying. The wrinkle controlling composition can also be delivered employing many of the through-the-dryer methods articulated above. Finally, in some embodiments, it is acceptable to deliver the wrinkle controlling composition through the iron concurrent with the ironing process. The iron should be set to a temperature appropriate for ironing the fabric. The wrinkle controlling compositions aid in "plasticizing" the fibers and thus reduce the time and effort involved in ironing wrinkles out of fabrics. In general, wrinkle controlling compositions should be used in a way similar to starch or water when starch or water are used as ironing aids. After ironing, the fabric should be placed in a configuration that will maintain its smoothness as discussed above.

It is preferably to avoid treating silk or rayon fabrics that are labeled "Dry Clean Only" with wrinkle controlling compositions as such fabrics are typically highly sensitive to staining and will stain even on contact with water. If a fabric becomes stained it should be washed according to instructions provided by the manufacturer of the fabric to remove the stain. While it is acceptable to use compositions herein on many synthetic garments, the product is especially effective on fabrics that contain a majority of natural fibers, e.g. the product is more effective on fabrics containing 100% cotton or 65% cotton/35% polyester vs. fabrics containing 35% cotton/65% polyester.

Many household fabrics can be treated with the wrinkle controlling composition while these household fabrics are residing in their typical environment. For instance, shower curtains comprised of fabrics and window curtains can be treated while hanging on the rods, bed spreads, quilts, sheets, ruffles, and dusters can be treated while these are on the bed, table linens can be treated while on the table. Spraying is a preferred method for treating fabrics residing in their typical environment. In these cases, reasonable care should be taken to avoid staining the environment around the fabric. For instance, table linens should be sprayed very lightly to prevent water from soaking through to the table, if the table underneath comprises wood or any other material that will stain, warp, or otherwise become disfigured upon picking up water or components of the wrinkle controlling compositions. In many cases spraying household fabrics in their natural environment can replace time consuming, costly, inconvenient, or undesirable processes. For instance, shower curtains are often dewrinkled by using the bathroom plumbing to generate a large quantity of steam. Spraying wrinkle controlling composition on the shower curtains eliminates the need to waste a large quantity of water producing steam, the potentially undesirable effects of steam on other elements of the bathroom (e.g., wall covers may peel), and the inconvenience of having to close the bathroom to use for a certain period of time. Spraying wrinkle controlling composition on curtains and bed clothes eliminates the often awkward and time consuming job of trying to iron large, irregular items; a process (e.g. ironing) that often results in accidentally generating even deeper more obvious and harder-to-remove wrinkles, as the user struggles to control both the large, irregularly shaped fabric and the iron. Thus, treating houschold fabrics as they hang in place with wrinkle controlling composition often minimizes frustration and struggle. It is especially desirable to dispense wrinkle removal compositions from a powered sprayer as disclosed above to further improve the performance and convenience.

Wrinkle controlling compositions allow a consumer the freedom to purchase a wider array of garments and fabrics e.g. garments and fabrics which are desirable but typically avoided during purchase decisions due to their tendency to wrinkle. Wrinkle controlling compositions change the care situation of these items from an impractical, time consuming, and frustrating process into a practical task; thus maximizing the pleasure inherent in owning such items by minimizing the tedium associated with taking care of them.

It is preferably to hang the garments to be treated with the wrinkle removal compositions using a swivel clothes hanger. The swivel clothes hanger has a frame that can be rotated around the stem of the hook. A garment hung on said swivel hanger can be oriented in many directions. This facilitates an even and thorough treatment of the garment with the wrinkle composition when using the spray to treat the garments. Additionally, the swivel hanger facilitates inspection and manipulation of the garment and so is generally useful when used together with wrinkle controlling compositions.

IV. Test Method for Rapid Stability Evaluation

Temperature cycling combined with ultra-centrifugation is a useful method for rapidly determining the stability of emulsified compositions (formulations or products). Temperature cycling mimics conditions that products will have to endure in the market place, by exposing the product to low, moderate, and high temperatures over several cycles. Products with acceptable stability will normally survive several cycles of temperature cycling without separating into layers and/or creaming. Products with very good stability will also be able to survive ultra-centrifugation following several cycles of temperature cycling. Ultra-centrifugation, due to the extreme forces it applies to products will force separation or creaming in products faster than normal gravity conditions. Therefore, these techniques provide a rapid method of evaluating products for preferred stability.

Temperature cycling involves storing product at 120° F. for at least about 8 hours; then storing the product at 40° F. for at least about 8 hours;. then storing the product at 70° F. for at least about 8 hours. This is one temperature cycle. For this method a composition is run through at least about four or five temperature cycles and then centrifuged to determine if it separation into layers or creaming occurs.

Ultra-centrifugation is performed in a Beckman Optima L-70K Ultra-Centrifuge. The compositions are loaded into a Beckman polyallomer centrifuge tubes until the combined weight of each tube and the composition is 13.50±0.02 g. Six tubes with equal weights of different compositions are placed in rotor buckets and placed on the rotor. The rotor is placed into the vacuum chamber. The rotor is placed under vacuum and the compositions are spun at 40,000 rpm for 16 hrs at 25° C. At the end of 16 hrs., the tubes are removed and examined for separation of layers or creaming. When separation is detected, the length of the total composition in the tube is measured. The length of the separation is measured from the bottom of the tube to the point where the separation line is obvious. The length from the bottom of the tube to the separation line is divided by the entire length of the composition and this is considered the % separation. If more than one separation is detected, the length of the total number of separations, from the bottom of the tube to the first separation line closest to the top of the tube is measured and then divided by the total length of the composition in the tube and reported as % separation. Products with preferred stability have 0% separation after temperature cycling and ultra-centrifugation. Examples are given in Table 8.

All percentages, ratios, and parts herein, in the Specification, Examples, and Claims are by weight and are the normal approximations unless otherwise stated and all references are incorporated by reference.

The following are examples of the present compositions, methods, and articles.

EXAMPLE I

The following is a process for making a composition according to the present invention. The composition is made using a batch mixing system. The batch mixing system has variable speed agitation, a stainless steel mix tank, and a pitched multi-blade dual paddle agitator. Tris buffer solution is made first by adding 99.25% deionized water to the main batch tank followed by 0.61% Tris (hydroxymethyl) amino methane and 0.056% HCl while stirring. The main batch tank is held at 100° F. from the time the buffer is made and throughout the entire process. The buffer solution is mixed thoroughly, prior to addition of other ingredients. The speed of stirring is typically about 100 rpm. The buffer solution is mixed from one to two hours.

Separately, a solution is made in a batch premix tank that comprises 1) about 49.75% D5 volatile silicone, 2) about 9.95% Neodol 23-3, 3) about 39.80% Silwet L77, and 4) about 0.498% perfume; with the perfume level in the premix varying depending on the level to be incorporated in the final product. Each of the components is added to the premix tank, with continuous mixing at a speed of about 250 rpm. The order of addition for each ingredient is the same as the listing above. The Neodol 23-3 is pre-heated before adding to the tank at a temperature of from about 75° F. to about 100° F. (from about 23° C. to about 38° C.). After addition of all the components, the premix batch is stirred for about 10 to about 30 minutes. During the process of making pre-mix, the temperature in the pre-mix tank is held to about 110° F. (about 43° C.). When the system needs to be restarted, after some period of disuse (e.g. a week-end, a plant shut down) the first pre-mix batch incorporates a slight amount excess of pre-mix solution than needed in the formulation to account for hang-up in the pre-mix tank. The excess is about 1.005 times the normal amount.

Mixing speed upon adding the pre-mix batch to the buffer solution in the main batch tank is critical as it is desirable to avoid sudsing. The mixing speed in the stainless steel tank with the buffer solution is about 50 rpm when the pre-mix batch is added into the main batch tank with the buffer solution.

Following completion of stirring of the pre-mix into the buffer solution in the main batch tank, the required amount of Stepanol WAC, about 0.1% of the total formula, is added to the main batch tank and stirred preferably for two to five minutes. The same stirring speed used for mixing the pre-mix into the buffer is maintained.

The required amount of antimicrobial active is added to main batch tank and stirred for two to five minutes. The same stirring speed used for mixing the pre-mix into the buffer is maintained.

Following mixing of the antimicrobial active, agitation is discontinued and any foam accumulated is allowed to dissipate. The batch tank is emptied and the next batch is made.

EXAMPLE II

Conventional nonionic surfactants shown in Examples herein are listed in Table 1, together with structural information and supplier information. Silicone surfactants shown in the Examples herein are disclosed hereinbefore in the detailed description of the invention together with structural information and supplier information. Tables 2 through 6 provide Examples of compositions according to the present invention. Table 7 provides the results of a rapid stability evaluation test. The following compositions are prepared by mixing and dissolving the ingredients into solutions that are preferably well dispersed and more preferably clear or translucent.

TABLE 1

Conventional Nonionic Surfactants

| Name | Structure | HLB Value | Suppliers |
|---|---|---|---|
| Neodol ® 91-2.5 | $C_9$–$C_{10}$ – 2.7 EO | 8.5 | Shell Chemical Co. |
| Neodol ® 23-1 | $C_{12}$–$C_{13}$ – 1.0 EO | 3.7 | Shell Chemical Co. |
| Neodol ® 23-2 | $C_{12}$–$C_{13}$ – 2.0 EO | 5.9 | Shell Chemical Co. |
| Neodol ® 23-3 | $C_{12}$–$C_{13}$ – 2.9 EO | 7.9 | Shell Chemical Co. |
| Neodol ® 25-3 | $C_{12}$–$C_{15}$ – 2.8 EO | 7.5 | Shell Chemical Co. |
| Neodol ® 23-5 | $C_{12}$–$C_{13}$ – 5.0 EO | 10.7 | Shell Chemical Co. |
| Neodol ® 25-9 | $C_{12}$–$C_{15}$ – 8.9 EO | 13.1 | Shell Chemical Co. |
| Neodol ® 25-12 | $C_{12}$–$C_{15}$ – 11.9 EO | 14.4 | Shell Chemical Co. |
| Hetoxol ® TD-3 | C13 – 3 EO | 7.9 | Heterene Inc. |
| Hetoxol ® OL-5 | Oleyl – 5 EO | 8.0 | Heterene Inc. |
| Kessco ® PEG-8 Mono-oleate | Oleoyl – 8 EO | 11.0 | Stepan Co. |
| Kessco ® Glycerol mono-oleate | Glyceryl mono-oleate | 3.8 | Stepan Co. |
| Arlacel ® 20 | Sorbitan mono-laurate | 8.6 | ICI Americas |

TABLE 2

| | Examples | | | | | |
|---|---|---|---|---|---|---|
| Ingredients | 1 Wt % | 2 Wt % | 3 Wt % | 4 Wt % | 5 Wt % | 6 Wt % |
| D5 volatile silicone | 0.5 | 0.5 | 0.5 | 0.35 | 1.0 | 1.0 |
| Neodol ® 23-3 | 0.5 | 0.5 | 0.5 | 0.5 | 0.5 | 0.5 |
| Silwet ® L-7602 | 0.7 | — | — | — | — | — |
| Silwet ® L-7622 | — | 0.5 | — | 0.7 | — | 0.8 |
| Silwet ® L-7604 | — | — | 0.5 | — | — | — |
| Silwet ® L-7210 | — | — | — | 0.5 | — | — |

TABLE 2-continued

| Ingredients | Examples | | | | | |
|---|---|---|---|---|---|---|
| | 1 Wt % | 2 Wt % | 3 Wt % | 4 Wt % | 5 Wt % | 6 Wt % |
| Silwet ® L-7001 | — | — | — | — | 1.0 | — |
| Silwet ® L-7600 | — | — | — | — | — | 0.4 |
| Tris[1] | 0.61 | 0.61 | 0.61 | 0.61 | 0.61 | 0.61 |
| HCl | 0.053 | 0.053 | 0.053 | 0.053 | 0.053 | 0.053 |
| Perfume | 0.1 | 0.1 | 0.05 | 0.1 | 0.03 | 0.05 |
| Distilled water | Bal. | Bal. | Bal. | Bal. | Bal. | Bal. |

[1]Tris refers to tris(hydroxymethyl)aminomethane.

TABLE 3

| Ingredients | Examples | | | | | |
|---|---|---|---|---|---|---|
| | 1 Wt % | 2 Wt % | 3 Wt % | 4 Wt % | 5 Wt % | 6 Wt % |
| Lithium bromide | 3.0 | — | 2.0 | 1.0 | 2.5 | — |
| Lithium lactate | — | 3.0 | — | — | — | 2.0 |

TABLE 3-continued

| Ingredients | Examples | | | | | |
|---|---|---|---|---|---|---|
| | 1 Wt % | 2 Wt % | 3 Wt % | 4 Wt % | 5 Wt % | 6 Wt % |
| D5 volatile silicone | 0.5 | 0.25 | 0.25 | 0.25 | 0.5 | 0.5 |
| Silicone emulsion A[2] | — | 2.0 | — | 1.0 | — | — |
| Silicone emulsion B[3] | — | — | 2.0 | — | — | — |
| Neodol 23-3 | 0.5 | 0.5 | 0.5 | 0.5 | 0.5 | 0.5 |
| Silwet ® L-7210 | 0.5 | — | — | — | 0.1 | — |
| Silwet ® L-7602 | — | 0.1 | — | — | 0.1 | — |
| Silwet ® L-7622 | — | — | 0.1 | 0.4 | — | — |
| Tris | 0.61 | 0.61 | 0.61 | 0.61 | 0.61 | 0.61 |
| HCl | 0.053 | 0.094 | 0.072 | 0.025 | 0.053 | 0.053 |
| Perfume | 0.1 | 0.03 | 0.03 | 0.05 | 0.03 | — |
| Distilled water | Bal. | Bal. | Bal. | Bal. | Bal. | Bal. |

[2]DC-2-5932 silicone microemulsion (25% active) from Dow Corning, with a particle size of about 24 nm, a cationic surfactant system, and a silicone with an internal phase viscosity of about 1,200 cps.
[3]DC-1550 silicone microemulsion (25% active) from Dow Corning, with a particle size of about 50 nm, an anionic/nonionic surfactant system, and a silicone with an internal phase viscosity of about 100,000 cps.

TABLE 4

| Ingredients | Examples | | | | | |
|---|---|---|---|---|---|---|
| | 1 Wt % | 2 Wt % | 3 Wt % | 4 Wt % | 5 Wt % | 6 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Silwet ® L77 | 2.0 | 2.0 | 1.0 | 1.0 | 1.0 | 1.0 |
| C45 AS[4] | 0.1 | 0.1 | 0.1 | 0.1 | 0.1 | 0.1 |
| Perfume | 0.005–0.06 | 0.005–0.06 | 0.005–0.06 | 0.005–0.06 | 0.005–0.06 | 0.005–0.06 |
| Tris | 0.61 | 0.61 | 0.61 | 0.61 | 0.61 | 0.61 |
| HCl | 0.02–0.12 | 0.02–0.12 | 0.02–0.12 | 0.02–0.12 | 0.02–0.12 | 0.02–0.12 |
| Distilled water | Bal. | Bal. | Bal. | Bal. | Bal. | Bal. |

| Ingredients | Examples | | | | | |
|---|---|---|---|---|---|---|
| | 7 Wt % | 8 Wt % | 9 Wt % | 10 Wt % | 11 Wt % | 12 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Dow Corning ® Q2-5211[5] | 2.0 | 2.0 | 1.0 | 1.0 | 1.0 | 1.0 |
| C45 AS | 0.1 | 0.1 | 0.1 | 0.1 | 0.1 | 0.1 |
| Perfume | 0.005–0.06 | 0.005–0.06 | 0.005–0.06 | 0.005–0.06 | 0.005–0.06 | 0.005–0.06 |
| Tris | 1.22 | 1.22 | 1.22 | 1.22 | 1.22 | 1.22 |
| HCl | 0.04–0.24 | 0.04–0.24 | 0.04–0.24 | 0.04–0.24 | 0.04–0.24 | 0.04–0.24 |
| Distilled water | Bal. | Bal. | Bal. | Bal. | Bal. | Bal. |

| Ingredients | Examples | | | | | |
|---|---|---|---|---|---|---|
| | 13 Wt % | 14 Wt % | 15 Wt % | 16 Wt % | 17 Wt % | 18 Wt % |
| D5 Volatile Silicone | 2.5 | 2.0 | 1.5 | 1.0 | 0.75 | 0.5 |
| Neodol ® 23-3 | 0.75 | 0.25 | 1.0 | 0.25 | 0.5 | 0.25 |
| Dow Corning ® Q2-5211 | 1.25 | 2.25 | 1.0 | 1.25 | 0.5 | 0.5 |
| C45 AS | 0.1 | 0.1 | 0.1 | 0.1 | 0.1 | 0.1 |
| Perfume | 0.005–0.06 | 0.005–0.06 | 0.005–0.06 | 0.005–0.06 | 0.005–0.06 | 0.005–0.06 |
| Glycine | 0.38 | 0.38 | 0.38 | 0.38 | 0.38 | 0.38 |

TABLE 4-continued

| | | | | | | |
|---|---|---|---|---|---|---|
| NaOH | 0.008–0.034 | 0.008–0.034 | 0.008–0.034 | 0.008–0.034 | 0.008–0.034 | 0.008–0.034 |
| Kathon ®[6] | 0.003 | 0.0003 | 0.003 | 0.003 | 0.003 | 0.003 |
| Distilled water | Bal. | Bal. | Bal. | Bal. | Bal. | Bal. |

| | Examples | | | | | |
|---|---|---|---|---|---|---|
| Ingredients | 19 Wt % | 20 Wt % | 21 Wt % | 22 Wt % | 23 Wt % | 24 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Silwet ® L77 | 2.0 | 2.0 | 1.0 | 1.0 | 1.0 | 1.0 |
| Stepanol ® WAC[7] | 0.1–0.2 | 0.1–0.2 | 0.1–0.2 | 0.1–0.2 | 0.1–0.2 | 0.1–0.2 |
| Perfume | 0.005–0.06 | 0.005–0.06 | 0.005–0.06 | 0.005–0.06 | 0.005–0.06 | 0.005–0.06 |
| Tris | 0.61 | 0.61 | 0.61 | 0.61 | 0.61 | 0.61 |
| HCl | 0.02–0.12 | 0.02–0.12 | 0.02–0.12 | 0.02–0.12 | 0.02–0.12 | 0.02–0.12 |
| Kathon ® | 0.003 | 0.0003 | 0.003 | 0.003 | 0.003 | 0.003 |
| Distilled water | Bal. | Bal. | Bal. | Bal. | Bal. | Bal. |

| | Examples | | | | | |
|---|---|---|---|---|---|---|
| Ingredients | 25 Wt % | 26 Wt % | 27 Wt % | 28 Wt % | 29 Wt % | 30 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Silwet ® L77 | 2.0 | 2.0 | 1.0 | 1.0 | 1.0 | 1.0 |
| Lauryl trimethyl ammonium chloride[8] | 0.1–0.2 | 0.1–0.2 | 0.1–0.2 | 0.1–0.2 | 0.1–0.2 | 0.1–0.2 |
| Perfume | 0.005–0.06 | 0.005–0.06 | 0.005–0.06 | 0.005–0.06 | 0.005–0.06 | 0.005–0.06 |
| Tris | 0.61 | 0.61 | 0.61 | 0.61 | 0.61 | 0.61 |
| HCl | 0.02–0.12 | 0.02–0.12 | 0.02–0.12 | 0.02–0.12 | 0.02–0.12 | 0.02–0.12 |
| Proxel GXL ®[8] | 0.01–0.05 | 0.01–0.05 | 0.01–0.05 | 0.01–0.05 | 0.01–0.05 | 0.01–0.05 |
| Distilled water | Bal. | Bal. | Bal. | Bal. | Bal. | Bal. |

| | Examples | | | | | |
|---|---|---|---|---|---|---|
| Ingredients | 31 Wt % | 32 Wt % | 33 Wt % | 34 Wt % | 35 Wt % | 36 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Silwet ® L77 | 2.0 | 2.0 | 1.0 | 1.0 | 1.0 | 1.0 |
| Lauryl trimethyl ammonium chloride | 0.1–0.2 | 0.1–0.2 | 0.1–0.2 | 0.1–0.2 | 0.1–0.2 | 0.1–0.2 |
| Perfume | 0.005–0.06 | 0.005–0.06 | 0.005–0.06 | 0.005–0.06 | 0.005–0.06 | 0.005–0.06 |
| Tris | 0.61 | 0.61 | 0.61 | 0.61 | 0.61 | 0.61 |
| HCl | 0.02–0.12 | 0.02–0.12 | 0.02–0.12 | 0.02–0.12 | 0.02–0.12 | 0.02–0.12 |
| Bardac ® 2250[9] | 0.01–1.0 | 0.01–1.0 | 0.01–1.0 | 0.01–1.0 | 0.01–1.0 | 0.01–1.0 |
| Distilled water | Bal. | Bal. | Bal. | Bal. | Bal. | Bal. |

| | Examples | | | | | |
|---|---|---|---|---|---|---|
| Ingredients | 37 Wt % | 38 Wt % | 39 Wt % | 40 Wt % | 41 Wt % | 42 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Silwet ® L77 | 2.0 | 2.0 | 1.0 | 1.0 | 1.0 | 1.0 |
| Stepanol ® WAC | 0.1–0.2 | 0.1–0.2 | 0.1–0.2 | 0.1–0.2 | 0.1–0.2 | 0.1–0.2 |
| Perfume | 0.005–0.06 | 0.005–0.06 | 0.005–0.06 | 0.005–0.06 | 0.005–0.06 | 0.005–0.06 |
| Tris | 1.22 | 1.22 | 1.22 | 1.22 | 1.22 | 1.22 |
| HCl | 0.04–0.24 | 0.04–0.24 | 0.04–0.24 | 0.04–0.24 | 0.04–0.24 | 0.04–0.24 |
| Kathon ® | 0.003 | 0.0003 | 0.003 | 0.003 | 0.003 | 0.003 |
| Distilled water | Bal. | Bal. | Bal. | Bal. | Bal. | Bal. |

| | Examples | | | | | |
|---|---|---|---|---|---|---|
| Ingredients | 43 Wt % | 44 Wt % | 45 Wt % | 46 Wt % | 47 Wt % | 48 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Silwet ® L77 | 2.0 | 2.0 | 1.0 | 1.0 | 1.0 | 1.0 |
| Stepanol ® WAC | 0.1–0.2 | 0.1–0.2 | 0.1–0.2 | 0.1–0.2 | 0.1–0.2 | 0.1–0.2 |
| Perfume | 0.005–0.06 | 0.005–0.06 | 0.005–0.06 | 0.005–0.06 | 0.005–0.06 | 0.005–0.06 |
| Tris | 1.22 | 1.22 | 1.22 | 1.22 | 1.22 | 1.22 |
| HCl | 0.04–0.24 | 0.04–0.24 | 0.04–0.24 | 0.04–0.24 | 0.04–0.24 | 0.04–0.24 |
| Proxel GXL ® | 0.01–0.05 | 0.01–0.05 | 0.01–0.05 | 0.01–0.05 | 0.01–0.05 | 0.01–0.05 |
| Distilled water | Bal. | Bal. | Bal. | Bal. | Bal. | Bal. |

TABLE 4-continued

| Ingredients | Examples | | | | | |
|---|---|---|---|---|---|---|
| | 49 Wt % | 50 Wt % | 51 Wt % | 52 Wt % | 53 Wt % | 54 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Silwet ® L77 | 2.0 | 2.0 | 1.0 | 1.0 | 1.0 | 1.0 |
| dimethyl hydroxyethyl lauryl ammonium chloride | 0.1–0.2 | 0.1–0.2 | 0.1–0.2 | 0.1–0.2 | 0.1–0.2 | 0.1–0.2 |
| Perfume | 0.005–0.06 | 0.005–0.06 | 0.005–0.06 | 0.005–0.06 | 0.005–0.06 | 0.005–0.06 |
| Tris | 1.22 | 1.22 | 1.22 | 1.22 | 1.22 | 1.22 |
| HCl | 0.04–0.24 | 0.04–0.24 | 0.04–0.24 | 0.04–0.24 | 0.04–0.24 | 0.04–0.24 |
| Bardac ® 2250 | 0.01–1.0 | 0.01–1.0 | 0.01–1.0 | 0.01–1.0 | 0.01–1.0 | 0.01–1.0 |
| Distilled water | Bal. | Bal. | Bal. | Bal. | Bal. | Bal. |

| Ingredients | Examples | | | | | |
|---|---|---|---|---|---|---|
| | 55 Wt % | 56 Wt % | 57 Wt % | 58 Wt % | 59 Wt % | 60 Wt % |
| D5 Volatile Silicone | 2.0 | 2.0 | 2.0 | 1.0 | 0.5 | 0.5 |
| Neodol ® 23-3 | 0.75 | 0.25 | 1.0 | 0.25 | 0.5 | 0.25 |
| Silwet ® L77 | 1.25 | 2.25 | 1.0 | 1.25 | 0.5 | 0.5 |
| Stepanol ® WAC | 0.1 | 0.2 | 0.1 | 0.1 | 0.1 | 0.1 |
| Perfume | 0.025 | 0.025 | 0.025 | 0.025 | 0.025 | 0.025 |
| Glycine | 0.38 | 0.38 | 0.38 | 0.38 | 0.38 | 0.38 |
| NaOH | 0.008–0.034 | 0.008–0.034 | 0.008–0.034 | 0.008–0.034 | 0.008–0.034 | 0.008–0.034 |
| Distilled water | Bal. | Bal. | Bal. | Bal. | Bal. | Bal. |

| Ingredients | Examples | | | | |
|---|---|---|---|---|---|
| | 61 Wt % | 62 Wt % | 63 Wt % | 64 Wt % | 65 Wt % |
| D5 Volatile Silicone | 2.5 | 2.5 | 2.5 | 2.5 | 2.5 |
| Neodol ® 23-3 | 0.5 | 0.5 | 0.5 | 0.5 | 0.5 |
| Silwet ® L77 | 2.0 | 2.0 | 2.0 | 2.0 | 2.0 |
| Stepanol ® WAC | 0.2 | — | — | — | — |
| Biosoft ® D-40[10] | — | 0.1 | 0.2 | 0.1 | 0.2 |
| Perfume | 0.03 | 0.03 | 0.025 | 0.03 | 0.025 |
| Tris | 0.61 | 0.61 | 0.61 | 0.61 | 0.61 |
| HCl | 0.02–0.12 | 0.02–0.12 | 0.02–0.12 | 0.02–0.12 | 0.02–0.12 |
| Distilled water | Bal. | Bal. | Bal. | Bal. | Bal. |

| Ingredients | Examples | | | | | | | |
|---|---|---|---|---|---|---|---|---|
| | 63 Wt % | 64 Wt % | 65 Wt % | 66 Wt % | 67 Wt % | 68 Wt % | 69 Wt % | 70 Wt % |
| D5 Volatile Silicone | 2.5 | 2.5 | 2.0 | 2.0 | 2.5 | 2.5 | 1.5 | 2.5 |
| Neodol ® 23-3 | 0.5 | 0.5 | 0.5 | 0.5 | — | — | — | — |
| Neodol ® 23-2 | | | | | 0.5 | 0.5 | 0.25 | 0.5 |
| Silwet ® L77 | — | — | 0.75 | — | 1.75 | — | — | — |
| Silwet ® L7280 | 2.0 | — | 0.75 | 0.5 | — | 1.75 | 1.0 | — |
| Silwet ® L7608 | — | 2.0 | — | 1.0 | — | — | — | 1.0 |
| Silwet ® L7600 | — | — | — | — | 0.25 | — | — | 0.25 |
| Silwet ® L7607 | — | — | — | — | — | 0.25 | 0.25 | — |
| Stepanol ® WAC[6] | 0.1 | 0.2 | 0.1 | 0.2 | 0.1 | 0.2 | 0.2 | 0.1 |
| Perfume | 0.02 | 0.03 | 0.02 | 0.03 | 0.03 | 0.025 | 0.01 | 0.015 |
| Tris | 0.61 | 0.61 | 0.61 | 0.61 | 0.61 | 0.61 | 0.61 | 0.61 |
| HCl | 0.02–0.12 | 0.02–0.12 | 0.02–0.12 | 0.02–0.12 | 0.02–0.12 | 0.02–0.12 | 0.02–0.12 | 0.02–0.12 |
| Distilled water | Bal. | Bal. | Bal. | Bal. | Bal. | Bal. | Bal. | Bal. |

[4]A sodium alkyl sulfate made from $C_{14}$ and $C_{15}$ chain length alcohols.
[5]polyalkylene oxide polysiloxane
[6]Kathon ® is an antimicrobial with the composition methylchloroisothiazolinone/methylisothiazolinone
[7]Sodium lauryl sulfate.
[8]Proxel GXL ® is an antimicrobial having the following structure; 1,2-benzisothiazolin-3-one.
[9]Bardac ® 2250 is an antimicrobial having the following structure; didecyl dimethyl ammonium chloride
[10]Sodium dodecyl benzene sulfonate.

TABLE 5

| | Examples | | | | | |
|---|---|---|---|---|---|---|
| Ingredients | 1 Wt % | 2 Wt % | 3 Wt % | 4 Wt % | 5 Wt % | 6 Wt % |
| D5 Volatile Silicone | 2.5 | 2.5 | 2.5 | 2.5 | 0.5 | 0.5 |
| Neodol ® 23-3 | 0.5 | 0.5 | 1.5 | 1.5 | 1.0 | 1.0 |
| Silwet ® L77 | 2.0 | 2.0 | 2.0 | 1.25 | 1.0 | 1.0 |
| Stepanol WAC ® | 0.1–0.2 | 0.1–0.2 | 0.1–0.2 | 0.1–0.2 | 0.1–0.2 | 0.1–0.2 |
| Perfume | 0.025 | 0.025 | 0.025 | 0.025 | 0.025 | 0.025 |
| Diahold ® ME[11] | 0.5 | 1.0 | 0.5 | 1.0 | 0.5 | 1.0 |
| Tris | 0.61 | — | 0.61 | — | 0.61 | — |
| HCl | 0.02–0.12 | — | 0.02–0.12 | — | 0.02–0.12 | — |
| NaHCO$_3$ | — | 0.21 | — | 0.21 | — | 0.21 |
| NaOH | — | 0.02–0.091 | — | 0.02–0.091 | — | 0.02–0.091 |
| Distilled water | Bal. | Bal. | Bal. | Bal. | Bal. | Bal. |

| | Examples | | | | | |
|---|---|---|---|---|---|---|
| Ingredients | 7 Wt % | 8 Wt % | 9 Wt % | 10 Wt % | 11 Wt % | 12 Wt % |
| D5 Volatile Silicone | 2.0 | 2.0 | 1.5 | 1.0 | 1.0 | 0.75 |
| Neodol ® 23-3 | 1.0 | 1.0 | 0.5 | 0.5 | 0.5 | 0.3 |
| Dow Corning ® Q2-5211 | 2.0 | 2.0 | 1.7 | 1.25 | 1.5 | 1.1 |
| Stepanol ® WAC | 0.1 | 0.1 | 0.2 | 0.2 | 0.2 | 0.2 |
| Perfume | 0.025 | 0.025 | 0.03 | 0.025 | 0.025 | 0.025 |
| Diahold ® ME | 0.25 | 0.5 | 1.0 | 1.0 | 1.5 | 1.5 |
| Tris | 0.61 | 0.61 | — | — | — | — |
| HCl | 0.02–0.12 | 0.02–0.12 | — | — | — | — |
| Na$_2$CO$_3$ | — | — | 0.26–0.31 | 0.26–0.31 | 0.26–0.31 | 0.26–0.31 |
| NaHCO$_3$ | — | — | 0.749–0.763 | 0.749–0.763 | 0.749–0.763 | 0.749–0.763 |
| Distilled water | Bal. | Bal. | Bal. | Bal. | Bal. | Bal. |

[11]Acrylic acid/tert-butyl acrylate copolymer in which a number of the acrylic acid units have been modified with polydimethyl siloxane (PDMS). The ratio of t-butyl acrylate to acrylic acid to PDMS modified acrylic acid units in the polymer is approximately 3:1:1 with the number of PDMS repeat units being approximately 100 per polymer.

TABLE 6

| | Examples | | | | | |
|---|---|---|---|---|---|---|
| Ingredients | 1 Wt % | 2 Wt % | 3 Wt % | 4 Wt % | 5 Wt % | 6 Wt % |
| D5 Volatile Silicone | 2.5 | 2.0 | 1.5 | 1.0 | 0.75 | 0.5 |
| Neodol ® 23-3 | 0.5 | 0.5 | 0.5 | 0.5 | 0.5 | 0.5 |
| Dow Corning ® Q2-5211 | 2.0 | 2.0 | 1.0 | 1.0 | 1.0 | 1.0 |
| Stepanol ® WAC | 0.1 | 0.1 | — | 0.1 | — | — |
| TEA Di-ester Quat[12] | 0.2 | 0.3 | 0.5 | 0.7 | 1.0 | 1.25 |
| Perfume | 0.025 | 0.025 | 0.025 | 0.025 | 0.025 | 0.025 |
| KH$_2$PO$_4$ | 0.68 | 0.68 | 0.68 | 0.68 | 0.68 | 0.68 |
| NaOH | 0.027 | 0.032 | 0.039 | 0.027 | 0.032 | 0.039 |
| Distilled water | Bal. | Bal. | Bal. | Bal. | Bal. | Bal. |

| | Examples | | | |
|---|---|---|---|---|
| Ingredients | 7 Wt % | 8 Wt % | 9 Wt % | 10 Wt % |
| D5 Volatile Silicone | 2.0 | 2.0 | 2.0 | 2.0 |
| Neodol ® 23-3 | 0.5 | 0.5 | 0.5 | 0.5 |
| Silwet ® L77 | 2.0 | 2.0 | 2.0 | 2.0 |
| Stepanol °WAC | 0.1 | — | 0.1 | — |
| DEA DI-ester Quat[13] | 0.2 | 0.5 | — | — |
| DEEDMAC ®[14] | — | — | 0.2 | 0.5 |
| Perfume | 0.025 | 0.025 | 0.025 | 0.025 |
| KH$_2$PO$_4$ | 0.68 | 0.68 | 0.68 | 0.68 |
| NaOH | 0.027 | 0.032 | 0.039 | 0.027 |
| Kathon | 0.003 | 0.0003 | 0.003 | 0.003 |
| Distilled water | Bal. | Bal. | Bal. | Bal. |

[12]Di(acyloxyethyl)(2-hydroxyethyl)methyl ammonium methyl sulfate.
[13]Di(acyloxyethyl)dimethyl ammonium methyl sulfate where the acyl group is derived from partially hydrogenated canola fatty acid
[14]Ditailowoyl Ethanol Ester Dimethyl Ammonium Chloride.

TABLE 7

The Results of Accelerated Stability Testing

| Composition | Wt % | Wt % | Wt % |
|---|---|---|---|
| D5 Volatile Silicone | 2.5 | 2.5 | 2.5 |
| Neodol ® 23-3 | 0.5 | 0.5 | 0.5 |
| Silwet ® L77 | 2.0 | 2.0 | 2.0 |
| C45 AS | 0.1 | — | — |
| Stepanol ® WAC | — | 0.1 | 0.1 |
| Perfume | 0.025 | 0.025 | 0.025 |
| NaOH | to pH 8 | — | — |
| Tris | — | 0.61 | 0.61 |
| HCl[15] | — | 0.053 | 0.053 |
| Water | Bal. | Bal. | Bal. |
| % Separation | 16% | 0% | 0% |

[15]Concentrated HCl, 36–38% active.

As can be seen by the above data, the buffered composition is clearly more stable.

The compositions of the above Examples are sprayed onto clothing using, e.g., the TS-800 sprayer from Calmar, and allowed to evaporate off of the clothing.

The compositions of the above Examples are sprayed onto clothing, using a blue inserted Guala® trigger sprayer, available from Berry Plastics Corp. and a cylindrical Euromist II® pump sprayer available from Seaquest Dispensing, respectively, and allowed to evaporate off of the clothing.

The compositions of the above Examples contained in rechargeable battery-operated Solo Spraystar sprayers are sprayed onto large surfaces of fabric, such as several pieces of clothing, and allowed to evaporate off of these surfaces. The level of coverage is uniform and the ease and convenience of application is superior to conventional manually operated trigger sprayers.

What is claimed is:

1. A silicone emulsion composition comprising:
   (a) at least about 0.025% and less than about 10% of silicone oil, by weight of said composition;
   (b) an effective amount to emulsify said silicone oil and reduce surface tension of said composition of a surfaclant system;
   (c) an effective amount of a buffering system to naintain a pH of said composition to be at least about 6 for a period of at least about 3 months.
wherein said buffering system is selected from the group consisting of:
   (a) tris(hydroxymethyl)aminomethane and hydrochloric acid;
   (b) borax and hydrochloric acid;
   (c) diethanolamine and hydrochloric acid;
   (d) sodium borate and sodium hydroxide;
   (e) sodium bicarbonate and sodium hydroxide;
   (f) sodium hydrogen phosphate and sodium hydroxide;
   (g) sodium carbonate and sodium bicarbonate;
   (h) boric acid and sodium hydroxide;
   (i) glycine and sodium hydroxide; and
   (j) potassium chloride and sodium hydroxide; and
wherein said buffering system has a buffering capacity of at least about 0.01.

2. The silicone emulsion composition of claim 1, wherein said surfactant system is selected from a (a) nonionic silicone surfactant, (b) nonionic nonsilicone surfactant, and (c) ionic surfactant;
wherein the nonionic nonsilicone surfactant is chosen from at least one of the following:
   (a) an alkyl ethoxylated surfactant;
   (b) a compound having the general formula:

$R^8$-Z-$(CH_2CH_2O)_s$B wherein $R^8$ is an alkyl group or an alkyl aryl group, selected from the group consisting of primary, secondary and branched chain alkyl hydrocarbyl groups, primarily, secondary and branched chain alkenyl hydrocarbyl groups, and/or primary, secondary and branched chain alkyl- and alkenyl-substituted phenolic hydrocarbyl groups having from about 6 to about 20 carbon atoms; s is an integer from about 2 to about 45: B is hydrogen, a carboxylate group, or a sulfate group: and linking group Z is selected from the group consisting of: —O—, —N(R)$_x$—, —C(O)O—, —C(O)N(R)—, —C(O)N(R)—, and mixtures thereof, in which R, when present, is $R^8$, a lower alkyl with about 1 to about 4 carbons, a polyalkylene oxide, or hydrogen, and x is 1 or 2,
   (c) a straight-chain, primary alcohol ethoxylate;
   (d) a carboxylated alcohol ethoxylate;
   (e) a straight-chain, secondary alcohol ethoxylate;
   (f) an alkyl phenol ethoxylate;
   (g) a branched chain alcohol ethoxylate;
   (h) an ethoxylated alkyl amine derived from the condensation of an ethylene oxide with a hydrophobic alkyl amine;
   (i) a surfactant derived from carbohydrate;
   (j) a surfactant derived from sorbitan ester;
   (k) a surfactant derived from an alkyl glucoside; and
   (l) a surfactant derived from an alkyl polyglucoside.

3. The silicone emulsion composition of claim 2, wherein said silicone oil s a polydimethylsiloxane; said nonionic silicone surfactant is a polyalkylene oxide polysiloxane; said nonionic nonsilicone surfactant is an alkyl ethoxylated surfactant; and said ionic surfactant is an alkyl sulfate.

4. The silicone emulsion of claim 3, wherein the said polydimethylsiloxane silicone oil is volatile.

5. The silicone emulsion composition of claim 3, wherein said composition further comprising from about 0.003% to about 0.5% perfume, by weight of said composition.

6. The silicone emulsion of claim 1, further comprising from about 0.005% to about 2% of an antimicrobial active, by weight of said composition.

7. The silicone emulsion of claim 2, wherein said buffer system comprises tris(hydroxymethyl)aminomethane and hydrochloric acid.

8. The silicone emulsion of claim 7, wherein said buffer system has a buffering capacity of at least about 0.02.

9. The silicone emulsion of claim 1, wherein said buffer system has a buffering capacity of at least about 0.02.

10. A silicone emulsion composition comprising: at least about 0.025% and less than about 10% of silicone oil, by weight of said composition; an effective amount to emulsify said silicone oil and reduce surface tension of said composition of a surfactant system; said surfactant system is chosen from:
   (i) a nonionic silicone surfactant wherein the ratio of said nonionic silicone surfactant to said silicone oil is from about 0.01:1 to about 3:1;
   (ii) a nonionic nonsilicone surfactant wherein the ratio of said nonionic nonsilicone surfactant to said silicone oil is from about 0.001:1 to about 1:1; or
   (iii) an ionic surfactant wherein the ratio of said ionic surfactant to said silicone oil is from about 0.0001:1 to about 0.5:1;
wherein the composition comprises a buffering system, wherein the buffering system comprises at least one of the following:
   (i) tris(hydroxymethyl)aminomethane and hydrochloric acid;
   (ii) borax and hydrochloric acid;
   (iii) diethanolamine and hydrochloric acid;
   (iv) sodium borate and sodium hydroxide;
   (v) sodium bicarbonate and sodium hydroxide;
   (vi) sodium hydrogen phosphate and sodium hydroxide;
   (vii) sodium carbonate and sodium bicarbonate;
   (viii) boric acid and sodium hydroxide;
   (ix) glycine and sodium hydroxide; and
   (x) potassium chloride and sodium hydroxide;
and wherein the nonionic nonsilicone surfactant is chosen from at least one of the following;
   (a) an alkyl ethoxylated surfactant;
   (b) a compound having the general formula;

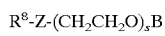

$R^8$-Z-$(CH_2CH_2O)_s$B wherein $R^8$ is an alkyl group or an alkyl group, selected from the group consisting of primary, secondary and branched chain alkyl hydrocarbyl groups, primary, secondary and branched chain alkenyl hydrocarbyl groups, and/or primary, secondary and branched chain alkyl- and alkenyl-substituted phenolic hydrocarbyl groups having from about 6 to about 20 carbon atoms; s is an integer from about 2 to about 45; B is hydrogen, a carboxylate group, or a sulfate group; and linking group Z is selected from the group consisting of: —O—, —N(R)$_x$—, —C(O)O—, —C(O)N(R)—, —C(O)N(R)—, and mixtures thereof, in which R, when present is R$^8$, a lower alkyl with about 1 to about 4 carbons, a polyalkylene oxide, or hydrogen, and x is 1 or 2, (c) a straight-chain primary alcohol ethoxylate;
(d) a carboxylated alcohol ethoxylate;
(e) a straight-chain, secondary alcohol ethoxylate
(f) an alkyl phenol ethoxylate;
(g) a branched chain alcohol ethoxylate;
(h) an ethoxylated alkyl amine derived from the condensation of an ethylene oxide with a hydrophobic alkyl amine;
(i) a surfactant derived from carbohydrate;
(j) a surfactant derived from sorbitan ester;
(k) a surfactant derived from an alkyl glucoside; and
(l) a surfactant derived from an alkyl polyglucoside.

11. The composition of claim 1, or 10, wherein the buffering system maintains the pH of the composition to be no greater than about 12.

12. A method of treating fabric comprising the step of contacting said fabric with an effective amount of a composition according claim 1 or 10.

* * * * *